United States Patent [19]

Bestler et al.

[11] Patent Number: 4,755,872
[45] Date of Patent: Jul. 5, 1988

[54] IMPULSE PAY PER VIEW SYSTEM AND METHOD

[75] Inventors: Charles B. Bestler, Oak Park; Gordon E. Reichard, Jr., Rolling Meadows; Thomas J. Rossen, Oak Park; Semir Sirazi, Chicago, all of Ill.

[73] Assignee: Zenith Electronics Corporation, Glenview, Ill.

[21] Appl. No.: 760,218

[22] Filed: Jul. 29, 1985

[51] Int. Cl.⁴ .................. H04M 11/08; H04M 15/00; H04N 7/10; H04H 9/00
[52] U.S. Cl. ..................................... 358/86; 379/105; 379/246
[58] Field of Search ................... 179/2 A, 5.5, 18 FH; 358/84, 86, 349; 455/2, 4, 5; 379/102, 104, 105, 127, 142, 246

[56] References Cited

U.S. PATENT DOCUMENTS

| | | | |
|---|---|---|---|
| 3,920,908 | 11/1975 | Kraus . | |
| 4,163,254 | 7/1979 | Block et al. | 358/84 X |
| 4,460,922 | 7/1984 | Ensinger et al. | 358/122 |
| 4,518,989 | 5/1985 | Yabiki et al. | 358/86 |
| 4,536,791 | 8/1985 | Campbell et al. | 358/86 X |
| 4,554,418 | 11/1985 | Toy . | |
| 4,558,464 | 12/1985 | O'Brien, Jr. | 358/86 X |
| 4,590,516 | 5/1986 | Abraham | 358/86 |

FOREIGN PATENT DOCUMENTS

| | | | |
|---|---|---|---|
| 103438 | 3/1984 | European Pat. Off. | 358/86 |
| 217308 | 4/1987 | European Pat. Off. . | |
| WO85/03830 | 8/1985 | World Int. Prop. O. | 84/ |
| WO87/04884 | 8/1987 | World Int. Prop. O. | 358/86 |

OTHER PUBLICATIONS

The Yankee Group, "Cable and the Telcos: from Confrontation to Détente," Jun. 1983, pp. 162–167.
A. F. Bulfer, "Dial-A-View," talk given at the Motion Picture Industry Seminar, Dec. 3, 1984, Los Angeles, Ca.
Bulfer et al., "A Trial of a National Pay-Per-View Ordering and Billing System," NCTA Technical Papers, Cable 86, Dallas Tex., Mar. 1986.
Zenith Electronics, "Advanced New Cable TV Technology Developed for Impulse-Pay-Per-View," Jun. 3, 1985, press release published by Zenith Electronics, Corp. Glenview, Ill., obtained from Dialog Data Base, 'File 621'.
Sirazi et al., "Comparative Study of Hybrid IPPV Implementations" presented Jun. 3, 1985 at Cable 85, Las Vegas, Nv.

Primary Examiner—Keith E. George

[57] ABSTRACT

An IPPV technique is provided for a cable system having one-way addressable converters. Each of several central offices in a metropolitan area will provide ANI information representing the cable subscriber's phone number and a code representing the cable event to be viewed or cancelled. The data is sent asynchronously to a respective telephone communication unit located at the central office. This telephone communication unit (TCU) does some buffering, eliminates unnecessary data, and sends data synchronously to a telepone communication controller (TCC) located at the cable headend station. The TCC will acknowledge the data. There will be several TCCs located at the cable headend station corresponding to the several central offices who may give telephone service to the cable operator's subscribers. All of these TCCs at the headend station are coupled through a multiplexer to a system controller. Each TCC provides intermediate processing which converts the subscriber's telephone number into binary. The multiplexer provides buffering, flow control, and arbitration among various TCCs. The multiplexer adapts to data flow conditions. The system controller receives data from each subscriber, locates a corresponding home terminal unit address, examines the password and other information, and maps the two digit program identification which was entered by the subscriber into an authorization code. It then authorizes the home terminal units in accordance with the IPPV requests by transmitting the subscriber's cable address and a new authorization code in the vertical blanking interval, generates the commercial transaction, and downloads the transaction to a billing system.

63 Claims, 12 Drawing Sheets

BOARD SELECT & I/O BUS CONTROL LOGIC
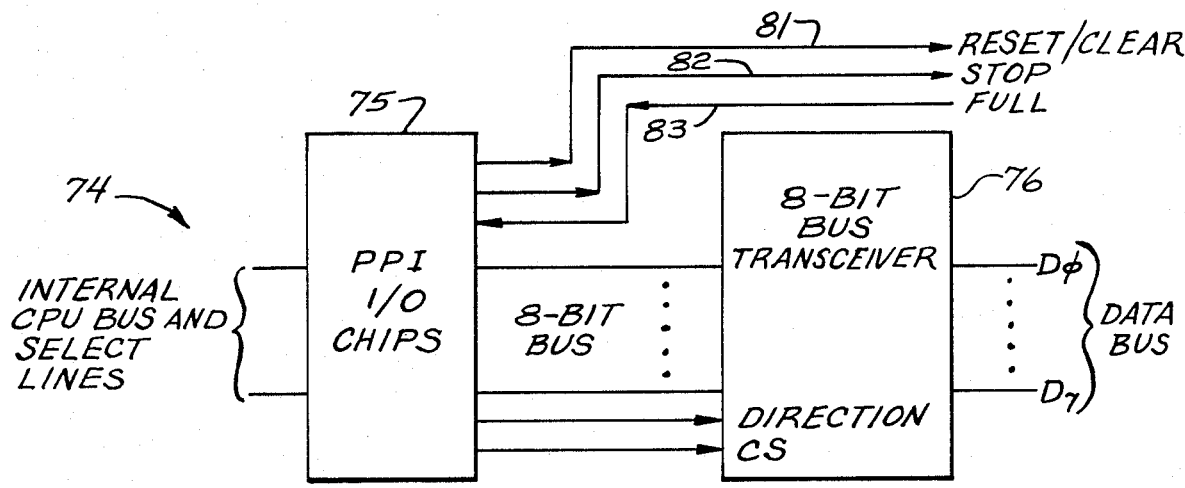
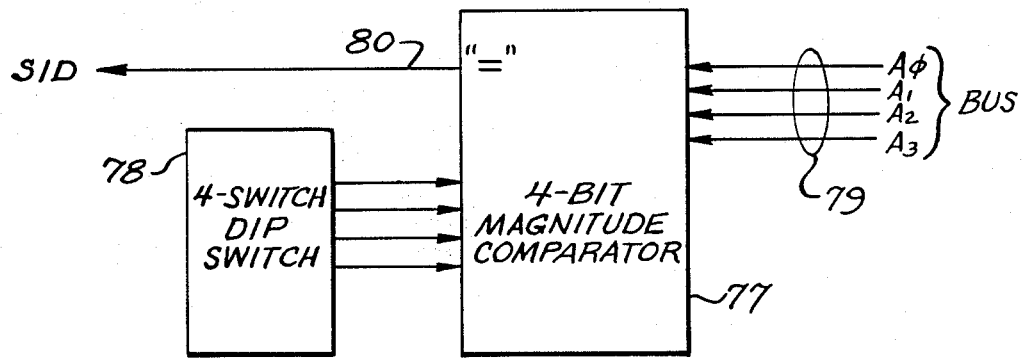
FIG. 4B

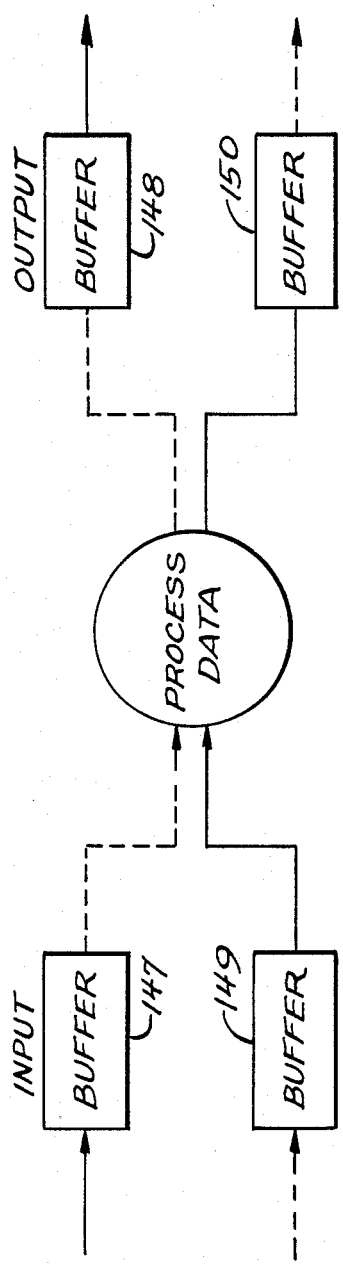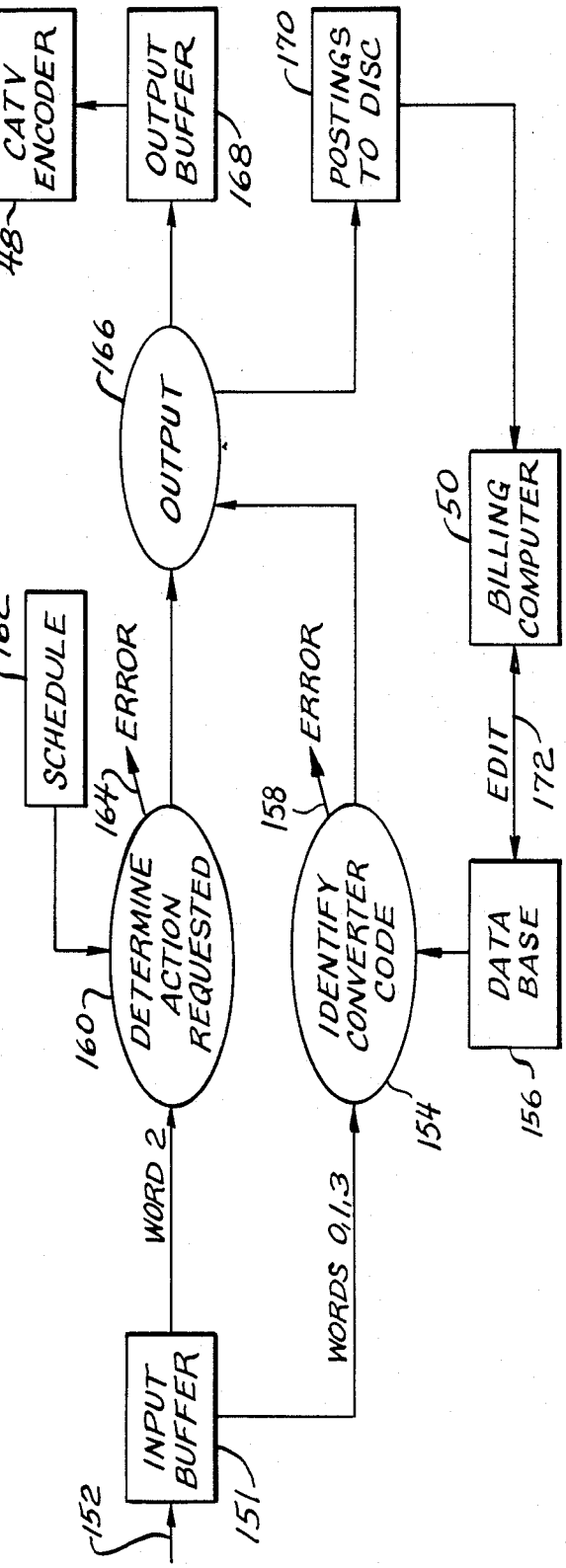

IMPULSE PAY PER VIEW SYSTEM AND METHOD

BACKGROUND OF THE INVENTION

The present invention relates to cable television and particularly to a technique whereby a cable subscriber can send a request via telephone to the cable operator to receive only a selected cable program. This is known as an "impulse pay per view" system.

The preferred embodiment of the present invention is compatible with one-way addressable CATV systems. Prior to describing the invention, it will be useful to have a rudimentary understanding of a typical one-way addressable CATV system. In use, a cable operator at a "headend" station receives signals via satellite, microwave, and super trunks, encodes the signals, modulates them, and provides them to the cable plant. The cable plant is a distribution network typically carrying up to 80 channels or more over a distance of up to 20 miles or so to various subscribers. Each of the cable subscribers is provided with a one-way addressable converter (also called a decoder) which is connected to the cable and to a television receiver or monitor. The basic function of the converter is to interface the cable signals with the subscriber according to authorization codes received from the headend. The subscriber will select a channel containing a program desired to be viewed. The converter will determine whether that channel or program on the channel is authorized for viewing by the subscriber. If so, the converter descrambles the selected signal provided by the cable operator and provides a descrambled signal to the television receiver or monitor. The scrambling may, for example, be done by sync suppression wherein sync information is randomly suppressed, as well as video inversion.

To achieve the foregoing system, use may be made of the vertical blanking interval, e.g. line numbers 10, 11, 12 and 13, or an out-of-band data channel during which information can be transmitted by the headend station to the subscribers or any selected subscriber. Each converter has a respective unique address code illustratively having 20 binary bits so that over one million subscribers can be individually addressed by the headend. Additionally, each converter typically includes a random access memory (RAM) which is capable of storing 20 bits, for example. Each of the stored bits is representative of a service or channel which may be subscribed to. Typically, at installation, the RAM is loaded with all zero bits. When the subscriber chooses the services he wants, that information will be entered as data in a subscriber data base. The subscriber data base is accessed by a system controller at the headend station which is capable of addressing any or all of the converters in the field. The system controller also communicates with a billing and management computer.

More particularly, in this example the system controller transmits a selected 20 bit address code (sometimes referred to as an "identification code") followed by an associated authorization code using each of line numbers 10, 11, and/or 12 in the vertical blanking interval. Each converter receives the 20 bit address code, but only one converter will decode it as matching its own unique address. Following the transmitted 20 bit address code are the five bits of the authorization code. These five authorization bits will be loaded into a proper location in the RAM, the location having been determined by information from line 13 in the prior field. The RAM in the converter will illustratively contain 20 bits arranged in four groups which may be called row A, row B, row C, and row D. Illustratively, the five bit authorization code will be loaded into one of the rows of the RAM. Line number 13 of the vertical interval is used to transmit a "program tag," a "market code," and further information to the converters in the field. The market code is used to prevent a converter from being taken from one cable market to another market. The transmitted program tag is used to identify a particular channel or program and is compared in the addressed converter with the stored authorization bits to establish whether that converter is authorized to descramble the corresponding program material. Illustratively, this is done by performing a logical AND operation between the 5 bit program tag transmitted on line 13 of the channel which has been selected by the subscriber with the content of a selected row of the RAM. The result of this logical operation will indicate to the converter whether the selected channel or program on the channel has been authorized to be descrambled by the converter. It will be appreciated that each of the channels transmitted by the cable operator has its own respective program tag. This particular system has exceptional versatility in that the contents of the RAM at any subscriber's converter can be changed instantly via the system controller through the transmission of the appropriate address code during the vertical blanking interval followed by updated information for storage in the RAM. Moreover, there can be tiers of authorization wherein various programs on a given channel will be authorized for some subscribers but not for others, depending on the service to which they have subscribed. For further information about one such addressable system, refer to Ensinger and Hendrickson U.S. Pat. No. 4,460,992, whose disclosure is hereby incorporated, which patent is owned by Zenith Electronics Corp.

To date, the market penetration of cable systems has been on the order of only 50 percent. Some television owners prefer not to pay the monthly charges for cable service to receive one or more of the packages or services provided by the cable operator. These non-subscribers, however, may be willing to pay the cable operator for only an occasional program. Such type of service is called "pay per view." In order to achieve this and to provide control over billing, the cable operator must have information regarding what programs are desired by various subscribers. In an addressable CATV system of the type described above, for example, a particular subscriber's converter may be updated so that it will descramble a given program—once it is determined that the subscriber is wlling to pay for that program. This can be done by having the subscriber telephone the cable operator in advance of the program to be purchased, mail a postcard, or communicate by some other means.

The problem with this type of service, however, is that it precludes impulse purchases and simultaneous response from the time the pay-per-view subscriber determines he wishes to purchase a particular program and the time it is actually viewed by him. It would be considerably more advantageous to permit a subscriber to obtain immediate results by, for example, pushing a button. This would alert the cable operator to a request for service. The system controller at the headend station immediately would change the contents of the RAM at that subscriber's converter to permit the selected program to be descrambled. This is called "impulse pay per view" (IPPV) service.

The problem facing the industry is how to provide a system permitting IPPV service. In 1975, the Federal Communications Commission mandated that all cable systems being installed would be required to have two-way communications capability. This would permit interaction between the subscriber and the headend station. To date, about 20 percent of installed systems are capable of two-way communications, and of these only about one-half have active two-way communication. With two-way communication, the subscriber can use his home terminal or other unit to communicate with the headend station and achieve IPPV. The problem, however, resides in providing a mechanism for other subscribers served by one-way cable systems, which constitute the vast majority to have IPPV service.

For cable subscribers without two-way cable systems, a hybrid system is required for impulse pay per view service. This involves a telephone request by a subscriber for a PPV cable event followed by delivery from the cable operator headend station to the individual subscriber of a new authorization level permitting the PPV cable event to be descrambled.

The problem with hybrid systems using the telephone is substantial. The telephone system in a given city or community includes one or more central offices, each communicating with up to about 50,000 telephone subscribers. Each of the several central offices communicates with the others by trank cables. The headend station of the cable operator will be located within a region serviced by one central office. When cable subscribers telephone for pay per view service, their telephone central offices will route all of the telephone calls to the one central office servicing the headend station. Too many telephone requests at the same time to the cable operator can cause the telephone central office to "crash" due to excessive requests for physical telephone connections between numerous telephone subscribers and a single cable operator headend station. This problem is common to all hybrid systems, whether a manual telephone system or an automatic dialing system is used.

Further problems attend manual call-in systems and auto-dialing systems. The manual call-in systems are labor intensive, require long processing and holding time, have limited capacity, are not impulse in nature, and have lower penetration. They also involve possible human error. Auto-dialing systems have an advantage over manual systems, except that there is the additional expense of in-home installation of the automatic dialer.

To avoid overloading on the telephone system, one solution to providing IPPV service for one-way addressable cable systems would be to refrain from making physical telephone connections between the cable subscribers and the headend station through the various central offices. To achieve this, a new system based on automatic number identification passing referred to as "ANI passing" has been developed. ANI passing is an upgrade achieved by adding software to some central offices or by adding hardware to others, depending on their existing capabilities. In ANI passing, the central office of the telephone company will collect information based on each subscriber telephone call and pass it on to other equipment.

Thus, when a cable subscriber intends to make an IPPV request and picks up his telephone (takes it "off-hook"), a dial tone is issued to the subscriber's premises by the telephone company, and the telephone number is automatically identified, as customary within the telephone company. Now the cable subscriber can enter information using the telephone. Typically, to place a phone call, seven digits (or ten, if an area code is needed) are entered. To use ANI passing, however, some prescribed sequence of digits is used. This can take vertically any form. For example, the subscriber may enter "*85" or any other prescribed NNX number (exchange number) and then some number of digits, such as four further digits. In general, however, the total number of digits need not be seven, so long as some prescribed subscriber-entered information alerts the telephone company central office *not* to make a physical connection between the telephone subscriber and whatever location is identified by the code which follows the reserved block of codes which follows the NNX (or *85 signal). After dialing the NNX number, for example, the cable subscriber will provide further information on the telephone by sending illustratively four digits. Hence the telephone transmission to the central office may take the following form: NNX-YVVZ. In this illustrative example, the code represented by NNX activates the ANI passing system at the central office. The remaining four digits YVVZ identify what the subscriber wants to do. Illustratively, the Y digit is used to identify the cable company. In any given metropolitan area, there will be fewer than ten different cable operators, so the one digit (Y) will be able to identify the cable operator uniquely. Illustratively, the next two digits represented by VV identify the event or cable television program which the cable subscriber wishes to purchase. Next, the Z digit may represent a password which is useful for security purposes. For example, within a given household where a cable television system has been installed, parents may, through the use of a password, prevent access by children to certain types of pay per view programming. Alternatively, the Z digit can be used for other purposes. In using *85, five digits can be entered by the cable subscriber to his telephone, for a total of, for example, seven digits preceded by one special character. One of the digits may identify the cable company, two of the digits may identify the cable event to be purchased (or canceled), and two digits may be used as a password. It will be understood that these are purely illustrative, and that wide variation can occur.

As mentioned, the NNX or *85 message tells the telephone central office that it need not make a physical connection. This avoids overburdening the telephone plant. In response to receiving such an ANI transmission, the receiving telephone central office will collect and store data. Then, it will communicate by the system of the present invention with the cable headend station which has been ∓telephoned" and provide it with various information, including the telephone number of the cable subscribers who called, the user entered data, and various other information. In an area served by plural cable companies, the equipment at the telephone company central offices will send data, using the present invention, to the plural cable companies.

The object of the present invention is to provide a system which will receive information from the telephone company central offices and implement the impulse pay per view requests by cable subscribers in a satisfactory manner.

A related object of the invention is to provide a system having the ability to receive data from the telephone companies as fast as the information can be provided using the ANI passing systems.

Another object of the present invention is to permit the authorizations of the subscribers to be checked in real time.

A further object is to translate the telephone number of the cable subscriber (provided by the telephone company) into a cable subscriber code at a fast rate.

BRIEF DESCRIPTION OF THE DRAWINGS

In describing the various aspects of the present invention, reference will be made to the accompanying drawings wherein:

FIGS. 4A and 4B are diagrams of the telephone communication controller (TCC) located at the cable headend station.

FIG. 10 shows the phase inverted synchronous input-/output buffer system used in the system controller;

FIG. 11 is a sketch illustrating processing by the system controller, CATV encoder, and billing computer;

DESCRIPTION OF THE PREFERRED EMBODIMENT

Figure 1:
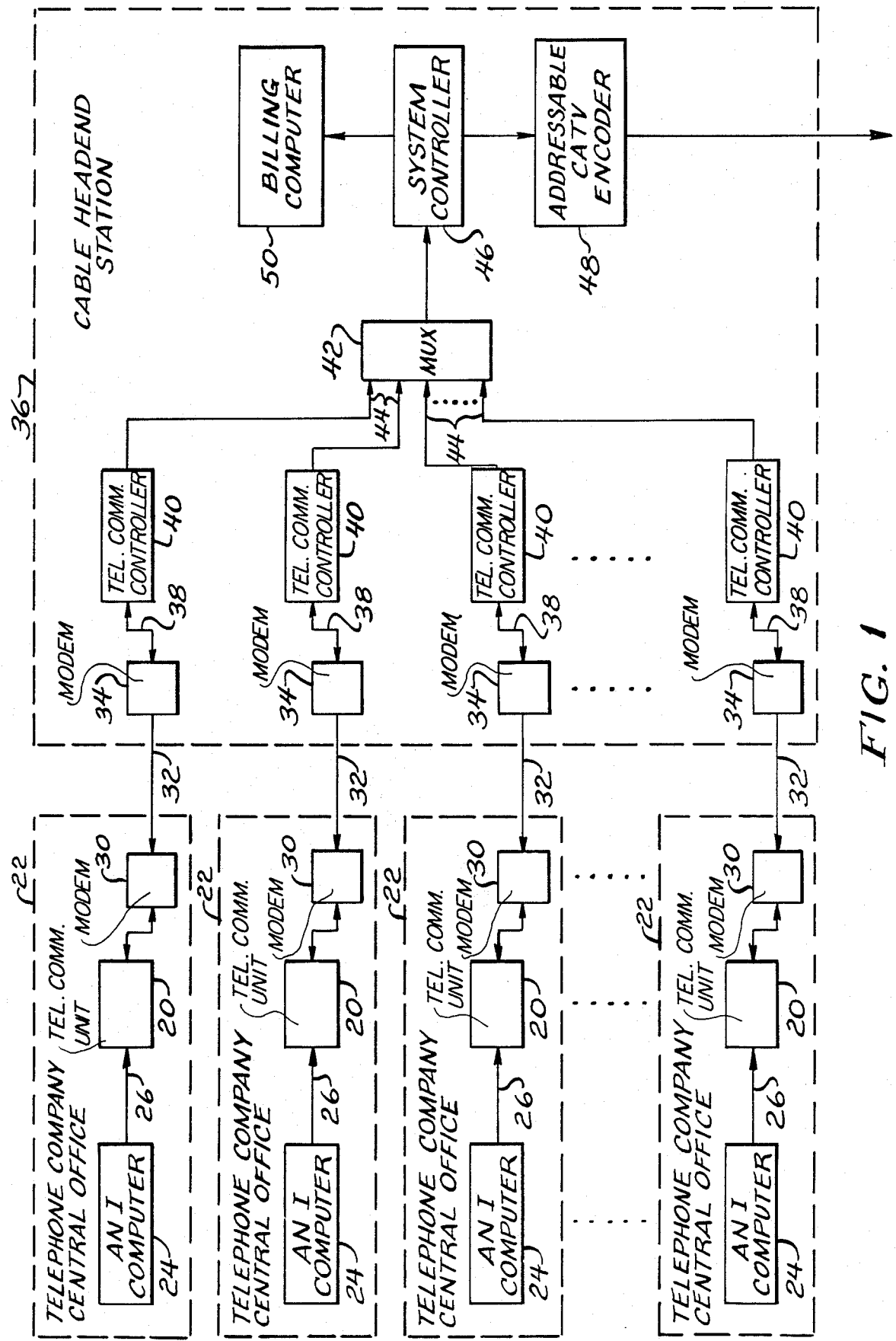
FIG. 1 is a block diagram of a system according to the present invention showing plural central offices and a headend station.

FIG. 1 shows a block diagram of a system according to the present invention. The preferred embodiment of the invention is the Zenith PHONEVISION system. As shown, the system comprises a plurality of telephone communication units (TCUs) 20 each located at a corresponding telephone company central office 22. Several central offices 22 are shown in FIG. 1 to indicate the several central offices of any metropolitan area. In the preferred embodiment of the present invention there may be as many as sixteen central offices. Also located at the telephone company central office is an automatic number identification (ANI) computer 24. The ANI computer is provided by the phone company and is activated upon receipt of a telephone call from a customer utilizing a special ANI telephone code. The ANI computer then provides specific information to its TCU on a cable 26.

Coupled to each telephone communication unit 20 is a corresponding modem 30. Modems 30 are coupled via leased telephone lines 32 or other communication channels to corresponding modems 34 located at a cable headend station 36. Each modem 34 is coupled by a cable 38 to a respective telephone communication controller (TCC) 40. The TCCs 40 are in turn coupled to a multiplexer 42 by a bus 44. Multiplexer 42 selects which one of the TCCs corresponding to the various telephone company central offices will supply data to a system controller 46. The system controller in turn is coupled to a cable TV encoder 48 as well as a billing computer 50.

In order to utilize the impulse pay per view system of the preferred embodiment described herein, a cable television subscriber would tune his addressable cable television decoder to the desired channel. The cable subscriber would then use his telephone to enter the ANI telephone code and then four or more digits. Two of the digits entered by the cable subscriber signify the particular IPPV cable event the subscriber wishes to view. Two of the other digits for illustrative purposes constitute a password number or could be used to identify which of a plurality of encoder units the subscriber wishes to enable for the desired cable event.

The telephone company central office 22 serving the cable subscriber's telephone area will be alerted by the ANI code so that when it receives the call, it will transform the "dialed" phone number (called the "destination telephone number") and other data into the so-called bulk calling line identification (BCLID) format by using the ANI computer. It will be understood that other protocols can be used by the telephone company, and that the present invention is not limited to the specific protocol adopted. In any event, the telephone company central office will not connect the incoming call from the cable subscriber to its local switch. Thus, the telephone company central offices will not become overburdened with the incoming calls from numerous cable subscribers who may all be calling on impulse to purchase a particular cable event.

The ANI computer at the telephone company central office will send the BCLID data (using seven bit ASCII code) to the TCU 20 located at the central office. The data is sent serially at 1200 baud in RS-232 format. The BCLID message contains ASCII characters representing the seven digit "destination telephone number," the ten digit origination telephone number, as well as considerable other data such as carriage return and line feed, a BCLID input/output message identifier, numerous ASCII spaces, the time of day in hours, minutes and seconds, the terminating line status and the calling line status indicator. The data sent in the telephone company's BCLID format is shown in Table I.

The "destination telephone number" carries the information entered by the cable subscriber. This will include the cable event which is to be purchased and the password. Ordinarily, this will comprise the last four of the seven digits entered by the subscriber, although any number of digits could be entered, and of these, any number could be dedicated to identifying the program to be purchased, a password, an identifier of which particular converter box at the subscriber's premises is to be used, and any other information deemed necessary or desirable by the cable company.

TABLE I

Format of BCLID Message Sent
By ANI Computer 24 to TCU 20

| <cr-lf>BCsaabbccssddddddddsoooooooooosfsgs<cr-lf> | |
|---|---|
| <cr-lf> | All messages start and stop with carriage |

TABLE I-continued

Format of BCLID Message Sent
By ANI Computer 24 to TCU 20

| | |
|---|---|
| | return line feed |
| BC | BCLID I/O message identifier |
| s | ASCII "space" |
| aa | Hours (24 hour format) |
| bb | Minutes |
| cc | Seconds |
| ddddddd | 7-digit "destination telephone number" |
| oooooooooo | 10-digit origination telephone number |
| f | Terminating line busy, idle status, ("0" = idle, "1" = busy) |
| g | Calling line DN multi-status indicator |

This data is sent by the ANI computer 24 to its corresponding TCU 20 asynchronously without handshaking, and can be a continual data stream.

The TCU 20 must be able to receive and transmit the data as fast as the ANI computer 24 can send it. To promote speed, each TCU 20 strips away unneeded data and temporarily stores the remaining data in a buffer. The stored data is then transmitted synchronously to the cable headend station using a telephone line 32. Preferably, a contracted synchronous data link control (SDLC) protocol is used for transmitting the data from each TCU 20 to its corresponding TCC 40 at the cable headend station. After the data has been transmitted to the headed station, the TCU 20 waits for an acknowledgement message from the headend TCC 40 before transmitting the next data packet. If no acknowledgement or a negative acknowledgement message is received, TCU 20 retransmits the previously transmitted data packet. The TCU 20 provides for error free transmission to TCC 40 with no data loss. Since much of the unnecessary information of Table I is removed, as will be described, by the TCU 20, and due to the buffering occurring at each TCU 20, each TCU 20 is able to operate at a rate fast enough to keep up with ANI computer 24. Each TCU 20 also provides for conversion of the BCLID data received from the phone company to the modified SDLC protocol format.

Figure 2:
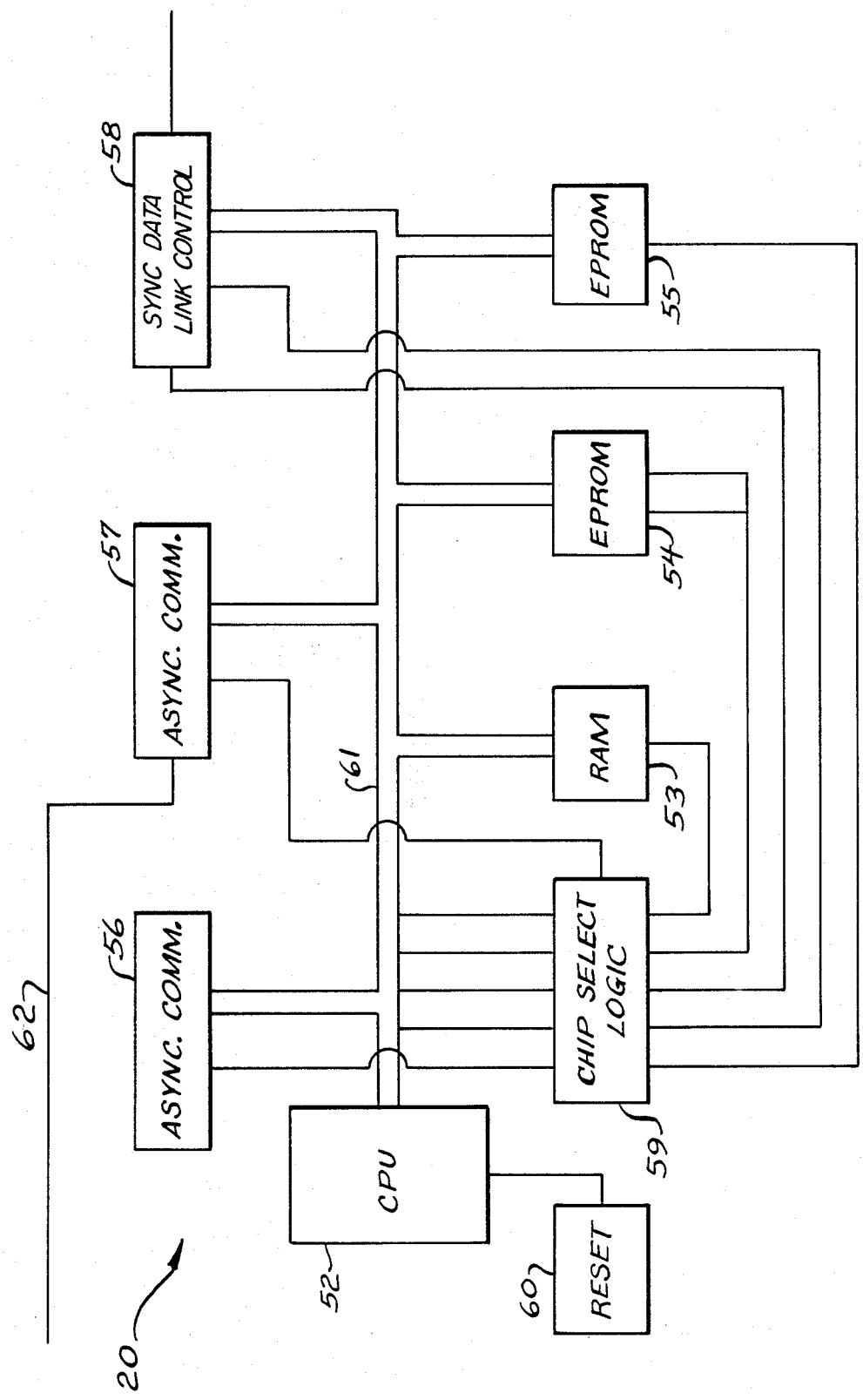
FIG. 2 is a block diagram of one of the several telephone communication units (TCUs)

A block diagram of a TCU 20 located at one of the telephone central offices is shown in FIG. 2. It includes an Intel 8085 central processing unit ("CPU") 52, a 4K×8 static RAM 53, a 16K×8 EPROM 54, a 4K×8 EPROM 55, two Intel 8250 Asynchronous Communication Elements 56, 57, an Intel 8273 programmable HDLC/SDLC protocol controller 58, chip select logic 59 and watchdog reset circuitry 60. A sixteen bit address and eight bit data bus 61 provide communication among the various components of TCU 20. The serial data from the telephone office ANI computer 24 is applied to a serial data input pin of communication element 57 by a line 62 which is coupled to cable 26 through a line receiver (not shown). The equipment on this board, according to the preferred embodiment, has two asynchronous channels and one synchronous channel.

The CPU 52 in the preferred embodiment illustratively operates at four megahertz. Its instruction code is stored in EPROM 54. The EPROM 55 may contain look-up tables. RAM 53 is used to buffer data packets, for stack purposes and for program use. Chip select logic 59 is used to determine whether the read or write operation is required of the memory mapped devices and to determine the exact device being addressed.

As mentioned, once the data from the telephone office ANI computer 24 is received, TCU 20 strips away unwanted data. The data that is kept is the seven digit (illustratively) "destination telephone number" entered by the cable subscriber (which includes the data the cable event to be purchased), the ten digit phone number of the cable subscriber, the terminating line status and the calling line indicator. These nineteen characters are ASCII characters, and are temporarily stored or buffered in RAM 53 to await transmission to the corresponding TCC 40 at cable headend station 36.

Figure 3:
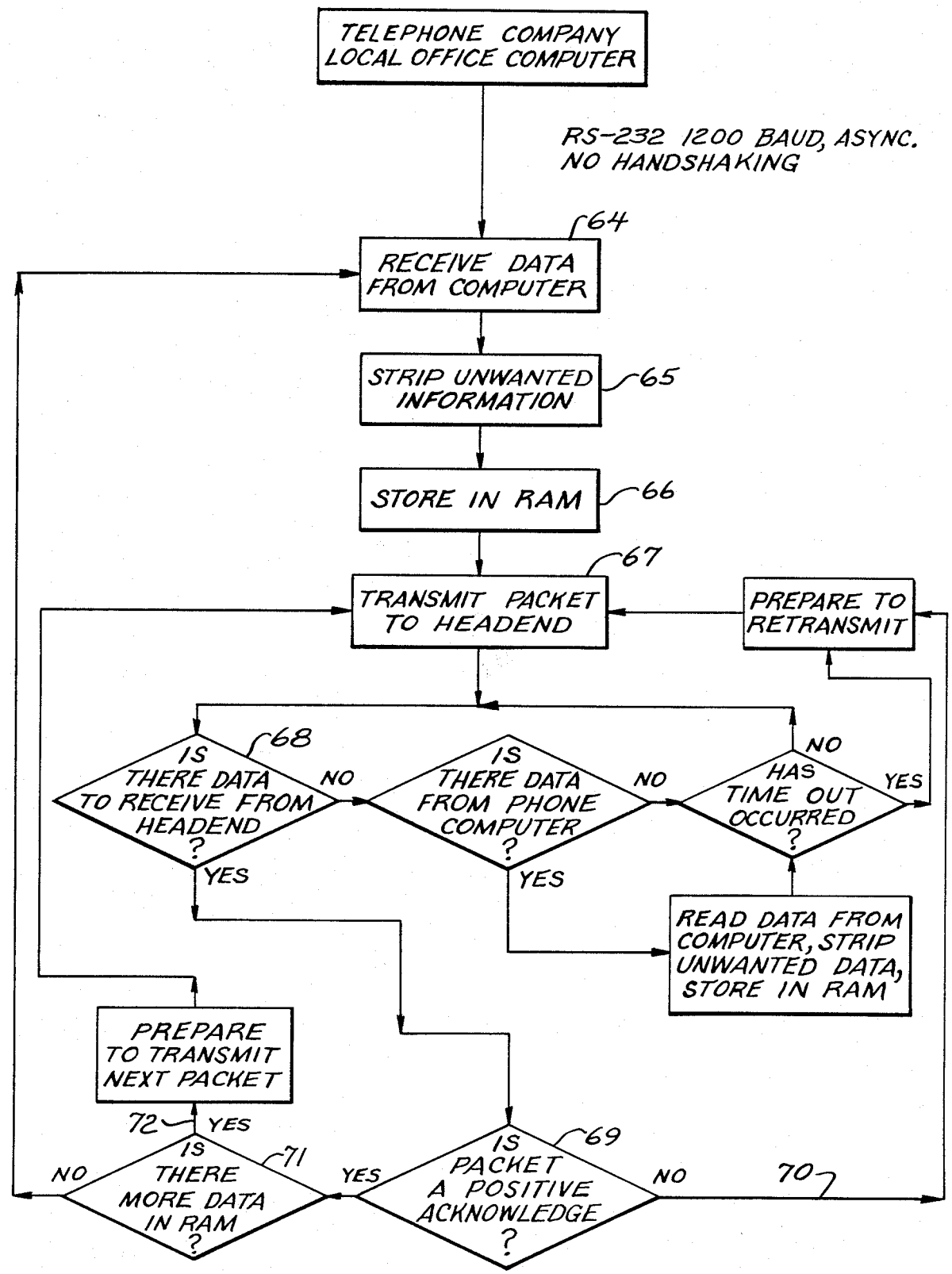
FIG. 3 is a flow chart of the TCU software.

FIG. 3 contains a flow chart of the software which controls the inputting of data from the telephone office ANI computer 24 and the outputting of data to the cable headend TCC 40. A listing of the TCU software is contained in Appendix I. Referring to FIG. 3, after data is received from ANI computer 24 at block 64, unwanted data is stripped, temporarily stored, and then sent in packets to the headend unit as shown at blocks 65, 66 and 67. Then TCU 20 determines at decision diamonds 68 and 69 whether a positive acknowledgment has been received from the headend. If not, retransmission of the data packet occurs, as indicated by route 70. If there is stored data in RAM 53, determined at diamond 71, further data packets are sent to the headend, as indicated by route 72. Otherwise, data continues to be received, as always, and put into a buffer (RAM) until processed.

The nineteen ASCII characters sent by TCU 20 to its TCC 40 are sent via a line using a contracted SDLC protocol which is reflected in Appendix I. Briefly, however, the SDLC protocol is modified to preserve the package format, zero bit insertions, and the frame check sequence ("FCS code"), with all else eliminated. The data is sent synchronously, serially, at 1200 baud, and is RS-232 compatible. Handshaking is used, so that for every packet sent from the TCU 20, a positive acknowledgment is required in the preferred embodiment before the next packet is transmitted. Table II shows the illustrative message format of the data sent from a TCU 20 to its TCC 40. Table III shows the illustrative acknowledgment message sent from a TCC 40 to its corresponding TCU 20.

TABLE II

Message Sent From
The TCU To The TCC

[address] [packet ID]NNXDDDDAAACCCCLLLYZ[FCS] [FCS]

[ ] denotes an 8-bit quantity
address = FF hex
NNX = ANI identifier, e.g., *85 or 1st 3 digits of destination phone no.
D = User data
A = Area Code
C = First 4-digits of subscriber's phone number
L = Last 3-digits of subscriber's phone number
Y = Terminating line status (line busy or not)
Z = Calling line indicator (public line or private branch exchange)
[FCS] = Frame check sequence for error checking

TABLE III

Acknowledgment Message
Sent From The TCC 40 To The TCU 20

[address] [packet ID] [acknowledgment byte] [FCS] FCS]

acknowledgment byte = C3 hex for NACK
= A5 hex for ACK
[ ] denotes an 8-bit quantity It will be understood that these processes occur at each of the several central offices of the telephone company serving the cable companies areas. The system as described so far collects data in real time. The collected data are the requests of subscribers, and this is achieved using a system compatible with ANI passing. Data is sent from multiple telephone central offices to a cable headend station. The data provided includes the subscriber's telephone number and his request, which is couched in the destination telephone number.

Turning now to the cable headend station 36, the basic functions of each TCC 40 in the preferred embodiment are to receive data packets from the several telephone central offices 22, store the data temporarily, perform some conversions into binary and BCD, reformat the data, and communicate it quickly to system controller 46 via temporary storage in multiplexer 42. As seen in FIG. 1, there are several TCC units 40 corresponding to the several telephone central offices 22.

Figure 4A:
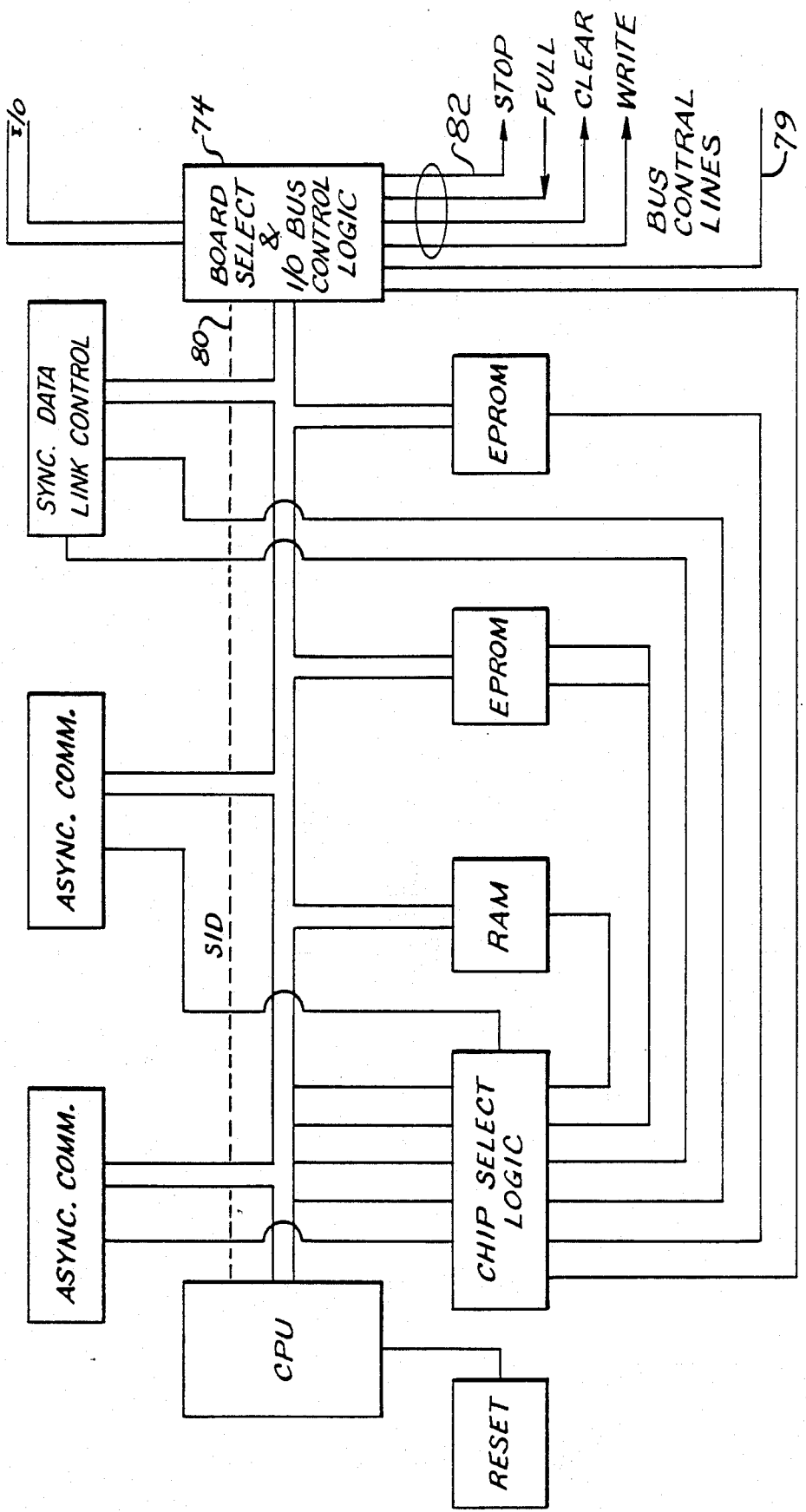

A block diagram of an illustrative TCC 40 located at the cable headend station 36 is shown in FIG. 4A. The same components are used in the TCC 40 as in the TCU 20, and in the same configuration. As with TCU 20, this board has asynchronous and synchronous capability. In TCC 40, the synchronous ports of the Intel 8250 chips are used. Each TCC 40 additionally includes a board select and I/O bus control logic circuit 74 shown more particularly in FIG. 4B. This circuitry illustratively comprises two Intel 8255 programmable peripheral interface (PPI) chips represented by 75, an eight bit transceiver 76, a four bit magnitude comparator 77 and a four pole DIP switch 78. Switch 78 is used to set the select address of the particular TCC. For example, the first TCC would have all four poles of the switch arranged so that each outputs a logic "0." The switch outputs are connected to one side of the magnitude comparator, and the other side of the comparator is coupled to four board select lines 79 coupled to multiplexer 42. When comparator 77 sees a match in its two inputted values, it generates a match signal that is inputted via a serial input data (SID) line 80 to the CPU of FIG. 4A alerting it that the TCC board is being offered the opportunity by multiplexer 42 to output data.

The I/O control logic part of circuit 74 handles the outputting of eight bit parallel data sent to multiplexer 42. In order to transfer data from TCC 40 to multiplexer 42, a check is made to ensure that multiplexer 42 is ready to receive a data byte. Then transceiver 76 (FIG. 4B) is enabled by the one of PPI chips 75. The data to be transferred is then written into the same PPI chip. If multiplexer 42 is ready, the data byte is strobed into the multiplexer by performing a write operation. Four bus control lines 81, 82, 83 and 84 (CLEAR/RESET, STOP, FULL, WRITE) are used to check if the multiplexer is ready for data and to strobe the data into the multiplexer.

Figure 4C:
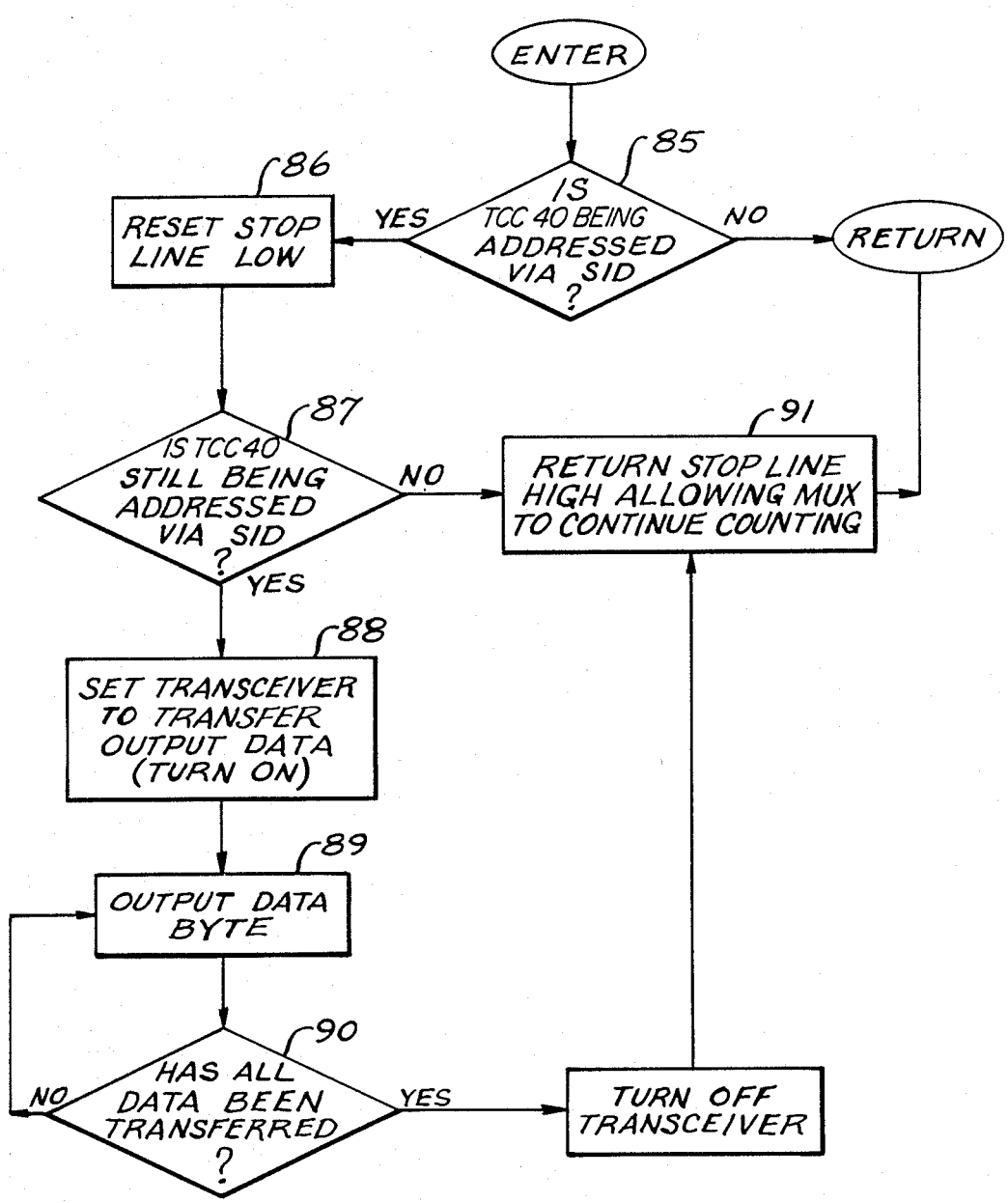
FIG. 4C is a flow chart of part of the TCC operations pertaining to adaptive window multiplexing.

This process can be referred to as part of what is referred to herein as "adaptive window multiplexing" wherein multiplexer 42 addresses in sequence each of several TCCs 40, any of which may or may not have data to output. However, the time allotted to any one TCC is not fixed, as in conventional multiplexing. For the most part, the time taken by any single TCC 40 depends on how much data, if any, needs to be sent from that TCC 40 to multiplexer 42, subject to limitations of the memory used for buffering in the multiplexer, as described infra. Referring to FIG. 4C, multiplexer 42 provides address outputs in sequence. The CPU on each TCC 40 looks for its own address (i.e. the address of its board) being issued by the multiplexer, as indicated by diamond 85. The CPU will know whether it has any data (stored temporarily in RAM) to send. If there is such data, then when the CPU sees its address issue, it will stop multiplexer 42 from progressing to the address of the next TCC in sequence by bringing the STOP line 82 low, indicated by block 86. A short time later (interposed for example by the execution of a few instructions), the CPU ON TCC 40 checks to make sure that the address at which multiplexer 42 did stop is indeed the address of this particular TCC 40 (diamond 87). If so, then the CPU will cause a fast data transfer (at a rate of 56K bytes/sec) to the multiplexer (block 88, 89, 90). If the address is wrong, then the CPU will release STOP line 82, and thereby multiplexer 42, and not send data (block 91). This is a double check to ensure that only one TCC 40 sends data to the multiplexer 42 connected to bus 44. In FIG. 4B, bus 44 comprises lines 79 and 81 to 84.

Figure 5:
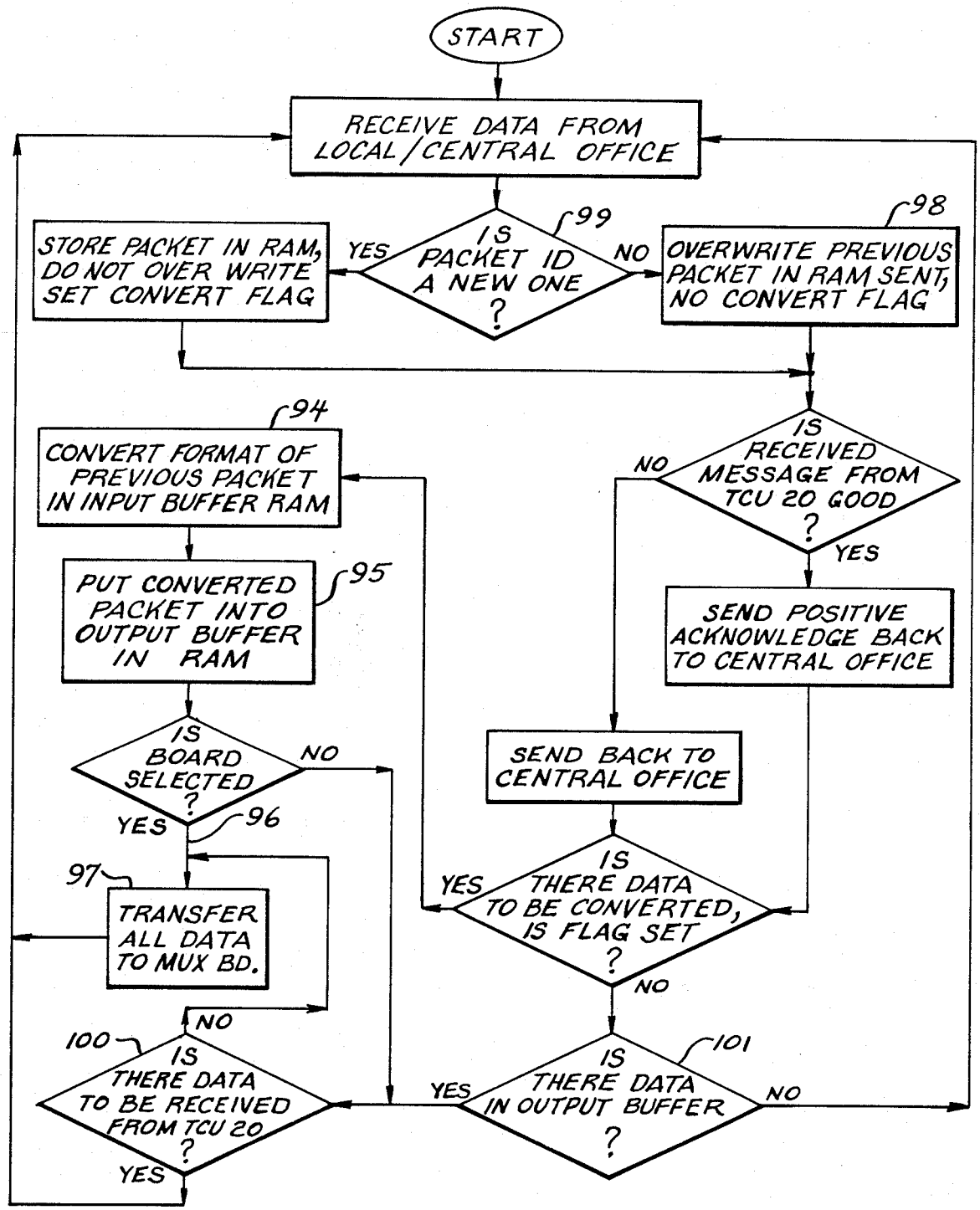
FIG. 5 is a flow chart of the TCC software.

As stated, each TCC 40 has circuitry 74 not included in any of the TCUs 20. While each TCC 40 uses different software than the TCUs, both the TCU and the TCC program is stored in the 16K×8 EPROM, and the 4K×8 RAM is used to buffer data, for stack purposes and for program use. The RAM has a portion which is used as an input buffer and another portion used as an output buffer. A flow chart of the software used in the TCC of FIG. 4A is shown in FIG. 5. A listing of the TCC software is contained in Appendix II.

An important function of each TCC 40 in the preferred embodiment is to convert the ASCII data received from its corresponding TCU 20 into a format more readily usable by the system controller 46, which preferably is a Hewlett-Packard HP-1000 computer. The conversion occurs at block 94 of FIG. 5. The last three digits of the originating phone number (LLL in Table II) are converted into a ten bit binary number. The first four originating digits (CCCC in Table II) are converted into a fourteen bit binary number. The area code of the originating phone number is converted into a two bit binary number (it being assumed that no more than four area code regions are covered by the several telephone central offices which serve the subscribers of the cable operator). The numbers entered by the cable subscriber (DDDD in Table II) representing the cable event and the password are converted into binary coded decimal (BCD) values.

The following example illustrates the novel conversion of a three digit ASCII number to a ten bit binary number. In this example "h" following a number indicates that hexadecimal base is used and "d" indicates that the number is a decimal number. The number to be converted is 0110100 (34h) 0110011 (33h) 0110010 (32h), i.e. 432d. The least significant ASCII digit (i.e., the decimal "2" in the "ones" decimal column) is converted into its binary equivalent by subtracting 30h from the digit: 32−30=02h. The second ASCII digit (the next most significant digit, i.e. the "3" in the "tens" column) is then converted to binary with tens-place weighting. This is converted to binary as in the previous conversion, i.e. 33h−30h=03h. Then the base address of a look-up table stored in an EPROM in TCC 40 for the tens units is added to this value in order to find an address in the look-up table. Then, using this address, a value is obtained from the look-up table. For the number 03h in the tens place, the value read from the look-up table is 1Eh (30d). This is a weighted conversion process. The same weighted conversion process is used for the third ASCII digit, but with different weighting. For 04h (34h−30h) in the hundreds place, the look-up table value is 190h (400d). The hexadecimal values are then combined: 190h+1Eh+02h=1B0h (432d). The conversion process for a four digit ASCII number is similar to the process explained above except, of course, thousands-place weighting is also used.

The following is an example of a conversion of a three digit ASCII value area code to a two bit binary number. In this example "b" following a number indicates that the number is in binary, and again "h" indicates hexadecimal. The area code to be converted is 33 31 32, i.e. 312d. The first ASCII digit is converted into a hexadecimal value by subtracting 30h (32h−30h=02h=00000010b). The second digit is converted in the same manner (31h−30h=01h=00000001b) and this value is rotated left four places (00000001b→00010000b). The first and second values are then combined, and stored in a register of the CPU of the TCC 40 (00000010b+00010000b=00010010b=12h). The third ASCII digit is converted into a hexadecimal value to which the look-up table base address (F0h) is added (33h=30h=03h; 03h+F0h=F3h). The sum value is stored in a CPU register. The first and second register pair (F312h) contains the address where the desired two bit value is found corresponding to the 312 area code.

After the ASCII numbers are converted into the appropriate form, they are stored (block 95 of FIG. 5) in the output buffer portion of the on-board RAM of TCC 40 until multiplexer 42 indicates that it is ready to receive data (indicated at 96). In addition, the data to be sent to the multiplexer is arranged in a particular format by the TCC 40 before it is transferred. This is done so that when the data is eventually sent to system controller 46, it will be able to process the data without excessive manipulation. The format of the data sent to multiplexer 42 is shown in Table IV. As can be seen, the data is transferred (block 97) in eight bytes, each byte having eight bits. Note that byte 1 contains the two bit binary area code data as well as the first six binary bits of the converted last four digits of the originating phone number. Note also that zeros are inserted into a portion of byte 3 and in all eight bits of bytes 5 and 7.

TABLE IV

| | Data Sent To The Multiplexer From the TCC |
|---|---|
| BYTE 1: | [(2-bit area code) (1st 6-bits of CCCC)] |
| BYTE 2: | [remaining 8-bits of CCCC] |
| BYTE 3: | [000000 (1st 2-bits of LLL)] |
| BYTE 4: | [remaining 8-bits of LLL] |
| BYTE 5: | [00000000] |
| BYTE 6: | [8-bit event #] |
| BYTE 7: | [00000000] |
| BYTE 8: | [8-bit user pass word] |

C = One of the first 4 digits of subscriber's telephone number (now binary)
L = One of the last 3 digits of subscriber's telephone number (now binary)

Several steps are taken in each TCC 40 to ensure the reliability of data. The system overwrites (block 98) any data which is retransmitted (which can occur when a negative acknowledgment issues) (decided at diamond 99). This avoids excessive data. Note also that in this flow chart, if TCC 40 determines that data is to be received from its TCU 20 (diamond 100) then the TCC will postpone a data transfer, even if data is in the output buffer (decided at diamond 101). Thus, inputting has priority over outputting, to ensure against losing data.

The rationale is that inputted data and data ready for outputting can both be buffered. The data transfer rate on outputting is so high (illustratively 56K bytes/sec) that some delays can be tolerated to allow for inputting.

Figure 6A:
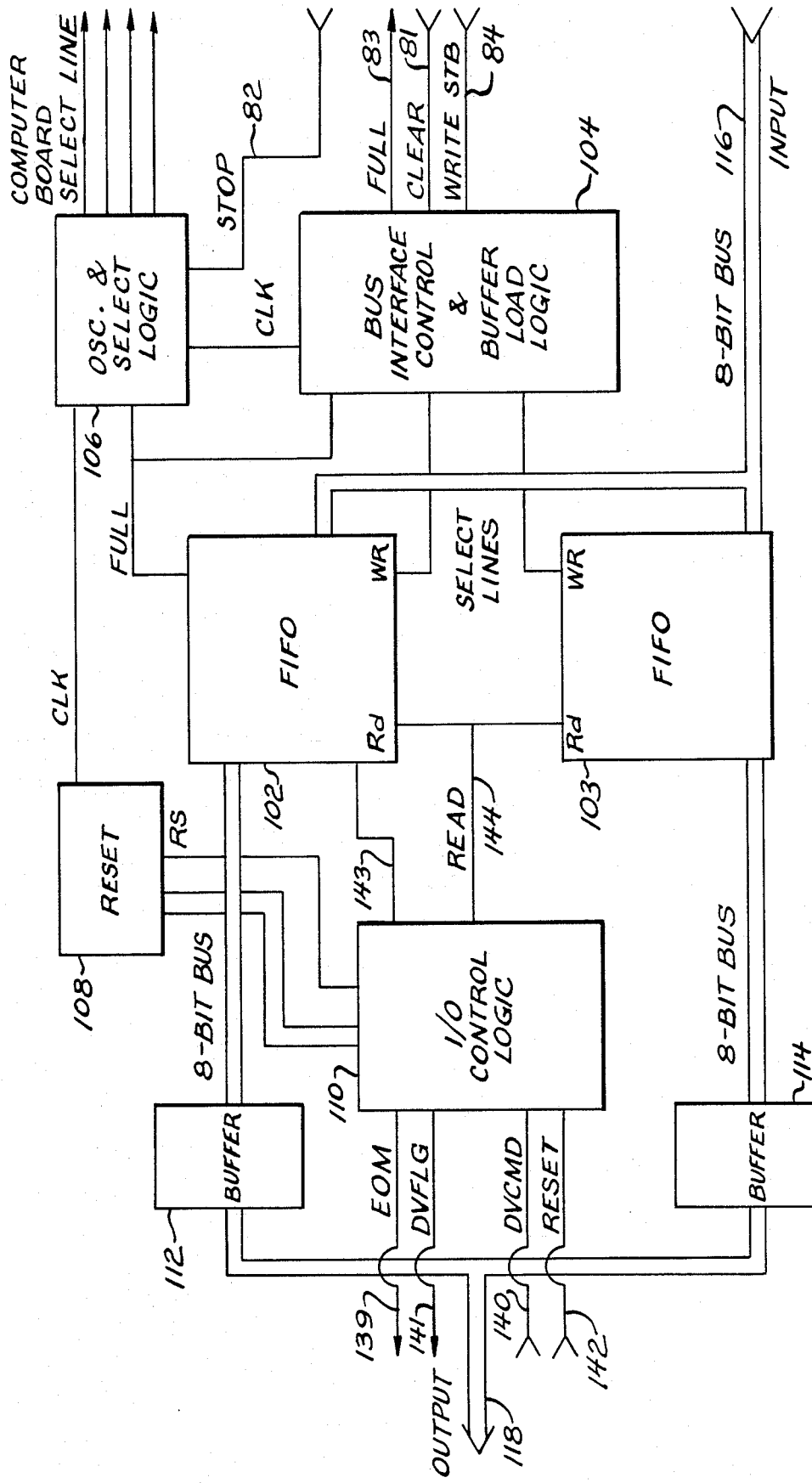
FIGS. 6A, 6B and 6C are diagrams of the multiplexer circuitry.

A block diagram of the preferred embodiment of multiplexer 42 is shown in FIG. 6A. The multiplexer performs three major functions, namely: (1) selecting one of the sixteen possible TCCs to receive data from at any given time, (2) buffering the received data until system controller 46 is ready to receive it, and (3) transferring the buffered data to the system controller.

Multiplexer 42 illustratively comprises two Mostek 4501 first-in, first-out (FIFO) dual port memory chips 102, 103, bus interface control and buffer load logic 104, oscillator and select logic 106, reset circuitry 108, input-/output control logic 110 and two output buffers 112 and 114. Data is received from TCC 40 on an eight bit data bus 116 and transmitted to the system controller 46 on a sixteen bit data bus 118.

Figure 6B:
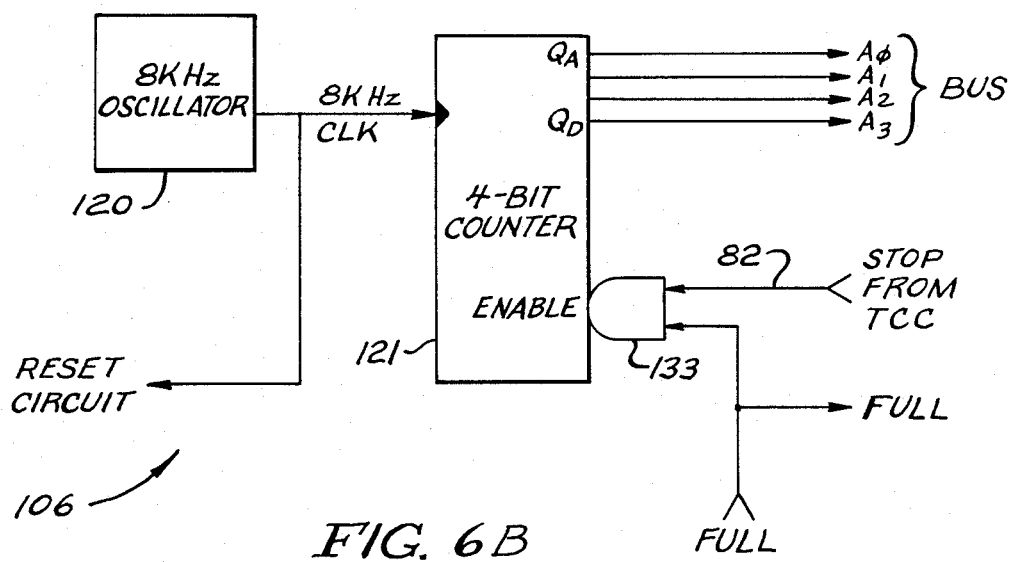

The oscillator and select logic 106, illustrated further in FIG. 6B, selects which one of the TCC units 40 data is to be received from. This oscillator circuitry may comprise a schmitt-trigger inverter with its output looped back to is input through a low-pass filter to form an 8 KHz oscillator 120 (FIG. 6B). This clock signal is used to perform dummy read operations during a system controller request for reset and to increment a board select counter. The board select counter of circuit 106 is illustratively a four bit binary counter 121 with its Enable control coupled to a single stop line 82 which in turn is coupled to all sixteen of the TCC units 40. Counter 121 continually cycles from 0 to 15 until halted by any of the TCC 40 requesting a data transfer by taking stop line 82 low. Once the data transfer is completed (i.e., the output buffer portion of the RAM in the TCC of the addressed TCC has been emptied), stop line 82 is returned high by such TCC 40, and counter 121 is allowed to resume its counting in order to address the next TCC in sequence. As shown in FIG. 5, if there is no data in the output buffer of the addressed TCC (decision diamond 101), then such TCC will not seize the opportunity to write data onto the eight bit bus 116 (FIG. 6) coupled to multiplexer 42. Instead, such TCC 40 will continue receiving and processing synchronously sent packets of data from its TCU 20 and will permit multiplexer 42 to address the next TCC 40 in sequence. Thus, the length of time or the window during which data is received by the multiplexer from a particular TCC adapts according to the amount of data in the TCC output buffer available at the time for transfer, as part of the adaptive window multiplexing technique.

Figure 6C:
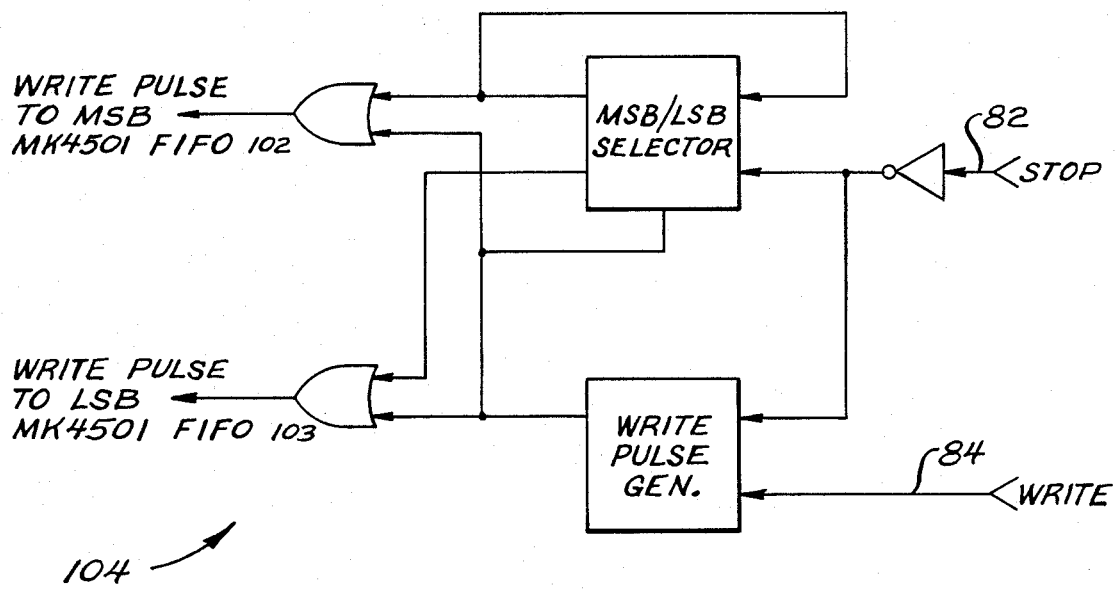

Bus interface control and buffer load logic 104 is responsible for strobing data from a TCC 40 into the correct FIFO buffer 102 or 103. This circuitry is illustrated in FIG. 6C and inserts all of the odd number bytes, i.e. bytes 1, 3, 5 and 7 received from a TCC 40 into FIFO 102 and all of the even number bytes, i.e. bytes 2, 4, 6 and 8 into FIFO 103.

Figure 7:
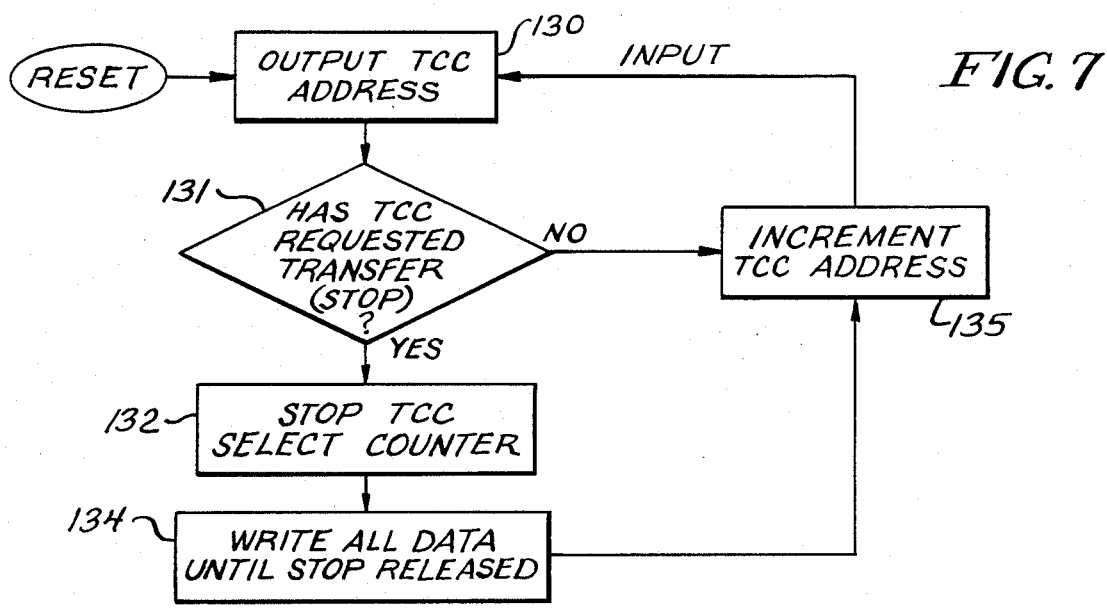
FIG. 7 describes the inputting of data to the multiplexer from the TCC.

A flow diagram for multiplexer 42 describing the input of the data from the TCCs is shown in FIG. 7. As counter 121 increments, its output is sent on a four line bus (A0, A1, A2, A3 of FIG. 6B), as indicated at block 130 of FIG. 7. Multiplexer 42 then determines whether STOP line 82 has been brought low, at decision diamond 131, for a requested data transfer. If so, counter 121 is stopped (block 132; see also the logic circuit 133 coupled to the Enable input of counter 121 in FIG. 6B). Data is then written into FIFOs 102, 103 (block 134 in FIG. 7), and counting is resumed (block 135).

Figure 8:
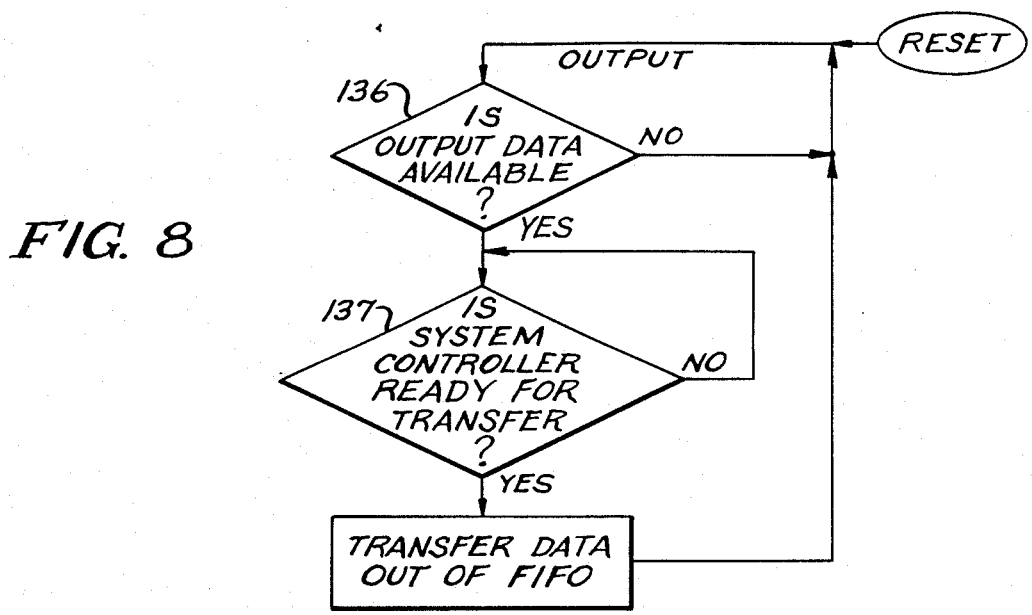
FIG. 8 describes the outputting of data from the multiplexer to the system controller.

The outputting of data from multiplexer 42 is shown in the flow diagram of FIG. 8. This includes determining whether multiplexer 42 has any temporarily stored data ready for outputting (diamond 136). Also a determination is made as to whether system controller 46 is ready for a transfer (diamond 137).

It should be noted that the inputting of data to multiplexer 42 is completely independent of the outputting of data from the multiplexer to system controller 46. This allows the telephone central office computers 24 and associated TCUs 20 to operate harmoniously with the system controller 46 at the headend station.

Referring again to FIG. 6A, the input/output control logic 110 performs the handshaking between the multiplexer and the system controller. The handshaking process uses four control lines and corresponding signals: an end of message (EOM) signal on a line 139, a device command (DVCMD) on a line 140, a device flag (DVFLG) on a line 141, and a reset signal on a line 142. Data is transferred from multiplexer 42 to system controller 46 on bus 118 in response to the DVCMD signal, meaning that system controller 46 is ready to receive data, and a FIFO empty (FE) line 143 from FIFO 102 indicating that data is available for transfer, i.e., the FIFO is not empty. At that time, a read line 144 to the FIFO is activated as is the DVFLG line 141 to system controller 46. Once three complete words have been transferred to system controller 46, the EOM control line 139 goes high, signalling that the next word to be transferred will be the last word (Word #3).

System controller 46 preferably is an HP-1000 computer, which reads four words at a time. To ensure against loss of data, the reset signal on line 142 (from system controller 46) forces multiplexer 42 to perform dummy reads from FIFO buffers 102, 103 in order to ensure completion of a four packet transfer. The dummy reads are performed until the EOM signal on line 139 is detected at which time the reset circuitry 108 is disabled and normal read operations are resumed.

Multiplexer 42 converts the eight 8-bit bytes received from each TCC 40 into four 2-byte words which are sent to the system controller at a rate of up to 2M bytes/sec. The conversion process is accomplished by combining the data words stored in the odd byte FIFO 102 with the data words stored in the even byte FIFO 103 to produce a single 2 byte (sixteen bit) word. The sixteen bit words are sent to system controller 46 on the bus 118.

Figure 9:
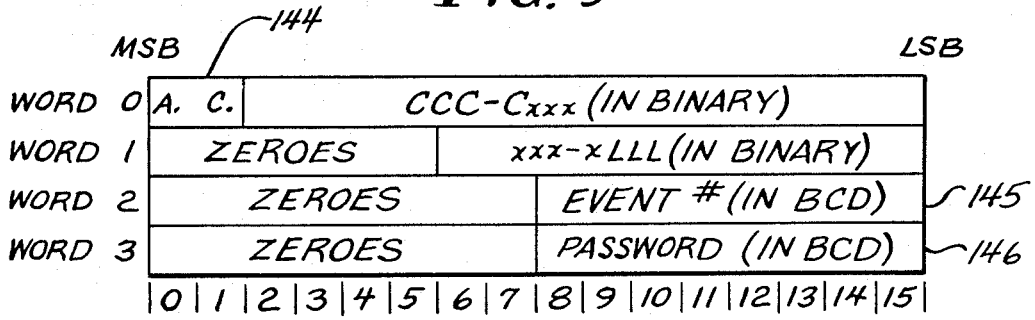
FIG. 9 shows the message format of the data sent from the multiplexer to the system controller.

FIG. 9 shows the format of the data words sent by multiplexer 42 to controller 46. The first two bits 144 of Word 0 represent the telephone area code of the cable subscriber originating the IPPV call. The area code was converted into the two bit format by a TCC 40. The number CCCC represents the first four digits (excluding the area code) of the cable subscriber's phone number, converted to binary by the TCC. The three Xs shown in Word 0 and the four Xs of Word 1 are used only to indicate the place of the numbers. The number LLL in Word 1 represents the last three digits of the cable subscriber's phone number, but in binary form. The event 145 and password 146 in Words 2 and 3, respectively, are the numbers entered by the cable subscriber to select a particular cable event. These numbers were converted to BCD (binary coded decimal) by the TCC 40 which processed the data.

By comparing the data format in FIG. 9 with Table IV, it can be seen that Word 0 sent from the multiplexer 42 to the system controller 46 is made up of bytes 1 and 2 sent to the multiplexer from TCC 40. Likewise, Word 1 is made from bytes 3 and 4, Word 2 is made from bytes 5 and 6, and Word 3 is made from bytes 7 and 8. The data sent to system controller 46 is sent in the format shown in FIG. 9 so that the system controller can process the information without extra manipulation. This speeds up the rate at which a cable subscriber's one-way addressable converter is authorized after the subscriber places an IPPV call.

System controller 46 processes the four sixteen bit words of FIG. 9 to identify the cable subscriber, find the subscriber's decoder address, and change the decoder authorization to allow viewing of the program selected by the subscriber (or to implement a cancellation at the subscriber's request). The system controller also initiates proper billing of the transaction by sending information to billing computer 50.

The four words sent to the system controller are sent directly to the buffer memory of the controller using direct memory access (DMA). In order to process the data sent to it at the fastest possible rate, system controller 46 employs a phase inverted synchronous input/output process using four buffers, two for input and two for output. FIG. 10 show a diagram of this buffer system. While an input buffer 147 is receiving data from multiplexer 42, an output buffer 148 is outputting data to the cable TV encoder 48 or the billing computer 50. Concurrently, data from an input buffer 149 is being processed and sent to an output buffer 150. These concurrent processes are represented by the solid and broken lines in FIG. 10. When the data in input buffer 149 is exhausted, output buffer 150 receives data from other sources until it becomes filled. During this time, output buffer 148 continues to output data. When buffer 148 no longer has data to output, system controller 46 is interrupted, and the buffer arrangement is inverted. The inputting, outputting and processing after the interrupt is shown by the broken lines in FIG. 10. After the interrupt, data is inputted into input buffer 149; output buffer 150 sends data to cable TV encoder 48 or billing computer 50; and data from input buffer 147 is processed and sent to output buffer 148. This alternating process is continually repeated to ensure that processor 46 does not waste time waiting for data to be inputted or outputted.

As mentioned, system controller 46 processes the four words sent to it by multiplexer 42 to locate ("map") the address of the one-way addressable converter for the cable subscriber initiating the IPPV call, to check the password entered by the cable subscriber and to change the authorization code in the cable subscriber's converter in order to allow him to view the cable event. FIG. 11 is a diagram which should be helpful to understand the processing which occurs at system controller 46, addressable CATV encoder 48 and billing computer 50. Data from multiplexer 42 is applied to one of the input buffers of FIG. 10 which is represented as a buffer 151 in FIG. 11 receiving an input via line 152. The inputs comprise the four words depicted in FIG. 9. These four words are used to determine the action which is to occur. Words 0, 1 and 3 are used to map the telephone number of the subscriber into the address code of his converter, as shown at 154. Referring back to FIG. 9, it will be seen that Word 0 comprises the area code and part of the telephone number of the subscriber, and Word 1 completes the telephone number of the subscriber. At 154, system controller 46 finishes mapping the telephone number to the unique address code of the converter of the cable subscriber. Word 3 is used to make sure that the password is valid or, alternatively, to determine which of several converters are to be authorized at the premises of the cable subscriber. In this mapping function, system controller 46 refers to a data base 156, discussed infra. In the event that system controller 46 cannot map the telephone number into a converter code (because, for example, of a wrongfully dialed telephone number), an error is generated at 158. That error can also be generated if the data base reflects the unavailability of the event for purchase by that particular subscriber, because of bad credit, tardy bill payments, or whatever reasons are considered to be adequate by the cable company.

Word 2 of FIG. 9 identifies the cable event which the cable subscriber wishes to purchase or to cancel. Word 2 is applied at 160 to determine the action which is requested by the subscriber. The system provides for the subscriber to either request a pay per view cable event or, if he wishes, to cancel it within a prescribed time. Referring to a schedule 162, the determination is made as to whether the cable event is requested to be turned on or off. If no such cable event is found in the schedule 162, an error 164 will be generated. Assuming that there are no errors in the determinations 154 or 160, then an authorization to program the cable subscriber's converter as well as a program tag and a program identification are provided to an output 166. From there, the information is provided to an output buffer 168 which holds information until the CATV encoder 48 processes it.

Figure 12:
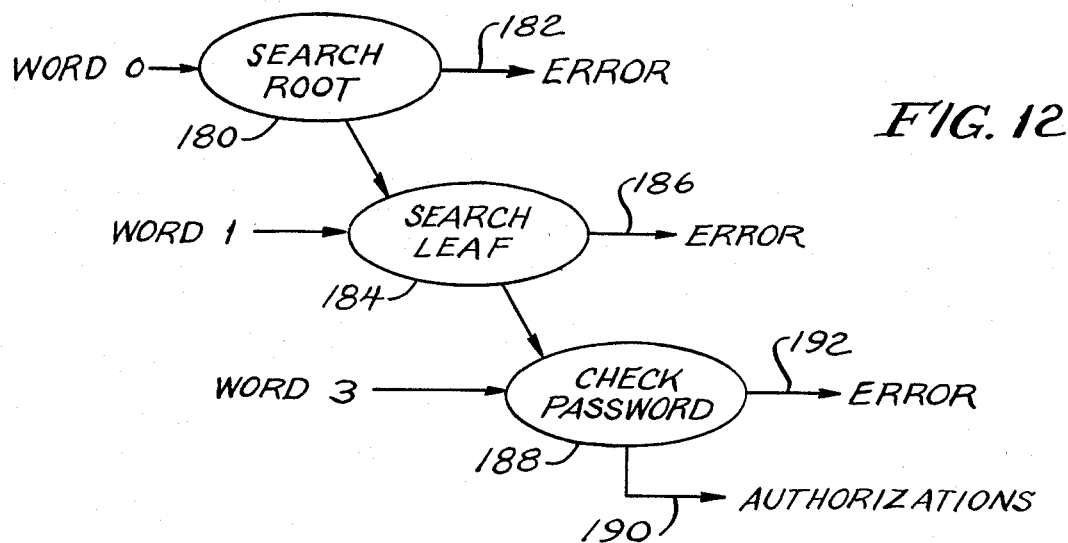
FIG. 12 is a sketch showing the two level searching used in the mapping algorithm applied in the system controller.

In addition, from the output 166 information including the converter indentification, the program identification, and a timestamp are posted to a disk at 170 within system controller 46. Subsequently, these postings are unloaded to billing computer 50, typically on the next business day. Billing computer 50 had editing capabilities via a line 172 with data base 156. Thus, if desired by the cable company, the billing computer can edit the data base so that no cable subscriber can exceed some limitation per month on cable pay per view events. Also, the system can provide in this manner for preventing any pay per view events from being purchased by a cable subscriber while permitting normal cable operation. This will be determined by the policy of the cable company, but the present system provides the flexibility to achieve all objectives of the cable company. FIG. 12 further illustrates the mapping process occurring in system controller 46. To map the telephone number of the subscriber into an authorization code, system controller 46 preferably uses a two level tree having a root and many leaves. In the preferred system, a root corresponds to one page of memory (which is 1024 words, each 16 bits) and each leaf also is one page of memory. The root uses table searching. Thus, in FIG. 12, Word 0 is used to search the root at 180. The root usually has between 10 and 50 entries, which corresponds to the fact that the first four digits of a seven digit telephone number used by the telephone company occur in selected groups. In other words, there is a limitation used by the telephone company so that although four digits are used, there are fewer than 10,000 numbers which are actually assigned, although 10,000 are theoretically possible. This root is sometimes referred to as the PHIN root, standing for "phone index." In the event that the searching at 180 does not locate the number which has been specififed by Word 0, than an error is indicated as shown at 182. However, if the root is found at 180, then Word 1 is used to search the leaf at 184. The leaf has many parts, the Word 1 is used to arrive at a correct pointer stored in the leaf. This method is referred to as direct indexing by persons skilled in the art, and is a time efficient method. The pointer will lead to the correct information for the converter of the cable subscriber who telephoned his request. In the event that the direct indexing does not locate the pointer, then an error is indicated at 186. If the pointer is found, then Word 3 is used to check the password at 188. If the password matches, then authorization can be provided at 190. If, however, the password does not match, then an error will issue at 192.

Figure 13:
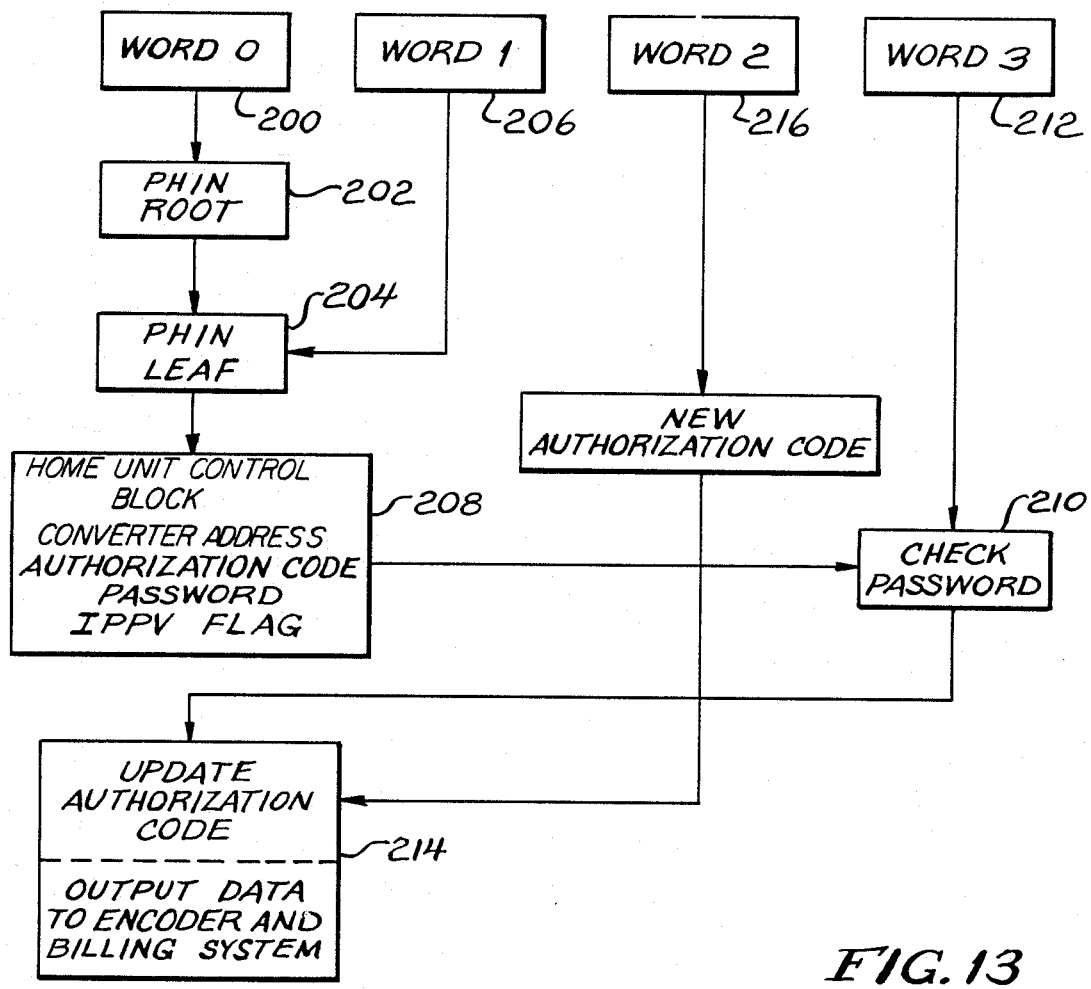
FIG. 13 illustrates further how the four words sent to the system controller are processed.

FIG. 13 illustrates the processing of the four words of FIG. 9 more particularly. Word 0 at block 200, containing the two bit area code and the fourteen bit number group corresponding to the first four digits of the cable subscriber's telephone number, is used to locate within a phone index (PHIN) root 202 one of several leaves 204. Word 1 at block 206 containing the ten bits corresponding to the last three digits of the cable subscriber's telephone number is used to find the particular slot in the phone index leaf 204 containing a pointer to the unique data of interest. This points to a block 208 which contains the home unit control block (HUCB) comprising the cable subscriber's one-way addressable converter address, the current authorization code for the cable subscriber, a password and an IPPV flag. The password is then read from the home unit control block and compared at block 210 with the password contained in Word 3 which is represented by block 212. If the two passwords match, the home unit control block authorization bits are then updated at block 214 with the event number contained in Word 2 (in block 216). The new home unit control block information is then sent out to the cable subscriber's converter so that the converter will be enabled, thus allowing the viewer to view the program selected by the IPPV call. System controller 46 also downloads the necessary information to billing computer 50 so that the cable subscriber will be billed for the IPPV event.

Thus, it will be appreciated that at the cable headend station, data from multiple telephone offices are gathered, mapped into addresses and converter authorization codes (provided no errors are found), posted for billing purposes, and encoded for nearly instant updating. The mapping for each request preferably occurs in more than one step at plural locations, so the burden on the system controller is eased. As described herein, each TCC 40 converts ASCII characters for received phone numbers into binary data, and converts the ASCII characters identifying the PPV event to be purchased as well as the password into BCD. At the system controller, these data are mapped fully into converter addresses and program tags.

By the system of the present invention, there is provided a system for accepting impulses purchases from cable subscribers who do not have two-way cable TV systems. The described system is compatible with ANI passing, and accepts information provided by the telephone office ANI computer as fast as the computer can supply it. The data is automatically translated into a form usable by the system controller and communicated at a fast rate. Appropriate error checking occurs along the entire stream of data flow to ensure reliability. The requests of the cable subscribers are checked in real time, and barring any reason to forbear, the cable subscriber's cable TV addressable converter is authorized to allow the subscriber to view or cancel the cable event as desired. After the cable event is completed, the system controller clears the data base of the authorizations.

It will be appreciated from the foregoing discussion that the device at the subscriber premises, which has been variously described as a "converter," "converter box," or "decoder," and which has been said to be able to descramble signals, may generally be referred to as an "access terminal unit."

It will be apparent that numerous modifications can be made within the scope of the present invention. The arrangement described herein is illustrative, and the scope of protection is indicated by reference to the following claims.

```
LOC   OBJ       LINE       SOURCE STATEMENT

1  ;;;;;;;;;;;;;;;;;;;;;;;;;;;;;;;;;;;;;;;;;;;;;;;;;;;;;;;;;;;;
               2  ;        COPYRIGHT 1985 ZENITH ELECTRONICS CORP.
               3  ; THIS PROGRAM WAS WRITTEN BY GORDON E. REICHARD ON 6/24/85.
               4  ; THIS PROGRAM IS CALLED TCU200, ALSO REFERRED TO AS Z-TCU200.
               5  ; THE PROGRAM PERFORMS THE FUNCTION OF RECEIVING SERIAL DATA FROM
               6  ; THE TELEPHONE COMPANY'S COMPUTER, STRIP AWAY UNWANTED DATA, AND
               7  ; TRANSMIT REMAINING DATA TO HEADEND.
               8  ;;;;;;;;;;;;;;;;;;;;;;;;;;;;;;;;;;;;;;;;;;;;;;;;;;;;;;;;;;;;
               9  ;
              10  ;
              11  ;;;;;;;;;;;;;;;;;;;;;;;;;;;;;;;;;;;;;;;;;;;;;;;;;;;;;;;;;;;;
              12  ; BEOW ARE THE EQUATE STATEMENTS USED TO ASSIGN LABELS TO
              13  ; HEXIDECIMAL VALUES.
              14  ;;;;;;;;;;;;;;;;;;;;;;;;;;;;;;;;;;;;;;;;;;;;;;;;;;;;;;;;;;;;
              15  ;
              16  ;
9000          17  ADATA   EQU   9000H         ;ASYNC  DATA PORT, 8250
9000          18  BAUDLS  EQU   ADATA         ;LSB OF BAUD RATE
9001          19  BAUDMS  EQU   ADATA+1       ;MSB OF BAUD RATE
9003          20  LCR     EQU   ADATA+3       ;LINE CONTROL REG. 8250
9001          21  DISINR  EQU   ADATA+1       ;DISABLE INTERRUPT REG. 8250
9005          22  ASTAT   EQU   ADATA+5       ;ASYNC STATUS PORT, 8250
4000          23  RAM     EQU   4000H
4000          24  BUFFER  EQU   RAM           ;IN AND OUT BUFFER
6000          25  SCMDRG  EQU   6000H         ;SYNC COMMAND REG. 8273
6000          26  SSTAT   EQU   SCMDRG        ;SYNC STATUS REG. 8273
6001          27  SPRMRG  EQU   SCMDRG+1      ;SYNC PARAMETER REG.
6001          28  RESULT  EQU   SPRMRG        ;RESULT REGISTER
6002          29  TXIR    EQU   SCMDRG+2      ;TRANSMIT INTERRUPT REG.
6003          30  RXIR    EQU   SCMDRG+3      ;RECEIVER INTERRUPT REG.
4FA0          31  POINTO  EQU   4FA0H         ;OUTPUT POINTER
4FA2          32  POINTI  EQU   POINTO+2      ;INPUT POINTER
7000          33  SDATAO  EQU   7000H         ;SYNC DATA OUTPUT, 8273
B000          34  SDATAI  EQU   0B000H        ;SYNC DATA INPUT, 8273
4FA4          35  INCOME  EQU   POINTI+2      ;INCOMING DATA PACKET PENDING
FF0C          36  COUNTS  EQU   0FF0CH        ;B AND C COUNTERS
4FA5          37  TXSTAT  EQU   POINTI+3      ;CURRENT 8273 X-MIT STATUS
4FA6          38  ACKFLG  EQU   POINTI+4      ;ACKNOWLEDGEMENT FLAG
4FA7          39  XMIT    EQU   POINTI+5      ;START ADDRESS OF X-MIT SET-UP
4FAC          40  CNTRL   EQU   XMIT+5        ;CONTROL FIELD FOR SDLC FRAME
4FAC          41  ID      EQU   CNTRL         ;PACKET ID NUMBER RAM LOCATION
4FAD          42  PACKET  EQU   POINTIZ+11    ;PACKETS REMAINING IN RAM
4FB0          43  ACKBYT  EQU   4FB0H         ;MEM. LOCATION OF TIME-OUT COUNTER
4FB1          44  CRTBUF  EQU   4FB1H         ;DATA HERE IS OUTPUT TO CRT
4FB2          45  STATUS  EQU   4FB2H         ;STATUS BYTE READ FROM 8273
4FB3          46  CURRENT EQU   4FB3H         ;CURRENT OUTPUT POINTER (ALSO 4FB4H)
4FB5          47  PTINP   EQU   4FB5H         ;RIGID INPUT POINTER, INCREMENTS OF 13H
```

```
4FB7              48 TIME   EQU    4FB7H         ;TIME OUT COUNTER
E000              49 RESET  EQU    0E000H        ;WATCH DOG RESET CIRCUIT ADDRESS
                  50        ;
                  51        ;
                  52 ;;;;;;;;;;;;;;;;;;;;;;;;;;;;;;;;;;;;;;;;;;;;;;;;;;;;;;;;;;
                  53 ; THIS BEGINS THE INITIALIZATION OF REGISTERS AND CHIPS.
                  54 ;;;;;;;;;;;;;;;;;;;;;;;;;;;;;;;;;;;;;;;;;;;;;;;;;;;;;;;;;;
                  55        ;
                  56        ;
0000              57        ORG    0000H
0000 F3           58        DI
0001 3E19         59        MVI    A,19H         ;ENABLE INTERRUPTS, 7.5 AND 6.5
0003 30           60        SIM                  ;SET INTERRUPT MASK
0004 210040       61        LXI    H,RAM         ;SET ALL POINTERS TO TOP OF RAM
0007 22B34F       62        SHLD   CURRENT
000A 22A24F       63        SHLD   POINTI
000D 22A04F       64        SHLD   POINTO
0010 22B54F       65        SHLD   PTINP
0013 C34000       66        JMP    BEGIN
                  67        ;
002C              68        ORG    002CH         ;RST 5.5
002C C30502       69        JMP    GETACK
                  70        ;
0034              71        ORG    0034H         ;RST 6.5
0034 C38E01       72        JMP    OUTDAT
                  73        ;
003C              74        ORG    003CH         ;RST 7.5
003C C31F01       75        JMP    DATAIN
                  76        ;
0040              77        ORG    0040H         ;BEGINNING OF MAIN PROGRAM
0040 310050       78 BEGIN: LXI    SP,5000H      ;SET STACK POINTER TO TOP
0043 CDD402       79        CALL   I82501        ;INITIALIZE 8250, IC1
0046 CD1703       80        CALL   I82502
0049 CDF802       81        CALL   I8273
004C CD6E03       82        CALL   IXMIT         ;SET-UP OUTPUT ARRAY
004F 3E0C         83        MVI    A,0CH         ;HEADER COUNT
0051 32A44F       84        STA    INCOME        ;STORE HEADER COUNT
0054 3E00         85        MVI    A,00H
0056 32AD4F       86        STA    PACKET        ;ZERO PACKET COUNT
0059 32AC4F       87        STA    ID            ;RESET ID NUMBER
                  88        ;
                  89        ;
                  90 ;;;;;;;;;;;;;;;;;;;;;;;;;;;;;;;;;;;;;;;;;;;;;;;;;;;;;;;;;;
                  91 ; THIS MARKS THE BEGINNING OF THE MAIN BODY OF THE PROGRAM.
                  92 ;;;;;;;;;;;;;;;;;;;;;;;;;;;;;;;;;;;;;;;;;;;;;;;;;;;;;;;;;;
                  93        ;
                  94        ;
005C 3EFF         95 MAIN:  MVI    A,0FFH        ;SET FLAG, NO ACKNOLEDGES EXPECTED
005E 32A64F       96        STA    ACKFLG
0061 2AA24F       97        LHLD   POINTI        ;LOAD HL WITH INPUT POINTER
0064 CDCA00       98        CALL   HLOOK         ;GET INPUT DATA PACKET ONLY
0067 CD7901       99        CALL   UP13          ;INCREMENT INPUT POINTERS TO NEXT INPUT BLOCK
006A 3E0C        100        MVI    A,0CH         ;SET-UP INCOME COUNTER FOR NEXT DATA INPUT
006C 32A44F      101        STA    INCOME
006F 3E01       102        MVI    A,01H         ;SINCE ONE PACKET HAS BEEN RECEIVED
0071 32AD4F     103        STA    PACKET        ;SET PACKET COUNT EQUAL TO 1
0074 F3        104 TXSTRT: DI                   ;DISABLE INTERRUPTS
```

```
0075 3E09        105         MVI     A,09H           ;ENABLE 7.5 AND 6.5
0077 30          106         SIM
0078 21A74F      107         LXI     H,XMIT          ;PREPARE TO TURN-ON TRANSMITTER
007B CD3903      108         CALL    CMDOUT          ;OUTPUT COMMANDS
007E FB          109 MLOOP:  EI
007F 3200E0      110         STA     RESET           ;HIT RESET CIRCUIT
0082 00          111         NOP
0083 C37E00      112         JMP     MLOOP           ;IF NOT, KEEP LOOPING
0086 21FFFF      113 ACKLOP: LXI     H,0FFFFH        ;SET-UP TIME-OUT COUNTER FOR 24MS
0089 22B74F      114         SHLD    TIME
008C 2AB74F      115 ACKLP2: LHLD    TIME            ;GET CURRENT TIME-OUT COUNT
008F 2B          116         DCX     H               ;DECREMENT THAT VLAUE
0090 22B74F      117         SHLD    TIME            ;STORE NEW VALUE
0093 7C          118         MOV     A,H
0094 A7          119         ANA     A               ;SEE IF COUNT IS EQUAL TO ZERO
0095 CAA200      120         JZ      NOACK           ;IF COUNT IS ZERO, NO ACK.
0098 FB          121         EI
0099 3200E0      122         STA     RESET
009C 00          123         NOP
009D 00          124         NOP
009E F3          125         DI
009F C38C00      126         JMP     ACKLP2
00A2 F3          127 NOACK:  DI
00A3 2AA04F      128         LHLD    POINT0          ;TREAT NO ACK. AS A NACK
00A6 22B34F      129         SHLD    CURRENT         ;RESET POINTER TO RETRANSMIT
00A9 216803      130         LXI     H,DR            ;PREPARE TO DISABLE RECEIVER
00AC CD3903      131         CALL    CMDOUT
00AF 3E09        132         MVI     A,09H           ;ENABLE 7.5 AND 6.5
00B1 30          133         SIM
00B2 FB          134         EI                      ;ENABLE INTERRUPTS
00B3 00          135         NOP
00B4 3200E0      136         STA     RESET           ;WAST TIME TO SEE IF DATA IS AVAILABLE
00B7 C37400      137         JMP     TXSTRT          ;BEGIN RETRANSMISSION
                 138         ;
00BA F3          139 INLOOP: DI
00BB 3AAD4F      140         LDA     PACKET          ;GET PACKET COUNT
00BE A7          141         ANA     A               ;IS THERE A COMPLETE PACKET IN RAM
00BF C27400      142         JNZ     TXSTRT          ;IF SO, BEGIN TRANSMISSION
00C2 FB          143         EI                      ;ELSE WAIT FOR COMPLETE PACKET
00C3 3200E0      144         STA     RESET           ;HIT RESET CIRCUITRY
00C6 00          145         NOP
00C7 C3BA00      146         JMP     INLOOP
                 147         ;
                 148 ;;;;;;;;;;;;;;;;;;;;;;;;;;;;;;;;;;;;;;;;;;;;;;;;;
                 149 ;
                 150 ;LOOK FOR DATA WITHOUT HAVING ANY DATA TO OUTPUT.
                 151 ;
                 152 ;;;;;;;;;;;;;;;;;;;;;;;;;;;;;;;;;;;;;;;;;;;;;;;;;
00CA 3A0590      153 HLOOK:  LDA     ASTAT           ;GET STATUS
00CD E601        154         ANI     01H             ;IS DATA AVAILABLE
00CF 3200E0      155         STA     RESET           ;HIT RESET CIRCUITRY
00D2 CACA00      156         JZ      HLOOK           ;IF NOT, WAIT
00D5 3A0090      157         LDA     ADATA           ;ELSE, READ DATA BYTE
00D8 FE42        158         CPI     42H             ;IS IT AN ASCII B
00DA C2CA00      159         JNZ     HLOOK           ;IF NOT, WAIT FOR NEXT BYTE
00DD 3E09        160         MVI     A,09H           ;ELSE, ADJUST INCOME COUNTER
00DF 32A44F      161         STA     INCOME
```

```
00E2 3AA44F    162 HLOOK2: LDA   INCOME    ;GET HEADER COUNTER
00E5 A7        163         ANA   A         ;SEE IF HEADER EXISTS
00E6 CAFC00    164         JZ    DLOOK     ;IF NOT, GET DATA
00E9 47        165         MOV   B,A       ;ELSE, PUT COUNT INTO REG. B
00EA 3A0590    166 AGAIN:  LDA   ASTAT     ;GET STATUS FROM 8250
00ED E601      167         ANI   01H       ;MASK TO GET DR FLAG
00EF 3200E0    168         STA   RESET     ;HIT RESET CIRCUITRY
00F2 CAEA00    169         JZ    AGAIN     ;IF NO DATA READY, LOOK AGAIN
               170         ;
00F5 3A0090    171         LDA   ADATA     ;READ CHARACTER TO RESET DR
00F8 05        172         DCR   B         ;DECREMENT HEADER COUNTER
00F9 C2EA00    173         JNZ   AGAIN
               174         ;
               175 ;;;;;;;;;;;;;;;;;;;;;;;;;;;;;;;;;;;;;;;;;;;;;;;;;
               176 ;
               177 ;LOOK FOR DATA, HEADER ALREADY REMOVED.
               178 ;
               179 ;;;;;;;;;;;;;;;;;;;;;;;;;;;;;;;;;;;;;;;;;;;;;;;;;
00FC 3A0590    180 DLOOK:  LDA   ASTAT     ;GET 8250 STATUS
00FF E601      181         ANI   01H       ;
0101 3200E0    182         STA   RESET     ;HIT RESET CIRCUITRY
0104 CAFC00    183         JZ    DLOOK     ;IF NO DATA AVAILABLE, WAIT
0107 3A0090    184 INP:    LDA   ADATA     ;GET DATA BYTE
010A FE20      185         CPI   20H       ;IS IT A SPACE
010C CAFC00    186         JZ    DLOOK     ;IF SO, GET NEXT BYTE
010F 320080    187         STA   8000H     ;OUTPUT TO CRT
0112 FE0D      188         CPI   0DH       ;IS IT A CR
0114 CAFC00    189         JZ    DLOOK     ;IF SO, GET NEXT BYTE
0117 FE0A      190         CPI   0AH       ;IS DATA A LF
0119 C8        191         RZ              ;IF SO, PACKET COMPLETE
011A 77        192         MOV   M,A       ;IF NOT, STORE DATA IN RAM
011B 23        193         INX   H         ;INCREMENT INPUT POINTER
011C C3FC00    194         JMP   DLOOK     ;GET NEXT DATA BYTE
               195 ;;;;;;;;;;;;;;;;;;;;;;;;;;;;;;;;;;;;;;;;;;;;;;;;;
               196 ; THIS ROUTINE INPUTS DATA, ELIMINATES THE PACKET HEADER AND
               197 ; STORES THE DATA IN RAM. INPUT FROM 8250.
               198 ;;;;;;;;;;;;;;;;;;;;;;;;;;;;;;;;;;;;;;;;;;;;;;;;;
               199         ;
               200         ;
011F F5        201 DATAIN: PUSH  PSW       ;SAVE CPU STATUS WORD
0120 3E10      202         MVI   A,10H     ;RESET RST 7.5
0122 30        203         SIM
0123 2AA24F    204         LHLD  POINTI    ;GET CURRENT INPUT POINTER
0126 3A0590    205         LDA   ASTAT     ;GET STATUS FROM 8250
0129 E601      206         ANI   01H       ;IS THERE INPUT DATA PENDING
012B CA7701    207         JZ    RETFLG    ;IF NOT, RETURN
012E 3AA44F    208 INPUTD: LDA   INCOME    ;ELSE DATA IS PRESENT, SEE IF HEADER
               209                         ;IS STILL PRESENT
0131 A7        210         ANA   A         ;IS IT ZERO
0132 CA3E01    211         JZ    DIN       ;IS SO, VALID DATA IS PRESENT, GET IT
0135 3D        212         DCR   A         ;ELSE, DECREMENT COUNT
0136 32A44F    213         STA   INCOME    ;STORE HEADER COUNT
0139 3A0090    214         LDA   ADATA     ;DO A DUMMY READ TO CLEAR INTERRUPT
013C F1        215         POP   PSW       ;RESTORE CPU STATUS WORD
013D C9        216         RET
013E 3A0090    217 DIN:    LDA   ADATA     ;GET DATA BYTE
```

```
0141 FE20        218 	    CPI    20H           ;IS IT A SPACE
0143 CA7701      219       JZ     RETFLG
0146 320080      220       STA    8000H         ;OUTPUT TO CRT
0149 FE0D        221       CPI    0DH           ;IS IT A CR
014B CA7701      222       JZ     RETFLG
014E FE0A        223       CPI    0AH           ;IS IT A LF
0150 CA5A01      224       JZ     INDONE        ;IF SO, INPUT PACKET COMPLETE
0153 77          225       MOV    M,A           ;ELSE, VALID DATA, STORE IN RAM
0154 23          226       INX    H
0155 22A24F      227       SHLD   POINTI        ;STORE UPDATED INPUT POINTER
0158 F1          228       POP    PSW           ;RESTORE FLAGS
0159 C9          229       RET
015A 3E0C        230 INDONE: MVI  A,0CH         ;RESET HEADER COUNT
015C 32A44F      231       STA    INCOME
015F 3AAD4F      232       LDA    PACKET        ;GET CURRENT PACKET COUNT
0162 FED0        233       CPI    0D0H          ;HAS MAX. PACKET COUNT BEEN REACHED
0164 CA7101      234       JZ     RETRES        ;IF SO, RESET INPUT POINTERS AND RETURN
0167 3C          235       INR    A             ;ELSE, INCREMENT PACKET COUNT
0168 32AD4F      236       STA    PACKET        ;STORE NEW VALUE
016B CD7901      237       CALL   UP13          ;INCREMENT INPUT POINTERS TO NEXT BLOCK
016E C37701      238       JMP    RETFLG        ;RETURN TO MAIN BODY
0171 2A854F      239 RETRES: LHLD PTINP         ;GET CURRENT INPUT BASE POINTER
0174 22A24F      240       SHLD   POINTI        ;RESET INPUT POINTER TO OVERWRITE
0177 F1          241 RETFLG: POP  PSW           ;RESTORE CPU STATUS WORD BEFORE RETURNING
0178 C9          242       RET
                 243       ;
                 244       ;
                 245 ;;;;;;;;;;;;;;;;;;;;;;;;;;;;;;;;;;;;;;;;;;;;;;;;;;;;;;;;;;;;;
                 246 ; THIS ROUTINE INCREMENTS THE INPUT POINTERS IN INCREMENTS OF 13H. THIS
                 247 ; ROUTINE ALSO INSURES THE POINTERS ARE IN BUFFER RANGE.
                 248 ;;;;;;;;;;;;;;;;;;;;;;;;;;;;;;;;;;;;;;;;;;;;;;;;;;;;;;;;;;;;;
                 249       ;
                 250       ;
0179 3E13        251 UP13:  MVI   A,13H         ;VALUE TO BE INCREMENTED
017B 2A854F      252       LHLD   PTINP         ;GET LAST BASE INPUT POINTER
017E 85          253       ADD    L             ;INCREMENT TO NEXT INPUT BASE
017F 6F          254       MOV    L,A           ;PUT INCREMENTED VALUE BACK INTO L
0180 3E00        255       MVI    A,00H         ;CLEAR A
0182 8C          256       ADC    H             ;ADD CARRY TO REGISTER H
0183 67          257       MOV    H,A           ;RESTORE UPDATE VALUE
0184 CDF901      258       CALL   OVERFL        ;INSURE POINTERS ARE STILL IN RANGE
0187 22854F      259       SHLD   PTINP         ;STORE NEW INPUT POINTERS
018A 22A24F      260       SHLD   POINTI
018D C9          261       RET
                 262       ;
                 263       ;
                 264 ;;;;;;;;;;;;;;;;;;;;;;;;;;;;;;;;;;;;;;;;;;;;;;;;;;;;;;;;;;;;;
                 265 ; THIS ROUTINE OUTPUTS A SINGLE DATA BYTE TO THE 8273 UPON
                 266 ; REQUEST, THIS ROUTINE ALSO CHECKS FOR TRANSMISSION ERRORS AND
                 267 ; END-OF-MESSAGE INTERRUPTS.
                 268 ;;;;;;;;;;;;;;;;;;;;;;;;;;;;;;;;;;;;;;;;;;;;;;;;;;;;;;;;;;;;;
                 269       ;
                 270       ;
                 271       ;
018E 3A0060      272 OUTDAT: LDA  SSTAT         ;GET STATUS FROM 8273
0191 32B24F      273       STA    STATUS        ;STORE CURRENT STATUS
0194 E601        274       ANI    01H           ;IS THERE AN INTERRUPT RESULT AVAIL.
```

```
0196 CAED01      275            JZ      OUTBYT        ;IF NOT, OUTPUT DATA BYTE
0199 3AB24F      276            LDA     STATUS        ;GET PREVIOUSLY READ STATUS BYTE
019C E610        277            ANI     10H           ;IS THERE AN IMMEDIATE RESULT AVAIL.
019E CAA501      278            JZ      CONT          ;IF NOT CONTINUE ON
01A1 3A0160      279            LDA     6001H         ;IF SO, READ RESULT
01A4 C9          280            RET
01A5 3A0260      281 CONT:      LDA     TXIR          ;READ INTERRUPT RESULT BYTE
01A8 FE0D        282            CPI     0DH           ;IS PACKET COMPLETE AND ERROR FREE
01AA C2B601      283            JNZ     BAD           ;IF NOT, GOTO TO BAD
01AD 3E00        284            MVI     A,00H         ;RESET NO ACK. FLAG
01AF 32A64F      285            STA     ACKFLG
01B2 C3C201      286            JMP     STATLP        ;CHECK AGAIN
01B5 00          287            NOP                   ;TURN RECEIVER ON AT THIS POINT
01B6 3EFF        288 BAD:       MVI     A,0FFH        ;SET NO ACK FLAG
01B8 32A64F      289            STA     ACKFLG
01BB 2AA04F      290            LHLD    POINTO        ;LOAD ORIGINAL OUTPUT POINTER
01BE 22B34F      291            SHLD    CURRENT       ;STORE IN CURRENT OUTPUT POINTER LOC.
01C1 00          292            NOP                   ;SINCE PACKET IS BAD, PREPARE TO RETRANS.
01C2 3A0060      293 STATLP:    LDA     SSTAT         ;GET STATUS BYTE TO CHECK FOR RESULTS
01C5 E601        294            ANI     01H           ;ARE THERE ANY MORE RESULTS AVAILABLE
01C7 CAD001      295            JZ      TURNON        ;IF NO RESULTS, RETURN (RZ)
01CA 3A0260      296            LDA     TXIR          ;READ INTERRUPT RESULT BYTE
01CD C3C201      297            JMP     STATLP        ;CHECK FOR MORE RESULT BYTES
01D0 3AA64F      298 TURNON:    LDA     ACKFLG        ;GET ACK FLAG
01D3 A7          299            ANA     A             ;IS AN ACK EXPECTED
01D4 CADC01      300            JZ      RXON          ;IF SO, PREPARE TO TURN ON RECEIVER
01D7 217400      301 TXON:      LXI     H,TXSTRT      ;LOAD HL WITH RETURN ADDRESS
01DA E3          302            XTHL                  ;PUT ON TOP OF STACK
01DB C9          303            RET
01DC 218600      304 RXON:      LXI     H,ACKLOP      ;PUT ACKLOP PROGRAM LOCATION INTO HL
01DF E3          305            XTHL                  ;REPLACE WITH TOP OF STACK
01E0 3E0A        306            MVI     A,0AH         ;SET INTR. MASK TO RECEIVE
01E2 30          307            SIM
01E3 216A03      308            LXI     H,RCV         ;TURN-ON RECEIVER
01E6 CD3903      309            CALL    CMDOUT        ;OUTPUT TURN-ON COMMANDS
01E9 01B90A      310            LXI     B,0AB9H       ;SET-UP TIME-OUT COUNTER, 24MS WAIT
01EC C9          311            RET
01ED 2AB34F      312 OUTBYT:    LHLD    CURRENT       ;GET CURRENT OUTPUT DATA POINTER
01F0 7E          313            MOV     A,M           ;PUT DATA BYTE INTO A
01F1 320070      314            STA     SDATAO        ;OUTPUT DATA TO 8273
01F4 23          315            INX     H
01F5 22B34F      316            SHLD    CURRENT       ;STORE UPDATED OUPUT POINTER
01F8 C9          317            RET
                 318            ;
                 319 ;;;;;;;;;;;;;;;;;;;;;;;;;;;;;;;;;;;;;;;;;;;;;;;;;;;;;;;;;;;
                 320 ; THIS ROUTINE CHECKS THE POINTER VALUE IN THE H&L REGISTER
                 321 ; PAIR TO INSURE THAT IT IS NOT OUT-OF-RANGE
                 322 ;;;;;;;;;;;;;;;;;;;;;;;;;;;;;;;;;;;;;;;;;;;;;;;;;;;;;;;;;;;
                 323            ;
                 324            ;
01F9 7D          325 OVERFL:    MOV     A,L           ;MOVE LSB OF POINTER INTO A
01FA FE70        326            CPI     70H
01FC C0          327            RNZ
01FD 7C          328            MOV     A,H           ;MOVE MSB OF POINTER INTO A
01FE FE4F        329            CPI     4FH
0200 C0          330            RNZ
0201 210040      331            LXI     H,RAM         ;IF POINTER IS 4F70H, RESET TO TOP
```

```
                      332                          ;OF RAM
0204 C9               333         RET
                      334  ;
                      335  ;
                      336  ;;;;;;;;;;;;;;;;;;;;;;;;;;;;;;;;;;;;;;;;;;;;;;;;;;;;
                      337  ; THIS ROUTINE INPUTS A DATA BYTE FROM THE 8273, THIS ROUTINE
                      338  ; ALSO CHECKS FOR TRANSMISSIONS ERRORS AS WELL AND THE END-
                      339  ; OF-MESSAGE FLAG.
                      340  ;;;;;;;;;;;;;;;;;;;;;;;;;;;;;;;;;;;;;;;;;;;;;;;;;;;;
                      341  ;
                      342  ;
0205 3E0A             343 GETACK: MVI    A,0AH        ;SET INTERRUPT MASK TO OUTPUT
0207 30               344         SIM                 ;TO CRT.
0208 3A0060           345         LDA    SSTAT        ;GET STATUS WORD FROM 8273
020B 32B24F           346         STA    STATUS       ;STORE STATUS WORD
020E E602             347         ANI    02H          ;IS THERE A RECEIVER INTERRUPT RESULT
0210 CAB102           348         JZ     INBYTE       ;IF NOT, INPUT DATA IS AVAILABLE
0213 3AB24F           349         LDA    STATUS       ;ELSE, READ STATUS BYTE & DETERMINE RESULT
0216 E610             350         ANI    10H          ;IS IT AN IMMEDIATE RESULT
0219 CA2202           351         JZ     CONTR        ;IF NOT CONTINUE
021B 3A0160           352         LDA    RESULT       ;ELSE, READ RESULT
021E 01B90A           353         LXI    B,0AB9H      ;RESTORE TIME-OUT COUNTER
0221 C9               354         RET
0222 3A0360           355 CONTR:  LDA    RXIR         ;READ RECEIVER INTERRUPT RESULT
0225 FE03             356         CPI    03H          ;SEE IF CRC ERROR HAS OCCURRED
0227 CA6402           357         JZ     DATCRC       ;IF SO, DETERMINE TYPE
022A E60F             358         ANI    0FH          ;IS PACKET RECEIVED COMPLETE AND ERROR FREE
022C C24E02           359         JNZ    BADR         ;IF NOT, GOTO BAD RECEIVE
022F 0E04             360 GOODR:  MVI    C,04H        ;SET-UP COUNTER TO GET PACKET ID
0231 20               361 RL1:    RIM                 ;CHECK INTERRUPTS
0232 E640             362         ANI    40H          ;SEE IF INPUT DATA IS AVAILABLE
0234 C25C02           363         JNZ    RXCALL       ;IF SO, PREPARE TO GET DATA BYTE
0237 3A0060           364 RL2:    LDA    SSTAT        ;GET SYNC. STATUS WORD
023A E602             365         ANI    02H          ;IS A RESULT AVAILABLE
023C CA3102           366         JZ     RL1          ;IF NOT, WAIT
023F 3A0360           367         LDA    RXIR         ;GET RESULT
0242 0D               368         DCR    C            ;DECREMENT COUNTER
0243 C23102           369         JNZ    RL1          ;IF NOT ID BYTE, GET NEXT RESULT
0246 47               370         MOV    B,A          ;ELSE IT IS ID, PUT INTO B
0247 3AAC4F           371         LDA    ID           ;GET TRANSMITTED ID
024A B8               372         CMP    B            ;ARE THEY THE SAME
024B CA7302           373         JZ     GOODTX       ;IF SO, THE TRANSMISSION WAS RECEIVED
024E 2AAA04F          374 BADR:   LHLD   POINTO       ;ELSE, IT WAS NOT PROPERLY RECEIVED
0251 22B34F           375         SHLD   CURRENT      ;RESET POINTERS TO RETRANSMIT
0254 3EFF             376         MVI    A,0FFH       ;SET NO ACK. FLAG
0256 32A64F           377         STA    ACKFLG
0259 C39802           378         JMP    RSTAT
                      379  ;
025C C5               380 RXCALL: PUSH   B            ;PUT RECEIVE PACKET ID COUNTER ON STACK
025D CD1F01           381         CALL   DATAIN       ;GET DATA BYTE
0260 C1               382         POP    B            ;PULL PACKET ID COUNT OFF OF STACK
0261 C33702           383         JMP    RL2          ;CONTINUE CHECKING STATUS OF 8273
                      384  ;
0264 3AA64F           385 DATCRC: LDA    ACKFLG       ;GET ACKFLG TO SEE IF DATA HAS BEEN RECEIVED
0267 FEAA             386         CPI    0AAH         ;IF ACKFLG=0AAH, DATA HAS BEEN RECEIVED
0269 CA4E02           387         JZ     BADR         ;IF SO, THEN PACKET IS IN ERROR
026C 3E00             388         MVI    A,00H        ;ELSE, FLASE CRC ERROR WAS DETECTED
```

```
026E 30           389          SIM
026F 01B90A       390          LXI    B,0AB9H    ;RESET TIME-OUT COUNTER
0272 C9           391          RET               ;CONTINUE LOOKING FOR ACK.
0273 3AB04F       392 GOODTX:  LDA    ACKBYT     ;GET ACK. BYTE
0276 FEA5         393          CPI    0A5H       ;WAS IT A POSITIVE ACKNOWLEDGEMNET
0278 C24E03       394          JNZ    BADR       ;IF NOT, SET-UP FOR RETRANSMISSION
027B 2AB34F       395          LHLD   CURRENT    ;GET CURRENT OUTPUT POINTER
027E CDF901       396          CALL   OVERFL     ;INSURE POINTER IS WITHIN RANGE
0281 22B34F       397          SHLD   CURRENT
0284 22A04F       398          SHLD   POINTO     ;STORE UPDATED POINTERS
0287 3AAC4F       399          LDA    ID         ;GET CURRENT PACKET ID NUMBER
028A 3C           400          INR    A          ;INCREMENT ID NUMBER FOR NEXT TRANSMISSION
028B 32AC4F       401          STA    ID         ;STORE NEW ID NUMBER
028E 3AAD4F       402          LDA    PACKET     ;GET CURRENT PACKET COUNT
0291 3D           403          DCR    A          ;DECREMENT THAT VALUE
0292 32AD4F       404          STA    PACKET     ;STORE NEW VALUE
0295 CAC402       405          JZ     EMPTY      ;IF PACKET COUNT=0, BUFFER IS EMPTY
                  406          ;
0298 216803       407 RSTAT:   LXI    H,DR       ;TURN-OFF RECEIVER
029B CD3903       408          CALL   CMDOUT
029E 3E09         409          MVI    A,09H      ;SET INTERRUPT MASK FOR TRANSMISSION
02A0 30           410          SIM
02A1 217400       411          LXI    H,TXSTRT   ;LOAD HL WITH RECEIVER TURN-ON COMMAND LINE
02A4 E3           412          XTHL              ;REPLACE THAT ADDRESS WITH STACK
02A5 3A0060       413 RSTATL:  LDA    SSTAT      ;READ STATUS
02A8 E602         414          ANI    02H        ;ANY RXIR AVAILABLE
02AA C8           415          RZ                ;IF NO RESLUTS, RETURN
02AB 3A0360       416          LDA    RXIR       ;ELSE, READ INTERRUPT RESULT
02AE C3A502       417          JMP    RSTATL     ;CHECK TO SEE IF ANY MORE RESULTS EXIST
                  418          ;
02B1 2AB34F       419 INBYTE:  LHLD   CURRENT    ;GET CURRENT INPUT POINTER
02B4 3A00B0       420          LDA    SDATAI     ;GET INPUT DATA BYTE
02B7 32B04F       421          STA    ACKBYT     ;STORE ACKNOWLEDGEMENT BYTE
02BA 01B90A       422          LXI    B,0AB9H    ;RESTORE TIME-OUT COUNTER, 24MS
02BD 3EAA         423          MVI    A,0AAH     ;PUT 0AAH IN ACKFLG TO SHOW DATA RECEIVED
02BF 32A64F       424          STA    ACKFLG
02C2 A7           425          ANA    A          ;RESET ZERO FLAG IN CPU STATUS WORD
02C3 C9           426          RET
                  427          ;
02C4 216803       428 EMPTY:   LXI    H,DR       ;DISABLE RECEIVER
02C7 CD3903       429          CALL   CMDOUT
02CA 3E0B         430          MVI    A,0BH      ;SET INTERRUPT MASK, ENABLE 7.5
02CC 30           431          SIM
02CD 21BA00       432          LXI    H,INLOOP   ;SINCE RAM IS EMPTY, GET A COMPLETE PACKET
02D0 E3           433          XTHL
02D1 C3A502       434          JMP    RSTATL
                  435          ;
                  436          ;
                  437 ;;;;;;;;;;;;;;;;;;;;;;;;;;;;;;;;;;;;;;;;;;;;;;;;;;;;;;
                  438 ; THE ROUTINES BELOW INITIALIZE THE SERIAL CHIPS
                  439 ;;;;;;;;;;;;;;;;;;;;;;;;;;;;;;;;;;;;;;;;;;;;;;;;;;;;;;
                  440          ;
                  441          ;
02D4 3E80         442 I82501:  MVI    A,80H      ;SET-UP TO LOAD BAUD DIVISOR
02D6 320390       443          STA    LCR        ;WRITE TO LCR, SET DLAB=1
02D9 3E68         444          MVI    A,68H      ;LSB OF DIVISOR, 8MHZ CRYSTAL
```

```
02DB 320090    445        STA    BAUDLS     ;4FH FOR 6MHZ CRYSTAL
02DE 3E00      446        MVI    A,00H      ;MSB OF DIVISOR
02E0 320190    447        STA    BAUDMS
02E3 3E07      448        MVI    A,07       ;8-BITS, NO PARITY, 2 STOP BITS
02E5 320390    449        STA    LCR        ;SET-UP OPERATING CONDITIONS
02E8 3E00      450        MVI    A,00H
02EA 320590    451        STA    ASTAT      ;CLEAR LINE STATUS REGISTER
02ED 3E01      452        MVI    A,01H      ;ENABLE DATA AVAILABLE INTERRUPT
02EF 320190    453        STA    DISINR     ;INTERRUPT ENABLE REGISTER
02F2 3E0F      454        MVI    A,0FH      ;ACTIVATE MODEM CONTROL LINES
02F4 320490    455        STA    LCR+1
02F7 C9        456        RET
               457 ;
               458 ;
02F8 215C03    459 I8273: LXI    H,OPMODES
02FB CD3903    460        CALL   CMDOUT
02FE 215F03    461        LXI    H,SMODES
0301 CD3903    462        CALL   CMDOUT
0304 216203    463        LXI    H,DTAXS
0307 CD3903    464        CALL   CMDOUT
030A 216503    465        LXI    H,BITS
030D CD3903    466        CALL   CMDOUT
0310 216A03    467        LXI    H,RCV
0313 CD3903    468        CALL   CMDOUT
0316 C9        469        RET
               470 ;
               471 ;
0317 3E80      472 I8250Z: MVI   A,80H      ;SET-UP TO LOAD BAUD DIVISOR
0319 320380    473        STA    8003H      ;WRITE TO LCR, SET DLAB=1
031C 3E68      474        MVI    A,68H      ;LSB OF DIVISOR, 8MHZ CRYSTAL
031E 320080    475        STA    8000H      ;4FH FOR 6MHZ CRYSTAL
0321 3E00      476        MVI    A,00H      ;MSB OF DIVISOR
0323 320180    477        STA    8001H
0326 3E07      478        MVI    A,07       ;8-BITS, NO PARITY, 2 STOP BITS
0328 320380    479        STA    8003H      ;SET-UP OPERATING CONDITIONS
032B 3E00      480        MVI    A,00H
032D 320180    481        STA    8001H      ;CLEAR LINE STATUS REGISTER
0330 320580    482        STA    8005H      ;DISABLE INTERRUPTS
0333 3E0F      483        MVI    A,0FH
0335 320480    484        STA    8004H
0338 C9        485        RET
               486 ;
0339 0E30      487 CMDOUT: MVI   C,30H
033B 46        488        MOV    B,M
033C 23        489        INX    H
033D 3A0060    490 CMD1:  LDA    SSTAT
0340 07        491        RLC
0341 DA3D03    492        JC     CMD1
0344 7E        493        MOV    A,M
0345 320060    494        STA    SCMDRG
0348 78        495 CMD2:  MOV    A,B
0349 A7        496        ANA    A
034A C8        497        RZ
034B 23        498        INX    H
034C 05        499        DCR    B
034D 3A0060    500 CMD3:  LDA    SSTAT
0350 E620      501        ANI    20H
```

```
0352 C24D03        502            JNZ      CMD3
0355 7E            503            MOV      A,M
0356 320160        504            STA      SPRMRG
0359 C34803        505            JMP      CMD2
                   506 ;
                   507 ;
035C 01            508 OPMODES:   DB       01,91H,00000111B
035D 91
035E 07

035F 01            509 SMODES:    DB       01,0A0H,00000000B
0360 A0
0361 00

0362 01            510 DTAXS:     DB       01,97H,00000001B
0363 97
0364 01

0365 01            511 BITS:      DB       01,0A4H,00000000B
0366 A4
0367 00

0368 00            512 DR:        DB       00,0C5H
0369 C5

036A 02            513 RCV:       DB       02,0C0H,01H,00H
036B C0
036C 01
036D 00

514 ;
                   515 ;
                   516 ;
036E 3E04          517 IXMIT:     MVI      A,04H         ;FOUR PARAMETERS IN COMMAND
0370 32A74F        518            STA      XMIT          ;STORE IN RAM
0373 3EC8          519            MVI      A,0C8H        ;GENERAL TRANSMIT COMMAND
0375 32A84F        520            STA      XMIT+1
0378 3E13          521            MVI      A,13H         ;LSB OF PACKET LENGTH
037A 32A94F        522            STA      XMIT+2
037D 3E00          523            MVI      A,00H         ;MSB OF PACKET LENGTH
037F 32AA4F        524            STA      XMIT+3
0382 3EFF          525            MVI      A,0FFH        ;ADDRESS BYTE TO BE SENT
0384 32AB4F        526            STA      XMIT+4
0387 C9            527            RET
                   528 ;
                   529            END
```

USER SYMBOLS

| | | | | | | |
|---|---|---|---|---|---|---|
| ACKBYT A 4FB0 | ACKFLG A 4FA6 | ACKLOP A 0086 | ACKLP2 A 008C | ADATA A 9000 | AGAIN A 00EA | ASTAT A 9005 |
| BAD A 01B6 | BADR A 024E | BAUDLS A 9000 | BAUDMS A 9001 | BEGIN A 0040 | BITS A 0365 | BUFFER A 4000 |
| CMD1 A 033D | CMD2 A 0348 | CMD3 A 034D | CMDOUT A 0339 | CNTRL A 4FAC | CONT A 01A5 | CONTR A 0222 |
| COUNTS A FF0C | CRTBUF A 4FB1 | CURREN A 4FB3 | DATAIN A 011F | DATCRC A 0264 | DIN A 013E | DISINR A 9001 |
| DLOOK A 00FC | DR A 0368 | DTAXS A 0362 | EMPTY A 02C4 | GETACK A 0205 | GOODR A 022F | GOODTX A 0273 |
| HLOOK A 00CA | HLOOK2 A 00E2 | I82501 A 02D4 | I82502 A 0317 | I8273 A 02F8 | ID A 4FAC | INBYTE A 02B1 |
| INCOME A 4FA4 | INDONE A 015A | INLOOP A 00BA | INP A 0107 | INPUTD A 012E | IXMIT A 036E | LCR A 9003 |
| MAIN A 005C | MLOOP A 007E | NOACK A 00A2 | OPMODE A 035C | OUTBYT A 01ED | OUTDAT A 018E | OVERFL A 01F9 |
| PACKET A 4FAD | POINTI A 4FA2 | POINTO A 4FA0 | PTINP A 4FB5 | RAM A 4000 | RCV A 036A | RESET A E000 |
| RESULT A 6001 | RETFLG A 0177 | RETRES A 0171 | RL1 A 0231 | RL2 A 0237 | RSTAT A 0298 | RSTATL A 02A5 |
| RXCALL A 025C | RXIR A 6003 | RXON A 01DC | SCMDRG A 6000 | SDATAI A B000 | SDATAO A 7000 | SMODES A 035F |
| SPRMRG A 6001 | SSTAT A 6000 | STATLP A 01C2 | STATUS A 4FB2 | TIME A 4FB7 | TURNON A 01D0 | TXIR A 6002 |
| TXON A 01D7 | TXSTAT A 4FA5 | TXSTRT A 0074 | UP13 A 0179 | XMIT A 4FA7 | | |

ASSEMBLY COMPLETE,   NO ERRORS

APPENDIX II

ISIS-II 8080/8085 MACRO ASSEMBLER, V4.1      MODULE   PAGE   1

```
LOC  OBJ        LINE      SOURCE STATEMENT

1  ;;;;;;;;;;;;;;;;;;;;;;;;;;;;;;;;;;;;;;;;;;;;;;;;;;;;;;;;;
                  2  ;     COPYRIGHT 1985 ZENITH ELECTRONICS CORP.
                  3  ;THIS PROGRAM WAS WRITTEN GORDON E. REICHARD ON JUNE 12, 1985
                  4  ; THIS IS ONLY A PRELIMINARY VERSION OF THE PROGRAM.
                  5  ; THE PROGRAM IS CALLED Z-TLM300. THE NAME TLM300 IS THE
                  6  ; DIRECTORY NAME.
                  7  ; THIS PROGRAM IS USED TO RECEIVE DATA FROM THE Z-TCU100
                  8  ; LOCATION AT THE CENTRAL OFFICE. THE DATA FROM THAT POINT
                  9  ; IS CONVERTED, BUFFERED, AND LASTLY TRANSFERRED TO THE MUX
                 10  ; BOARD.
                 11  ;;;;;;;;;;;;;;;;;;;;;;;;;;;;;;;;;;;;;;;;;;;;;;;;;;;;;;;;;
                 12       ;
                 13       ;
                 14  ;;;;;;;;;;;;;;;;;;;;;;;;;;;;;;;;;;;;;;;;;;;;;;;;;;;;;;;;;
                 15  ; WHEN THE VARIABLE 'AREA' IS SET TO F0H, THE PROGRAM 'TABLE'
                 16  ; MUST BE USED TO PROGRAM THE 2732 EPROM (IC 7) WITH THE
                 17  ; CORRECT AREA CODE CONVERSIONS.
                 18  ;;;;;;;;;;;;;;;;;;;;;;;;;;;;;;;;;;;;;;;;;;;;;;;;;;;;;;;;;
                 19       ;
                 20       ;
                 21  ;;;;;;;;;;;;;;;;;;;;;;;;;;;;;;;;;;;;;;;;;;;;;;;;;;;;;;;;;
                 22  ; BELOW ARE THE EQUATE STATEMENTS ASSIGNING LABELS TO ADDRESS
                 23  ; VALUES.
                 24  ;;;;;;;;;;;;;;;;;;;;;;;;;;;;;;;;;;;;;;;;;;;;;;;;;;;;;;;;;
                 25       ;
                 26       ;
9000             27  ADATA   EQU   9000H        ;ASYNC DATA PORT, 8250
9000             28  BAUDLS  EQU   ADATA        ;LSB OF BAUD RATE
9001             29  BAUDMS  EQU   ADATA+1      ;MSB OF BAUD RATE
9003             30  LCR     EQU   ADATA+3      ;LINE CONTROL REG. 8250
9001             31  DISINR  EQU   ADATA+1      ;DISABLE INTERRUPT REG. 8250
9005             32  ASTAT   EQU   ADATA+5      ;ASYNC STATUS PORT, 8250
4000             33  RAM     EQU   4000H
4000             34  BUFFER  EQU   RAM          ;IN AND OUT BUFFER
6000             35  SCMDRG  EQU   6000H        ;SYNC COMMAND REG. 8273
6000             36  SSTAT   EQU   SCMDRG       ;SYNC STATUS REG. 8273
6001             37  SPRMRG  EQU   SCMDRG+1     ;SYNC PARAMETER REG.
6001             38  RESULT  EQU   SPRMRG       ;RESULT REGISTER
6002             39  TXIR    EQU   SCMDRG+2     ;TRANSMIT INTERRUPT REG.
6003             40  RXIR    EQU   SCMDRG+3     ;RECEIVER INTERRUPT REG.
4FA0             41  POINTO  EQU   4FA0H        ;OUTPUT POINTER
4FA2             42  POINTI  EQU   POINTO+2     ;INPUT POINTER
7000             43  SDATAO  EQU   7000H        ;SYNC DATA OUTPUT, 8273
B000             44  SDATAI  EQU   0B000H       ;SYNC DATA INPUT, 8273
4FA4             45  INCOME  EQU   POINTI+2     ;INCOMING DATA PACKET PENDING
4FA5             46  TXSTAT  EQU   POINTI+3     ;CURRENT 8273 X-MIT STATUS
4FA6             47  ACKFLG  EQU   POINTI+4     ;ACKNOWLEDGEMENT FLAG
4FA7             48  XMIT    EQU   POINTI+5     ;START ADDRESS OF X-MIT SET-UP
4FAC             49  CNTRL   EQU   XMIT+5       ;CONTROL FIELD FOR SDLC FRAME
```

```
4FAD            50 PACKET  EQU     POINTIZ+11      ;PACKETS REMAINING IN RAM
4FB7            51 GETID   EQU     4FB7H           ;INPUT DATA COUNTER, USED FOR GETTING ID
4FB6            52 CRTBUF  EQU     4FB6H           ;DATA HERE IS OUTPUT TO CRT
4FB5            53 STATUS  EQU     4FB5H           ;STATUS BYTE READ FROM 8273
4FB3            54 CURRENT EQU     4FB3H           ;CURRENT OUTPUT POINTER (ALSO 4FB4H)
E000            55 RESET   EQU     0E000H          ;WATCH DOG RESET CIRCUIT ADDRESS
                56         ;
00F0            57 AREA    EQU     0F0H            ;MSB BASE OF AREA CODE LOOK-UP TABLE
                58                                 ;THIS VALUE SHOULD BE 10H FOR PROTO-TYPE USE
                59                                 ;AND F0H FOR PRODUCTION USE.
4026            60 TOPOUT  EQU     4026H           ;STARTING ADDRESS OF OUTPUT BUFFER
4F8A            61 CNVRTP  EQU     4F8AH           ;LOCATION TO STORE CONVERTER POINTER
4F8C            62 TXFLG   EQU     4F8CH           ;LOCATION OF OUTPUT BUFFER READY FLAG
4F8D            63 DATAVA  EQU     4F8DH           ;FLAG TO DETERMINE WHETHER DATA IS AVA. FOR CN.
4F8E            64 SAMPAC  EQU     4F8EH           ;LOCATION WHICH HOLD REPEAT PACKET COUNT
4F8B            65 CNVRTH  EQU     CNVRTP+1        ;THIS LOCATION CONTAINS THE H REG.
4F90            66 HPCNVT  EQU     4F90H           ;BASE POINTER FOR DATA CONVERSION
4F92            67 HPSAVE  EQU     HPCNVT+2        ;OFFSET DATA CONVERSION POINTER
4F94            68 BYTE12  EQU     HPCNVT+4        ;HP OUTPUT, BYTES 1 AND 2
4F96            69 BYTE34  EQU     HPCNVT+6        ;BYTES 3 AND 4
4F98            70 BYTE56  EQU     HPCNVT+8        ;BYTES 5 AND 6
4F9A            71 BYTE78  EQU     HPCNVT+0AH      ;BYTES 7 AND 8
4F9C            72 VALUE   EQU     HPCNVT+0CH      ;LOCATION WHERE MULTIPLIED VALUE IS SAVED
4F9E            73 CNVBUF  EQU     HPCNVT+0EH      ;CONVERTER BUFFER FULL FLAG LOCATION
00FF            74 MUXRUN  EQU     0FFH            ;MUX COUNTER RUNNING AND NO RESET
001F            75 MRESET  EQU     1FH             ;RESET SIGNAL FOR THE MUX BOARD
002F            76 MSTOP   EQU     2FH             ;MUX STOP COUNTER SIGNAL
                77         ;
4FBA            78 ADDRES  EQU     4FBAH           ;ACK. PACKET ADDRESS BYTE LOCATION
4FBB            79 ID      EQU     ADDRES+1        ;PACKET ID BYTE LOCATION
4FBC            80 TXBYTE  EQU     ADDRES+2        ;ACKNOWLEDGE BYTE, A5=GOOD. C3=BAD
4FBD            81 TXPNT   EQU     ADDRES+3        ;ACK. OUTPUT BUFFER POINTER
                82         ;
0010            83 PORT4A  EQU     10H             ;IC4, 8255 PORT A
0011            84 PORT4B  EQU     11H             ;IC4, 8255 PORT B
0012            85 PORT4C  EQU     12H             ;IC4, 8255 PORT C
0013            86 CPORT4  EQU     13H             ;IC4, 8255 CONTROL PORT
0020            87 PORT5A  EQU     20H             ;IC5, 8255 PORT A
0023            88 CPORT5  EQU     23H             ;IC5, 8255 CONTROL PORT
D000            89 MUXWR   EQU     0D000H          ;USE THIS ADDRESS TO WRITE TO MUX BOARD
                90         ;
                91         ;
                92 ;;;;;;;;;;;;;;;;;;;;;;;;;;;;;;;;;;;;;;;;;;;;;;;;;;;;;;;;;
                93 ; THIS IS THE LOOK-UP TABLE FOR THE AREA CODES.
                94 ;;;;;;;;;;;;;;;;;;;;;;;;;;;;;;;;;;;;;;;;;;;;;;;;;;;;;;;;;
                95         ;
                96         ;
1314            97         ORG     1314H
1314 3F         98         DB      00111111B       ;314 AREA CODE
                99         ;
1312            100        ORG     1312H
1312 7F         101        DB      01111111B       ;312 AREA CODE
                102        ;
1815            103        ORG     1815H
1815 BF         104        DB      10111111B       ;815 AREA CODE
                105        ;
```

```
1414            106         ORG     1414H
1414 FF         107         DB      11111111B       ;414 AREA CODE
                108         ;
                109         ;
                110 ;;;;;;;;;;;;;;;;;;;;;;;;;;;;;;;;;;;;;;;;;;;;;;;;;;;;;;;;;
                111 ; THIS IS THE LOOK-UP TABLE CONTAINING THE MULTIPLIERS USED
                112 ; BYTE THE_MULTI SUB-ROUTINE.
                113 ;;;;;;;;;;;;;;;;;;;;;;;;;;;;;;;;;;;;;;;;;;;;;;;;;;;;;;;;;
                114         ;
                115         ;
0A00            116         ORG     0A00H           ;LOOK-UP TABLE FOR ASCII CNVERSION
0A00 0000       117 LT1000: DW      0000H           ;0000
0A02 E803       118         DW      03E8H           ;1000
0A04 D007       119         DW      07D0H           ;2000
0A06 B80B       120         DW      0BB8H           ;3000
0A08 A00F       121         DW      0FA0H           ;4000
0A0A 8813       122         DW      1388H           ;5000
0A0C 7017       123         DW      1770H           ;6000
0A0E 581B       124         DW      1B58H           ;7000
0A10 401F       125         DW      1F40H           ;8000
0A12 2823       126         DW      2328H           ;9000
                127         ;
0B00            128         ORG     0B00H
0B00 0000       129 LT100:  DW      0000H           ;000
0B02 6400       130         DW      0064H           ;100
0B04 C800       131         DW      00C8H           ;200
0B06 2C01       132         DW      012CH           ;300
0B08 9001       133         DW      0190H           ;400
0B0A F401       134         DW      01F4H           ;500
0B0C 5802       135         DW      0258H           ;600
0B0E BC02       136         DW      02BCH           ;700
0B10 2003       137         DW      0320H           ;800
0B12 8403       138         DW      0384H           ;900
                139         ;
0C00            140         ORG     0C00H
0C00 00         141 LT10:   DB      00H             ;00
0C01 0A         142         DB      0AH             ;10
0C02 14         143         DB      14H             ;20
0C03 1E         144         DB      1EH             ;30
0C04 28         145         DB      28H             ;40
0C05 32         146         DB      32H             ;50
0C06 3C         147         DB      3CH             ;60
0C07 46         148         DB      46H             ;70
0C08 50         149         DB      50H             ;80
0C09 5A         150         DB      5AH             ;90
                151         ;
                152         ;
                153         ;
                154         ;
                155 ;;;;;;;;;;;;;;;;;;;;;;;;;;;;;;;;;;;;;;;;;;;;;;;;;;;;;;;;;
                156 ; THIS IS THE BEGINNING OF THE PROGRAM. THIS PORTION OF THE
                157 ; PROGRAM TO THE START OF THE MAIN BODY OF THE PROGRAM PERFORMS
                158 ; REGITER AND CHIP INITIALIZATION.
                159 ;;;;;;;;;;;;;;;;;;;;;;;;;;;;;;;;;;;;;;;;;;;;;;;;;;;;;;;;;
                160         ;
                161         ;
```

```
0000            162      ORG    0000H
0000 F3         163      DI
0001 3E1E       164      MVI    A,1EH           ;ENABLE
0003 30         165      SIM                    ;SET INTERRUPT MASK
0004 210040     166      LXI    H,RAM           ;SET ALL POINTERS TO TOP OF RAM
0007 22B34F     167      SHLD   CURRENT
000A 22A24F     168      SHLD   POINTI
000D 22A04F     169      SHLD   POINTO
0010 22904F     170      SHLD   HPCNVT
0013 22924F     171      SHLD   HPSAVE
0016 21BA4F     172      LXI    H,ADDRES
0019 22BD4F     173      SHLD   TXPNT           ;SET ACK. TRANSMIT OUTPUT POINTER
001C 212640     174      LXI    H,TOPOUT
001F 228A4F     175      SHLD   CNVRTP          ;SET-UP OUTPUT BUFFER POINTER
0022 C34000     176      JMP    BEGIN
                177      ;
002C            178      ORG    002CH           ;RST 5.5
002C C30701     179      JMP    INPDAT
                180      ;
0034            181      ORG    0034H           ;RST 6.5
0034 C3ED01     182      JMP    OUTACK
                183      ;
003C            184      ORG    003CH           ;RST 7.5
003C C38102     185      JMP    OUTCRT
                186      ;
0040            187      ORG    0040H           ;BEGINNING OF MAIN PROGRAM
0040 01FFFF     188 BEGIN: LXI  B,0FFFFH
0043 3200E0     189 TL1:   STA  RESET           ;HIT RESET CIRCUIT
0046 0B         190      DCX    B
0047 78         191      MOV    A,B
0048 A7         192      ANA    A
0049 C24300     193      JNZ    TL1
004C 79         194      MOV    A,C
004D A7         195      ANA    A
004E C24300     196      JNZ    TL1
0051 310050     197 START: LXI  SP,5000H        ;SET STACK POINTER TO TOP
0054 CD9902     198      CALL   I8251I
0057 CDDC02     199      CALL   I8251O
005A CDBD02     200      CALL   I8273
005D CD3303     201      CALL   IXMIT           ;SET-UP OUTPUT ARRAY
0060 CD4803     202      CALL   I8255
0063 3E00       203      MVI    A,00H
0065 32B84F     204      STA    ID              ;STORE PACKET ID
0068 32AD4F     205      STA    PACKET          ;ZERO PACKET COUNT
006B 32B74F     206      STA    GETID           ;RESET DATA COUNTER TO GET ID
006E 329E4F     207      STA    CNVBUF          ;RESET CONVERT BUFFER EMPTY FLAG
0071 328C4F     208      STA    TXFLG           ;NO DATA READY FOR TRANSFER TO HP
0074 3E0F       209      MVI    A,0FH           ;SET REPEAT PACKET COUNT TO 15
0076 328E4F     210      STA    SAMPAC
0079 3EFF       211      MVI    A,0FFH          ;ADDRESS TO BE SENT IN ALL ACK. PACKETS
007B 32BA4F     212      STA    ADDRES
                213      ;
                214      ;;;;;;;;;;;;;;;;;;;;;;;;;;;;;;;;;;;;;;;;;;;;;;;;;;;;;;;;;;;;
                215      ; THIS MARKS THE START OF THE MAIN BODY OF THE PROGRAM. FROM THIS
                216      ; MAIN BODY, ALL OTHER ROUTINES ARE CALLED. THIS PORTION OF THE
                217      ; PROGRAM CONTROLS THE FLOW OF PROGRAM OPERATION.
```

```
                218 ;;;;;;;;;;;;;;;;;;;;;;;;;;;;;;;;;;;;;;;;;;;;;;;;;;;;;;;;;;;;;;
                219      ;
                220      ;
007E 3A8C4F     221 RECON:  LDA   TXFLG    ;SEE IF THERE IS DATA READY FOR TRANSFER
0081 A7         222         ANA   A        ;SEE IF THERE ARE ANY PACKETS READY FOR XMIT
0082 CAA700     223         JZ    MLOOP    ;IF NOT, WAIT TO RECEIVE
0085 20         224         RIM            ;ELSE, SEE IF BOARD IS SELECTED
0086 07         225         RLC
0087 DC3E02     226         CC    HPOUT    ;IF SO, OUTPUT CONVERTED DATA PACKET (CC)
008A 212F03     227         LXI   H,RCV    ;ELSE, PREPARE TO RECEIVE WHILE WAITING
                228                        ;TO TRANSFER TO MUX BOARD
008D CDFE02     229         CALL  CMDOUT
0090 FB         230 MLOOP3: EI
0091 3200E0     231         STA   RESET
0094 00         232         NOP
0095 00         233         NOP
0096 F3         234         DI
0097 3A8C4F     235         LDA   TXFLG    ;HAS TRANSFER OCCURRED
009A A7         236         ANA   A
009B CAAD00     237         JZ    MLOOP2   ;IF SO, RETURN TO ORIGINAL LOOP
009E 20         238         RIM            ;GET CURRENT INTERRUPT STATUS
009F 07         239         RLC            ;SEE IF BOARD IS BEING SELECTING
00A0 DC3E02     240         CC    HPOUT    ;IF SO, BEGIN TRANSFER TO MUX BOARD
00A3 FB         241         EI             ;ELSE ENABLE INTERRUPTS AND CONTINUE WAITING
00A4 C39000     242         JMP   MLOOP3
                243      ;
00A7 212F03     244 MLOOP:  LXI   H,RCV    ;PREPARE TO TURN-ON RECEIVER
00AA CDFE02     245         CALL  CMDOUT   ;OUTPUT COMMANDS
00AD FB         246 MLOOP2: EI             ;ENABLE INTERRUPTS AND WAIT FOR DATA
00AE 3200E0     247         STA   RESET    ;HIT THE RESET CIRCUIT
00B1 3A0060     248         LDA   SSTAT    ;GET CURRENT STATUS FROM 8372
00B4 00         249         NOP
00B5 00         250         NOP
00B6 C3AD00     251         JMP   MLOOP2
                252      ;
                253      ;
00B9 3A9E4F     254 TXSTRT: LDA   CNVBUF   ;GET CONVERT BUFFER FLAG
00BC A7         255         ANA   A        ;IS THE CONVERTER BUFFER FULL
00BD C2E800     256         JNZ   TX1      ;IF NOT, CONTINUE
00C0 3A8D4F     257         LDA   DATAVA   ;SEE IF VALID DATA IS AVAILABLE FOR CONVERSION
00C3 A7         258         ANA   A
00C4 CAE800     259         JZ    TX1      ;IF NOT DATA AVAILABLE, BEGIN RETRANSMISSION
00C7 2A904F     260         LHLD  HPCNVT   ;ELSE PREPARE TO CONVERT DATA PACKET
00CA 3E10       261         MVI   A,10H
00CC CD5D03     262         CALL  OFFSET
00CF 22924F     263         SHLD  HPSAVE
00D2 CD6403     264         CALL  CNVRT3   ;CONVERT DATA PACKET
00D5 2A904F     265         LHLD  HPCNVT
00D8 3E13       266         MVI   A,13H
00DA CD5D03     267         CALL  OFFSET   ;UPDATE DATA CONVERTER POINTER TO POINT
                268                        ;AT NEXT DATA PACKET TO BE CONVERTED
00DD 3E26       269         MVI   A,26H
00DF BD         270         CMP   L        ;IS REG. L READY TO BE RESET TO LOCATION 1
00E0 C2E500     271         JNZ   TXCONT   ;IF NOT CONTINUE
00E3 2E00       272         MVI   L,00H    ;ELSE RESET TO LOCATION 1
00E5 22904F     273 TXCONT: SHLD  HPCNVT   ;STORE NEW VALUE OF CONVERTER POINTER
00E8 21A74F     274 TX1:    LXI   H,XMIT   ;PREPARE TO TURN-ON TRANSMITTER
```

```
00EB CDFE02       275         CALL    CMDOUT          ;OUTPUT CAMMANDS
00EE FB           276 TXLOOP: EI
00EF 3200E0       277         STA     RESET
00F2 00           278         NOP
00F3 C3EE00       279         JMP     TXLOOP
                  280         ;
                  281         ;
                  282 ;;;;;;;;;;;;;;;;;;;;;;;;;;;;;;;;;;;;;;;;;;;;;;;;;;;;;
                  283 ; THIS ROUTINE CHECKS THE POINTER VALUE IN THE H&L REGISTER
                  284 ; PAIR TO INSURE THAT IT IS NOT OUT-OF-RANGE
                  285 ; THE OUTPUT BUFFER IS DESIGNED TO HOLD 480 8-BYTE PACKETS IN
                  286 ; THE RANGE FROM 4026H TO 4F26H.
                  287 ;;;;;;;;;;;;;;;;;;;;;;;;;;;;;;;;;;;;;;;;;;;;;;;;;;;;;
                  288         ;
                  289         ;
00F6 7D           290 OVERFL: MOV     A,L             ;MOVE LSB OF POINTER INTO A
00F7 FE26         291         CPI     26H
00F9 C0           292         RNZ
00FA 7C           293         MOV     A,H             ;MOVE MSB OF POINTER INTO A
00FB FE4F         294         CPI     4FH
00FD C0           295         RNZ
00FE 212640       296         LXI     H,TOPOUT        ;IF POINTER IS 4F26H, RESET TO TOP
                  297                                 ;OF OUTPUT BUFFER
0101 3EFF         298         MVI     A,0FFH          ;SET CONVERTER BUFFER FULL FLAG (OUTPUT BUF)
0103 329E4F       299         STA     CNVBUF
0106 C9           300         RET
                  301         ;
                  302         ;
                  303         ;
                  304 ;;;;;;;;;;;;;;;;;;;;;;;;;;;;;;;;;;;;;;;;;;;;;;;;;;;;;
                  305 ; THIS ROUTINE INPUTS A DATA BYTE FROM THE 8273, THIS ROUTINE
                  306 ; ALSO CHECKS FOR TRANSMISSIONS ERRORS AS WELL AND THE END-
                  307 ; OF-MESSAGE FLAG.
                  308 ;;;;;;;;;;;;;;;;;;;;;;;;;;;;;;;;;;;;;;;;;;;;;;;;;;;;;
                  309         ;
                  310         ;
0107 3E0E         311 INPDAT: MVI     A,0EH           ;SET INTERRUPT MASK TO OUTPUT
0109 30           312         SIM                     ;TO CRT.
010A 3A0060       313         LDA     SSTAT           ;GET STATUS WORD FROM 8273
010D 32B54F       314         STA     STATUS          ;STORE STATUS WORD
0110 E602         315         ANI     02H             ;IS THERE A RECEIVER INTERRUPT RESULT
0112 CA8001       316         JZ      INBYTE          ;IF NOT, INPUT DATA IS AVAILABLE
0115 3AB54F       317         LDA     STATUS          ;ELSE, READ STATUS BYTE & DETERMINE RESULT
0118 E610         318         ANI     10H             ;IS IT AN IMMEDIATE RESULT
011A CA2101       319         JZ      CONTR           ;IF NOT CONTINUE
011D 3A0160       320         LDA     RESULT          ;ELSE, READ RESULT
0120 C9           321         RET
0121 3A0360       322 CONTR:  LDA     RXIR            ;GET RECEIVER INTERRUPT RESULT
0124 FE03         323         CPI     03H             ;IS THERE A CRC ERROR
0126 CA6D01       324         JZ      DATCRC          ;IF SO, SEE WANT KIND
0129 E60F         325         ANI     0FH             ;IS PACKET RECEIVED COMPLETE AND ERROR FREE
012B 3E00         326         MVI     A,00H           ;RESET DATA INPUT COUNTER
012D 32B74F       327         STA     GETID
0130 CA3F01       328         JZ      GOODR           ;IF SO, GOTO GOOD RECEIVE
0133 3EC3         329 BADR:   MVI     A,0C3H          ;NEGATIVE ACKNOWLEDGEMENT BYTE
0135 32BC4F       330         STA     TXBYTE          ;STORE IN BYTE TO BE TRANSMITTED LOACTION
0138 21E800       331         LXI     H,TX1           ;SET RETURN POINTER TO TRANSMIT NACK
```

```
013B E3          332          XTHL                    ;SWITCH WITH STACK
013C C34B01      333          JMP     RSTAT           ;GOTO STATUS LOOP
013F 3EA5        334 GOODR:   MVI     A,0A5H          ;POSITIVE ACKNOWLEDGEMENT
0141 32BC4F      335          STA     TXBYTE
0144 32BD4F      336          STA     DATAVA          ;SET DATA AVAILABLE FLAG
0147 21B900      337          LXI     H,TXSTRT        ;SET RETURN VECTOR TO CONVERT DATA AND TRANS.
014A E3          338          XTHL                    ;SWITCH WITH STACK
014B 00          339 RSTAT:   NOP
014C 00          340          NOP
014D 00          341          NOP
014E 00          342          NOP
014F 00          343          NOP
0150 00          344          NOP
0151 3E08        345          MVI     A,08H           ;ENABLE ALL INTERRUPTS
0153 30          346          SIM
0154 3E0D        347          MVI     A,0DH           ;PUT CARRIAGE RETURN INTO CRT BUFFER
0156 32B64F      348          STA     CRTBUF          ;PUT CARRIAGE RETURN IN CRT BUFFER
0159 3A0060      349 RSTATL:  LDA     SSTAT           ;READ STATUS
015C E608        350          ANI     08H             ;ANY RECEIVER INTERRUPTS PENDING
015E C8          351          RZ                      ;IF NO RETURN
015F 3A0060      352          LDA     SSTAT           ;ELSE, READ STATUS AGAIN TO CHECK FOR RXIR
0162 E602        353          ANI     02H             ;IS A RXIR AVAILABLE
0164 CA5901      354          JZ      RSTATL          ;IF NOT, WAIT
0167 3A0360      355          LDA     RXIR            ;ELSE, READ INTERRUPT RESULT BYTE
016A C35901      356          JMP     RSTATL          ;CHECK TO SEE IF ANY MORE RESULTS EXIST
                 357          ;
016D 3AB74F      358 DATCRC:  LDA     GETID           ;SEE IF ANY DATA HAS BEEN INPUT YET
0170 A7          359          ANA     A               ;SEE IF ZERO
0171 C27801      360          JNZ     BADCRC
0174 3E0A        361          MVI     A,0AH           ;ENABLE 7.5 AND 5.5
0176 30          362          SIM
0177 C9          363          RET
0178 3E00        364 BADCRC:  MVI     A,00H
017A 32B74F      365          STA     GETID           ;CLEAR HEADER COUNTER
017D C33301      366          JMP     BADR
                 367          ;
0180 3E0E        368 INBYTE:  MVI     A,0EH           ;SET INTERRUPT MASK TO INPUT SERIAL DATA
0182 30          369          SIM
0183 3AB74F      370          LDA     GETID           ;GET DATA INPUT COUNTER
0186 E603        371          ANI     03H             ;SEE IF DATA, ID, OR ADDRESS IS EXPECTED
0188 C29401      372          JNZ     REALDT          ;IF 2 OR 3, INPUT BYTE IS DATA OR ID
018B 3E02        373          MVI     A,02H
018D 32B74F      374          STA     GETID           ;STORE 2, ADDRESS ALREADY RECEIVED
0190 3A00B0      375          LDA     SDATAI          ;READ ADDRESS TO CLEAR INTERRUPTS
0193 C9          376          RET
0194 FE02        377 REALDT:  CPI     02H             ;IS BYTE DATA OR ID
0196 C2D601      378          JNZ     GETBYT          ;IF VALUE IS 2, INPUT BYTE IS ID
0199 3E03        379          MVI     A,03H
019B 32B74F      380          STA     GETID           ;STORE 3, ID AND ADDRESS ALREADY RECEIVED
019E 3A00B0      381          LDA     SDATAI          ;READ INPUT BYTE, ID
01A1 47          382          MOV     B,A             ;PUT ID INTO REG. B
01A2 3ABB4F      383          LDA     ID              ;GET PREVIOUS PACKET ID
01A5 B8          384          CMP     B               ;ARE THEY THE SAME
01A6 C2BB01      385          JNZ     NEWPAC          ;IF NOT, THIS PACKET IS NOT A RETRANS.
01A9 218E4F      386 SAMEPC:  LXI     H,SAMPAC        ;PUT LOCATION OF REPEAT PACKET COUNT INTO HL
01AC 35          387          DCR     M               ;DECREMENT CURRENT REPEAT PACKET COUNT
01AD CAB701      388          JZ      RSLOP           ;IF 15 REPEAT HAVE BEEN RECEIVED, RESET BOARD
```

```
01B0 2AA24F     389        LHLD   POINTI    ;ELSE, PACKET IS RETRANS. RESET POINTERS
01B3 22B34F     390        SHLD   CURRENT
01B6 C9         391        RET
01B7 00         392 RSLOP: NOP              ;THIS IS A INFINITE LOOP TO RESET BOARD
01B8 C3B701     393        JMP    RSLOP
01BB 78         394 NEWPAC: MOV   A,B       ;PUT NEWLY READ ID BACK INTO A
01BC 32BB4F     395        STA    ID        ;STORE NEW PACKET ID
01BF 2AB34F     396        LHLD   CURRENT   ;SINCE NEW DATA, UPDATE POINTERS
01C2 7D         397        MOV    A,L       ;PUT REG. L INTO A
01C3 FE26       398        CPI    26H       ;HAS INPUT LOCATION 2 BEEN LOADED
01C5 C2CA01     399        JNZ    NEWCON    ;IF NOT, PUT DATA THERE
01C8 2E00       400        MVI    L,00H     ;ELSE, PUT DATA IN LOCATION 1
01CA 22B34F     401 NEWCON: SHLD  CURRENT
01CD 22A24F     402        SHLD   POINTI
01D0 3AAD4F     403        LDA    PACKET    ;GET CURRENT PACKET COUNT
01D3 FED0       404        CPI    0D0H      ;IS PACKET COUNT AT MAXIMUM
01D5 C8         405        RZ               ;IF SO, RETURN
01D6 3C         406        INR    A         ;ELSE, INCREMENT THE PACKET COUNT
01D7 32AD4F     407        STA    PACKET    ;STORE UPDATED VALUE
01DA C9         408        RET
01DB 3E0A       409 GETBYT: MVI   A,0AH     ;SET INTERRUPT MASK TO OUTPUT TO CRT
01DD 30         410        SIM
01DE 2AB34F     411        LHLD   CURRENT   ;GET CURRENT INPUT POINTER
01E1 3A00B0     412        LDA    SDATAI    ;GET INPUT DATA BYTE
01E4 77         413        MOV    M,A       ;SAVE BYTE IN RAM
01E5 32B64F     414        STA    CRTBUF    ;PUT DATA BYTE IN CRT OUTPUT BUFFER
01E8 23         415        INX    H
01E9 22B34F     416        SHLD   CURRENT   ;STORE UPDATED POINTER
01EC C9         417        RET
                418        ;
                419        ;
                420 ;;;;;;;;;;;;;;;;;;;;;;;;;;;;;;;;;;;;;;;;;;;;;;;;;;;;;;;;;;;;;
                421 ; THIS ROUTINE OUTPUTS A SINGLE DATA BYTE TO THE 8273 UPON
                422 ; REQUEST, THIS ROUTINE ALSO CHECKS FOR TRANSMISSION ERRORS AND
                423 ; END-OF-MESSAGE INTERRUPTS.
                424 ;;;;;;;;;;;;;;;;;;;;;;;;;;;;;;;;;;;;;;;;;;;;;;;;;;;;;;;;;;;;;
                425        ;
                426        ;
                427        ;
01ED 3A0060     428 OUTACK: LDA   SSTAT     ;GET STATUS FROM 8273
01F0 32B54F     429        STA    STATUS    ;STORE CURRENT STATUS
01F3 E601       430        ANI    01H       ;IS THERE AN INTERRUPT RESULT AVAIL.
01F5 CA3202     431        JZ     OUTBYT    ;IF NOT, OUTPUT DATA BYTE
01F8 3AB54F     432        LDA    STATUS    ;GET PREVIOUSLY READ STATUS BYTE
01FB E610       433        ANI    10H       ;IS THERE AN IMMEDIATE RESULT AVAIL.
01FD CA0402     434        JZ     CONT      ;IF NOT CONTINUE ON
0200 3A0160     435        LDA    6001H     ;IF SO, READ RESULT
0203 C9         436        RET
0204 3A0260     437 CONT:  LDA    TXIR      ;READ INTERRUPT RESULT BYTE
0207 FE0D       438        CPI    0DH       ;IS PACKET COMPLETE AND ERROR FREE
0209 C21602     439        JNZ    BAD       ;IF NOT, GOTO TO BAD

LOC  OBJ        LINE       SOURCE STATEMENT 020C 21BA4F     440        LXI    H,ADDRES  ;ELSE, RESET ACK. BUFFER POINTER
020F 22BD4F     441        SHLD   TXPNT
0212 C31C02     442        JMP    STATLP    ;CHECK AGAIN
```

```
0215 00            443         NOP                    ;TURN RECEIVER ON AT THIS POINT
0216 21BA4F        444 BAD:    LXI    H,ADDRES
0219 22BD4F        445         SHLD   TXPNT
                   446         ;
021C 3A0060        447 STATLP: LDA    SSTAT           ;GET STATUS BYTE TO CHECK FOR RESULTS
021F E601          448         ANI    01H             ;ARE THERE ANY MORE RESULTS AVAILABLE
0221 CA2A02        449         JZ     TURNON          ;IF NO RESULTS, RETURN (RZ)
0224 3A0260        450         LDA    TXIR            ;READ INTERRUPT RESULT BYTE
0227 C31C02        451         JMP    STATLP          ;CHECK FOR MORE RESULT BYTES
022A 217E00        452 TURNON: LXI    H,RECON         ;LOAD HL WITH RETURN ADDRESS
022D E3            453         XTHL                   ;PUT ON TOP OF STACK
022E 3E0E          454         MVI    A,0EH           ;SET INTR. MASK TO RECEIVE
0230 30            455         SIM
0231 C9            456         RET
0232 2ABD4F        457 OUTBYT: LHLD   TXPNT           ;GET CURRENT ACK. OUTPUT DATA POINTER
0235 7E            458         MOV    A,M             ;PUT DATA BYTE INTO A
0236 320070        459         STA    SDATA0          ;OUTPUT DATA TO 8273
0239 23            460         INX    H
023A 22BD4F        461         SHLD   TXPNT           ;STORE UPDATED ACK. OUPUT POINTER
023D C9            462         RET
                   463         ;
                   464         ;
                   465 ;;;;;;;;;;;;;;;;;;;;;;;;;;;;;;;;;;;;;;;;;;;;;;;;;;;;;;;;;;;;;
                   466 ; THIS ROUTINE OUTPUT 8-BIT PARALLEL DATA TO THE MUX BOARD VIA
                   467 ; THE 8255 I/O CHIP. IC4 PORT B IS USED FOR THIS PURPOSE.
                   468 ;;;;;;;;;;;;;;;;;;;;;;;;;;;;;;;;;;;;;;;;;;;;;;;;;;;;;;;;;;;;;
                   469         ;
                   470         ;
023E 3E2F          471 HPOUT:  MVI    A,MSTOP         ;PREPARE TO STOP MUX BOARD FROM POLLING
0240 D320          472         OUT    PORT5A          ;PULL MUX STOP LINE HIGH
0242 20            473         RIM                    ;SEE IF THIS BOARD IS STILL SELECTED
0243 07            474         RLC
0244 DA4C02        475         JC     HPLOP1          ;IF STILL SELECTED, BEGIN OUTPUTTING (JC)
0247 3EFF          476         MVI    A,MUXRUN        ;ELSE, RELEASE MUX BOARD AND RETURN
0249 D320          477         OUT    PORT5A          ;RESET STOP LINE LOW
024B C9            478         RET
                   479         ;
024C 3E0C          480 HPLOP1: MVI    A,00001100B     ;PREPARE TO ENABLE OUTPUTS ON 74LS245
024E D313          481         OUT    CPORT4          ;RESET BIT 6, PORT 4C
0250 212640        482         LXI    H,TOPOUT        ;PUT OUTPUT DATA POINTER INTO H AND L
0253 7E            483 HPLOP2: MOV    A,M             ;GET DATA BYTE
0254 D311          484         OUT    PORT4B          ;OUTPUT TO MUX BOARD
0256 00            485         NOP                    ;ALLOW OUTPUT DATA TO STABLIZE
0257 00            486         NOP
0258 3200D0        487         STA    MUXWR           ;STROBE DATA INTO MUX BOARD
025B 23            488         INX    H               ;INCREMENT OUTPUT POINTER AND CONTINUE
025C 3A8A4F        489         LDA    CNVRTP          ;GET ADDRESS OF LAST CONVERTED PACKET
025F BD            490         CMP    L               ;HAS ALL CONVERTED DATA BEEN TRANSFERRED
0260 C25302        491         JNZ    HPLOP2          ;IF NOT, CONTINUE TRANSFER PROCESS
0263 3A8B4F        492         LDA    CNVRTH          ;GET MSB OF ADDRESS
0266 BC            493         CMP    H               ;DO THEY MATCH
0267 C25302        494         JNZ    HPLOP2          ;IF NOT, CONTINUE TRANSFER
                   495         ;
026A 3E0D          496 OUTDON: MVI    A,00001101B     ;DISABLE OUTPUT ON 74LS245
026C D313          497         OUT    CPORT4          ;SET BIT 6, PORT 4C
026E 3EFF          498         MVI    A,MUXRUN        ;PREPARE TO RELEASE MUX BOARD
```

```
0270 D320         499            OUT    PORT5A       ;STOP LINE LOW
0272 3E00         500            MVI    A,00H
0274 329E4F       501            STA    CNVBUF       ;RESET BUFFER FULL FLAG
0277 328C4F       502            STA    TXFLG        ;RESET TXFLG, NO DATA READY FOR TRANSFER
027A 212640       503            LXI    H,TOPOUT     ;RESET CONVERTER POINTER TO TOP-OF-BUFFER
027D 228A4F       504            SHLD   CNVRTP
0280 C9           505            RET
                  506            ;
                  507            ;
                  508 ;;;;;;;;;;;;;;;;;;;;;;;;;;;;;;;;;;;;;;;;;;;;;;;;;;;;;;;;;;;;;
                  509 ; THIS IS THE ROUTINE TO OUTPUT THE INPUT DATA TO THE CRT CONSOLE.
                  510 ; DATA TO BE OUTPUT IS PLACED IN THE CRTBUF PRIOR TO THE CALLING
                  511 ; OF THIS ROUTINE.
                  512 ;;;;;;;;;;;;;;;;;;;;;;;;;;;;;;;;;;;;;;;;;;;;;;;;;;;;;;;;;;;;;
                  513            ;
                  514            ;
0281 3A864F       515 OUTCRT:    LDA    CRTBUF       ;GET DATA BYTE TO BE OUTPUT
0284 320090       516            STA    ADATA        ;OUTPUT DATA TO CRT VIA J5 OR J3, (IC1)
0287 FE0D         517            CPI    0DH          ;WAS OUTPUT BYTE A CR
0289 CA9002       518            JZ     PUTLF        ;IF SO, PREPARE TO OUTPUT LF
028C 3E1C         519            MVI    A,1CH        ;SET INTERRUPT MASK TO WAIT FOR INPUT INTR.
028E 30           520            SIM
028F C9           521            RET
0290 3E1C         522 PUTLF:     MVI    A,1CH        ;ENABLE BOTH 6.5 ONLY
0292 30           523            SIM
0293 3E0A         524            MVI    A,0AH        ;PUT LF IN CRT BUFFER
0295 32864F       525            STA    CRTBUF
0298 C9           526            RET
                  527            ;
                  528 ;;;;;;;;;;;;;;;;;;;;;;;;;;;;;;;;;;;;;;;;;;;;;;;;;;;;;;;;;;;;;
                  529 ; BELOW ARE THE ROUTINES TO SET-UP AND INITIALIZE THE 8250'S
                  530 ; AND THE 8273.
                  531 ;;;;;;;;;;;;;;;;;;;;;;;;;;;;;;;;;;;;;;;;;;;;;;;;;;;;;;;;;;;;;
                  532            ;
                  533            ;
0299 3E80         534 I82501:    MVI    A,80H        ;SET-UP TO LOAD BAUD DIVISOR
029B 320390       535            STA    LCR          ;WRITE TO LCR, SET DLAB=1
029E 3E34         536            MVI    A,34H        ;LSB OF DIVISOR, 8MHZ CRYSTAL (2400)
02A0 320090       537            STA    BAUDLS       ;4FH FOR 6MHZ CRYSTAL
02A3 3E00         538            MVI    A,00H        ;MSB OF DIVISOR
02A5 320190       539            STA    BAUDMS
02A8 3E07         540            MVI    A,07         ;8-BITS, NO PARITY, 2 STOP BITS
02AA 320390       541            STA    LCR          ;SET-UP OPERATING CONDITIONS
02AD 3E00         542            MVI    A,00H
02AF 320590       543            STA    ASTAT        ;CLEAR LINE STATUS REGISTER
02B2 3E02         544            MVI    A,02H        ;ENABLE TX BUFFER EMPTY INTERRUPT
02B4 320190       545            STA    DISINR       ;INTERRUPT ENABLE REGISTER
02B7 3E0F         546            MVI    A,0FH        ;ACTIVATE MODEM CONTROL LINES
02B9 320490       547            STA    LCR+1
02BC C9           548            RET
                  549 ;
                  550 ;
02BD 212103       551 I8273:     LXI    H,OPMODES
02C0 CDFE02       552            CALL   CMDOUT
02C3 212403       553            LXI    H,SMODES
02C6 CDFE02       554            CALL   CMDOUT
```

```
02C9 212703    555          LXI    H,DTAXS
02CC CDFE02    556          CALL   CMDOUT
02CF 212A03    557          LXI    H,BITS
02D2 CDFE02    558          CALL   CMDOUT
02D5 212F03    559          LXI    H,RCV
02D8 CDFE02    560          CALL   CMDOUT
02DB C9        561          RET
               562 ;
               563 ;
02DC 3E80      564 I82502:  MVI    A,80H       ;SET-UP TO LOAD BAUD DIVISOR
02DE 320380    565          STA    8003H       ;WRITE TO LCR, SET DLAB=1
02E1 3E68      566          MVI    A,68H       ;LSB OF DIVISOR, 8MHZ CRYSTAL
02E3 320080    567          STA    8000H       ;4FH FOR 6MHZ CRYSTAL
02E6 3E00      568          MVI    A,00H       ;MSB OF DIVISOR
02E8 320180    569          STA    8001H
02EB 3E07      570          MVI    A,07        ;8-BITS, NO PARITY, 2 STOP BITS
02ED 320380    571          STA    8003H       ;SET-UP OPERATING CONDITIONS
02F0 3E00      572          MVI    A,00H
02F2 320180    573          STA    8001H       ;CLEAR LINE STATUS REGISTER
02F5 320580    574          STA    8005H       ;DISABLE INTERRUPTS
02F8 3E0F      575          MVI    A,0FH
02FA 320480    576          STA    8004H
02FD C9        577          RET
               578 ;
02FE 0E30      579 CMDOUT:  MVI    C,30H
0300 46        580          MOV    B,M
0301 23        581          INX    H
0302 3A0060    582 CMD1:    LDA    SSTAT
0305 07        583          RLC
0306 DA0203    584          JC     CMD1
0309 7E        585          MOV    A,M
030A 320060    586          STA    SCMDRG
030D 78        587 CMD2:    MOV    A,B
030E A7        588          ANA    A
030F C8        589          RZ
0310 23        590          INX    H
0311 05        591          DCR    B
0312 3A0060    592 CMD3:    LDA    SSTAT
0315 E620      593          ANI    20H
0317 C21203    594          JNZ    CMD3
031A 7E        595          MOV    A,M
031B 320160    596          STA    SPRMRG
031E C30D03    597          JMP    CMD2
               598 ;
               599 ;
0321 01        600 OPMODES:        DB     01,91H,00000011B    ;NON-BUFFERED MODE
0322 91
0323 03
0324 01        601 SMODES:         DB     01,0A0H,00000000B
0325 A0

0326 00
0327 01        602 DTAXS:          DB     01,97H,00000001B
0328 97
0329 01
032A 01        603 BITS:           DB     01,0A4H,00000000B
032B A4
```

```
032C 00
032D 00       604 DR:        DB      00,0C5H
032E C5
032F 02       605 RCV:       DB      02,0C0H,15H,00H         ;RECEIVE 19 BYTES
0330 C0
0331 15
0332 00
              606 ;                                          ;PLUS ADDRESS AND ID
              607 ;
              608 ;
0333 3E02     609 IXMIT:     MVI     A,02H                   ;TWO PARAMETERS IN COMMAND
0335 32A74F   610            STA     XMIT                    ;STORE IN RAM
0338 3EC8     611            MVI     A,0C8H                  ;GENERAL TRANSMIT COMMAND
033A 32A84F   612            STA     XMIT+1
033D 3E03     613            MVI     A,03H                   ;LSB OF PACKET LENGTH
033F 32A94F   614            STA     XMIT+2
0342 3E00     615            MVI     A,00H                   ;MSB OF PACKET LENGTH
0344 32AA4F   616            STA     XMIT+3
0347 C9       617            RET
              618 ;
              619 ;
              620 ;;;;;;;;;;;;;;;;;;;;;;;;;;;;;;;;;;;;;;;;;;;;;;;;;;;;;;;;;;;;
              621 ; THIS ROUTINE INITIALIZES BOTH 8255 CHIPS.
              622 ;;;;;;;;;;;;;;;;;;;;;;;;;;;;;;;;;;;;;;;;;;;;;;;;;;;;;;;;;;;;
              623 ;
              624 ;
0348 3E90     625 I8255:     MVI     A,10010000B             ;CONTROL WORD, MODE 0, A=INPUT
              626                                            ;B AND C=OUTPUT
034A D313     627            OUT     CPORT4
034C 3E82     628            MVI     A,10000010B             ;CONTROL WORD, MODE 0, A=OUPUT
              629                                            ;B AND C INPUT
034E D323     630            OUT     CPORT5
0350 3E1F     631            MVI     A,MRESET                ;RESET MUX BOARD
0352 D320     632            OUT     PORT5A                  ;ZERO OUTPUT PORT 5A, THIS ALSO RESETS MUX
0354 3EFF     633            MVI     A,0FFH                  ;DISABLE OUTPUTS AND SET DIRECTION OF
              634                                            ;IC13, 74LS245.
0356 D312     635            OUT     PORT4C
0358 3EFF     636            MVI     A,MUXRUN                ;RELEASE MUX FROM ACTIVE RESET
035A D320     637            OUT     PORT5A
035C C9       638            RET
              639 ;
              640 ;
              641 ;;;;;;;;;;;;;;;;;;;;;;;;;;;;;;;;;;;;;;;;;;;;;;;;;;;;;;;;;;;;
              642 ; THIS ROUTINE ADDS TO THE H AND L REGISTERS THE VALUE IN A.
              643 ; THE NEW OFFSET VALUE IS RETURNED IN H AND L.
              644 ;;;;;;;;;;;;;;;;;;;;;;;;;;;;;;;;;;;;;;;;;;;;;;;;;;;;;;;;;;;;
              645 ;
              646 ;
035D 85       647 OFFSET:    ADD     L                       ;ADD THE VALUE IN REG. A TO REG. L
035E 6F       648            MOV     L,A                     ;REPLACE REG. L WITH NEW VALUE
035F 3E00     649            MVI     A,00H
0361 8C       650            ADC     H                       ;ADD CARRY (IF ANY) TO REG. H
0362 67       651            MOV     H,A                     ;REPLACE H WITH NEW VALUE
0363 C9       652            RET
              653 ;
              654 ;
```

```
                655 ;;;;;;;;;;;;;;;;;;;;;;;;;;;;;;;;;;;;;;;;;;;;;;;;;;;;;;;;;;;;
                656 ; THIS ROUTINE CONVERTS A 3-DIGIT NUMBER (ASCII) INTO A 10-BIT
                657 ; BINARY NUMBER.
                658 ;;;;;;;;;;;;;;;;;;;;;;;;;;;;;;;;;;;;;;;;;;;;;;;;;;;;;;;;;;;;
                659         ;
                660         ;
0364 7E         661 CNVRT3: MOV     A,M             ;GET SEVENTH DIGIT
0365 D630       662         SUI     30H             ;CONVERT
0367 6F         663         MOV     L,A
0368 2600       664         MVI     H,00H
036A 22964F     665         SHLD    BYTE34
                666         ;
036D 2A924F     667         LHLD    HPSAVE
0370 2B         668         DCX     H
0371 7E         669         MOV     A,M             ;GET SIXTH DIGIT
0372 D630       670         SUI     30H
0374 21000C     671         LXI     H,LT10
0377 85         672         ADD     L
0378 6F         673         MOV     L,A
0379 5E         674         MOV     E,M
037A 1600       675         MVI     D,00H
037C 2A964F     676         LHLD    BYTE34
037F CDD504     677         CALL    WORDAD
0382 22964F     678         SHLD    BYTE34
                679         ;
0385 2A924F     680         LHLD    HPSAVE
0388 2B         681         DCX     H
0389 2B         682         DCX     H
038A 7E         683         MOV     A,M             ;GET FIFTH DIGIT
038B 2B         684         DCX     H
038C 22924F     685         SHLD    HPSAVE
038F D630       686         SUI     30H
0391 87         687         ADD     A
0392 21000B     688         LXI     H,LT100
0395 85         689         ADD     L
0396 6F         690         MOV     L,A
0397 5E         691         MOV     E,M
0398 23         692         INX     H
0399 56         693         MOV     D,M
039A 2A964F     694         LHLD    BYTE34
039D CDD504     695         CALL    WORDAD
03A0 22964F     696         SHLD    BYTE34
                697         ;
                698         ;
                699 ;;;;;;;;;;;;;;;;;;;;;;;;;;;;;;;;;;;;;;;;;;;;;;;;;;;;;;;;;;;;
                700 ; THIS ROUTINE CONVERTS A 4-DIGIT NUMBER (ASCII) INTO A 14-BIT
                701 ; BINARY VALUE.
                702 ;;;;;;;;;;;;;;;;;;;;;;;;;;;;;;;;;;;;;;;;;;;;;;;;;;;;;;;;;;;;
                703         ;
                704         ;
03A3 2A924F     705 CNVRT4: LHLD    HPSAVE          ;GET CURRENT CONVERT DATA POINTER
03A6 7E         706         MOV     A,M             ;GET FOURTH DIGIT, LSB
03A7 D630       707         SUI     30H             ;CONVERT ASCII TO HEX
03A9 6F         708         MOV     L,A             ;PUT IN REG. L
03AA 2600       709         MVI     H,00H           ;ZERO THE H REG.
03AC 22944F     710         SHLD    BYTE12          ;SAVE IN BYTEE 1 AND 2 LOCATION
```

```
03AF 2A924F   712      LHLD   HPSAVE   ;GET CONVERTER POINTER
03B2 2B       713      DCX    H        ;POINT AT THIRD DIGIT
03B3 7E       714      MOV    A,M      ;GET DIGIT
03B4 D630     715      SUI    30H      ;CONVERT TO HEX
03B6 21000C   716      LXI    H,LT10   ;PUT LOOK-UP TABLE BASE ADDRESS IN HL
03B9 85       717      ADD    L        ;INCREMENT BASE TO APPROPRIATE MULTIPLIER
03BA 6F       718      MOV    L,A
03BB 5E       719      MOV    E,M      ;GET THE MULTIPLIER
03BC 1600     720      MVI    D,00H
03BE 2A944F   721      LHLD   BYTE12   ;GET CURRENT VALUE OF BYTEES 1 AND 2
03C1 CDD504   722      CALL   WORDAD   ;ADD THE CURRENT VALUE TO THE PRODUCT
03C4 22944F   723      SHLD   BYTE12   ;STORE THE NEW VALUE FOR BYTEES 1 AND 2
              724      ;
03C7 2A924F   725      LHLD   HPSAVE
03CA 2B       726      DCX    H
03CB 2B       727      DCX    H
03CC 7E       728      MOV    A,M      ;GET SECOND DIGIT
03CD D630     729      SUI    30H      ;CONVERT
03CF 87       730      ADD    A
03D0 21000B   731      LXI    H,LT100  ;GET BASE ADDRESS
03D3 85       732      ADD    L        ;OFFSET THE ADDRESS
03D4 6F       733      MOV    L,A
03D5 5E       734      MOV    E,M      ;GET MULTIPLIER
03D6 23       735      INX    H
03D7 56       736      MOV    D,M
03D8 2A944F   737      LHLD   BYTE12   ;GET BYTEES 1&2
03DB CDD504   738      CALL   WORDAD   ;ADD THE PRODUCT TO THE CURRENT VALUE
03DE 22944F   739      SHLD   BYTE12   ;STORE NEW VALUE
              740      ;
03E1 2A924F   741      LHLD   HPSAVE
03E4 2B       742      DCX    H
03E5 2B       743      DCX    H
03E6 2B       744      DCX    H
03E7 7E       745      MOV    A,M      ;GET FIRST DIGIT
03E8 2B       746      DCX    H
03E9 22924F   747      SHLD   HPSAVE
03EC D630     748      SUI    30H      ;CONVERT
03EE 87       749      ADD    A
03EF 21000A   750      LXI    H,LT1000 ;GET BASE ADDRESS
03F2 85       751      ADD    L        ;OFFSET BASE
03F3 6F       752      MOV    L,A
03F4 5E       753      MOV    E,M      ;GET MULTIPLIER
03F5 23       754      INX    H
03F6 56       755      MOV    D,M
03F7 2A944F   756      LHLD   BYTE12   ;GET CURRENT VALUE
03FA CDD504   757      CALL   WORDAD   ;ADD THE VALUES
03FD 3EC0     758      MVI    A,0C0H   ;INSURE THE FIRST TWO BITS OF MSB ARE SET
03FF B4       759      ORA    H
0400 67       760      MOV    H,A
0401 22944F   761      SHLD   BYTE12   ;STORE FINAL VALUE OF BYTEES 1 AND 2
              762      ;
              763      ;
              764      ;;;;;;;;;;;;;;;;;;;;;;;;;;;;;;;;;;;;;;;;;;;;;;;;;;;;;;;;;;;;;
              765      ; THIS ROUTINE CONVERTS A THREE DIGIT AREA CODE INTO A 2-BIT
              766      ; BINARY CODE. THIS ROUTINE ALSO COMBINES THIS VALUE WITH THE
```

```
767 ; EXISTING VALUE OF BYTEES 1 AND 2.
768 ;;;;;;;;;;;;;;;;;;;;;;;;;;;;;;;;;;;;;;;;;;;;;;;;;;;;;;;;;;;;;;;
769        ;
770        ;
0404 2A924F   771 CNVRTA: LHLD  HPSAVE
0407 7E       772        MOV   A,M          ;GET THIRD AREA CODE DIGIT
0408 D630     773        SUI   30H          ;CONVERT TO HEX
040A 5F       774        MOV   E,A          ;PUT VALUE INTO REG. E
              775        ;
040B 2A924F   776        LHLD  HPSAVE
040E 2B       777        DCX   H
040F 7E       778        MOV   A,M
0410 D630     779        SUI   30H          ;CONVERT
0412 07       780        RLC
0413 07       781        RLC
0414 07       782        RLC
0415 07       783        RLC
0416 B3       784        ORA   E            ;COMBINE THIS VALUE WITH E
0417 5F       785        MOV   E,A          ;REPLACE REG. E WITH NEW VALUE
              786        ;
0418 2A924F   787        LHLD  HPSAVE
041B 2B       788        DCX   H
041C 2B       789        DCX   H
041D 7E       790        MOV   A,M          ;GET FIRST AREA CODE DIGIT
041E 2B       791        DCX   H
041F 22924F   792        SHLD  HPSAVE
0422 D630     793        SUI   30H          ;CONVERT
0424 67       794        MOV   H,A          ;PUT INTO REG. H
0425 3EF0     795        MVI   A,AREA       ;PUT MSB BASE OF AREA CODE LOOK-UP TABLE IN A
0427 B4       796        ORA   H            ;OFFSET REG. H
0428 67       797        MOV   H,A          ;H&L NOW HAVE ADDRESS OF 2-BIT AREA CODE
0429 6B       798        MOV   L,E          ;PUT LSB CURRENTLY IN REG. E, INTO L
042A 7E       799        MOV   A,M          ;GET 2-BIT AREA CODE
              800        ;
042B 2A944F   801        LHLD  BYTE12       ;GET CURRENT VALUE OF BYTES 1 AND 2
042E A4       802        ANA   H            ;COMBINE AREA CODE AND 14-BIT BINARY NUMBER
042F 67       803        MOV   H,A          ;PUT NEW VALUE INTO REGISTER H
0430 22944F   804        SHLD  BYTE12       ;STORE FINAL VALUE
              805        ;
              806        ;
              807 ;;;;;;;;;;;;;;;;;;;;;;;;;;;;;;;;;;;;;;;;;;;;;;;;;;;;;;;;;;;;
              808 ; THIS ROUTINE TAKES FOUR ACSII DIGITS, CONVERTS THEM INTO BINARY
              809 ; AND COMBINES THEM.
              810 ;;;;;;;;;;;;;;;;;;;;;;;;;;;;;;;;;;;;;;;;;;;;;;;;;;;;;;;;;;;;
              811        ;
              812        ;
0433 2A924F   813 CNVRTD: LHLD  HPSAVE
0436 7E       814        MOV   A,M          ;GET FIRST DATA DIGIT
0437 D630     815        SUI   30H          ;CONVERT
0439 47       816        MOV   B,A          ;PUT INTO B
              817        ;
043A 2B       818        DCX   H
043B 7E       819        MOV   A,M          ;GET SECOND DATA DIGIT
043C D630     820        SUI   30H
043E 07       821        RLC                ;PUT 2ND BCD DIGIT INTO MSN
043F 07       822        RLC
```

```
0440 07          823        RLC
0441 07          824        RLC
0442 B0          825        ORA     B         ;COMBINE REGISTERS A AND B
0443 6F          826        MOV     L,A
0444 2600        827        MVI     H,00H
0446 229A4F      828        SHLD    BYTE78    ;SAVE WORD #3, BYTES 7 AND 8
                 829        ;
0449 2A924F      830        LHLD    HPSAVE
044C 2B          831        DCX     H
044D 2B          832        DCX     H
044E 7E          833        MOV     A,M       ;GET THIRD DATA DIGIT
044F D630        834        SUI     30H
0451 47          835        MOV     B,A
                 836        ;
0452 2B          837        DCX     H
0453 7E          838        MOV     A,M       ;GET FOURTH DATA DIGIT
0454 D630        839        SUI     30H
0456 07          840        RLC
0457 07          841        RLC
0458 07          842        RLC
0459 07          843        RLC
045A B0          844        ORA     B
045B 6F          845        MOV     L,A
045C 2600        846        MVI     H,00H
045E 22984F      847        SHLD    BYTE56    ;STORE BYTES 5 AND 6, WORD #2
                 848        ;
                 849        ;
                 850        ;;;;;;;;;;;;;;;;;;;;;;;;;;;;;;;;;;;;;;;;;;;;;;;;;;;;
                 851        ; THIS ROUTINE TRANSFERS THE CONVERTED DATA PACKET TO THE OUTPUT
                 852        ; BUFFER.
                 853        ;;;;;;;;;;;;;;;;;;;;;;;;;;;;;;;;;;;;;;;;;;;;;;;;;;;;
                 854        ;
                 855        ;
0461 2A8A4F      856        LHLD    CNVRTP    ;GET OUTPUT BUFFER POINTER
0464 EB          857        XCHG              ;PUT INTO REGITERS D&E
                 858        ;
0465 2A944F      859        LHLD    BYTE12    ;GET FIRST TWO BYTES
0468 7D          860        MOV     A,L
0469 12          861        STAX    D
046A 13          862        INX     D
046B 7C          863        MOV     A,H
046C 12          864        STAX    D
046D 13          865        INX     D
                 866        ;
046E 2A964F      867        LHLD    BYTE34    ;GET SECOND WORD
0471 7D          868        MOV     A,L
0472 12          869        STAX    D
0473 13          870        INX     D
0474 7C          871        MOV     A,H
0475 12          872        STAX    D
0476 13          873        INX     D
                 874        ;
0477 2A984F      875        LHLD    BYTE56    ;GET THIRD WORD
047A 7D          876        MOV     A,L
047B 12          877        STAX    D
047C 13          878        INX     D
```

```
047D 7C       879         MOV     A,H
047E 12       880         STAX    D
047F 13       881         INX     D
              882         ;
0480 2A9A4F   883         LHLD    BYTE78          ;GET FOURTH WORD
0483 7D       884         MOV     A,L
0484 12       885         STAX    D
0485 13       886         INX     D
0486 7C       887         MOV     A,H
0487 12       888         STAX    D
0488 13       889         INX     D
              890         ;
0489 EB       891         XCHG
048A CDF600   892         CALL    OVERFL          ;SEE IF BUFFER POINTER IS STILL IN RANGE
048D 22BA4F   893         SHLD    CNVRTP          ;SAVE NEW OUTPUT BUFFER POINTER
              894         ;
0490 21AD4F   895         LXI     H,PACKET        ;PUT THE ADDRESS OF PACKET INTO HL
0493 35       896         DCR     M               ;DECREMENT THE CURRENT PACKET COUNT
0494 218C4F   897         LXI     H,TXFLG         ;PUT ADDRESS OF TXFLG IN HL
0497 36FF     898         MVI     M,0FFH          ;SET DATA AVAILABLE FOR TRANSFER FLAG
0499 3E00     899         MVI     A,00H
049B 328D4F   900         STA     DATAVA          ;RESET DATA AVAILABLE FLAG
049E C9       901         RET
              902         ;
              903         ;
              904         ;
              905 ;;;;;;;;;;;;;;;;;;;;;;;;;;;;;;;;;;;;;;;;;;;;;;;;;;;;;;;;;;;
              906 ; THIS ROUTINE MULTIPLIES A 16-BIT VALUE BY A 8-BIT VALUE.
              907 ; THE NUMBER TO BE MULTIPLIED SHOULD BE STORED IN MEMORY LOC. VALUE.
              908 ; REGISTERS H&L SHOULD ALSO CONTAIN THE VALUE TO BE MULTIPLIED.
              909 ; REGISTER A SHOULD CONTAIN THE MULTIPLIER.
              910 ; THE RESULT (PRODUCT) WILL BE RETURNED IN THE H AND L REGISTERS.
              911 ;;;;;;;;;;;;;;;;;;;;;;;;;;;;;;;;;;;;;;;;;;;;;;;;;;;;;;;;;;;
              912         ;
              913         ;
049F 07       914 MULTI:  RLC                     ;SEE IF ODD OR EVEN MULTIPLIER
04A0 DAB604   915         JC      ODD             ;IF CARRY, MULTIPLIER IS ODD
              916         ;
04A3 0F       917 EVEN:   RRC                     ;READJUST MULTIPLIER
04A4 57       918         MOV     D,A             ;PUT IT IN D
04A5 7D       919         MOV     A,L             ;PUT VALUE TO BE MULTIPLIED INTO A
04A6 15       920 ELP1:   DCR     D               ;DECREMENT MULTIPLY COUNTER
04A7 CAD404   921         JZ      DONE
04AA 17       922         RAL
04AB D2A604   923         JNC     ELP1
04AE 6F       924         MOV     L,A
04AF 7C       925         MOV     A,H
04B0 17       926         RAL
04B1 67       927         MOV     H,A
04B2 7D       928         MOV     A,L
04B3 C3A604   929         JMP     ELP1
              930         ;
04B6 3F       931 ODD:    CMC                     ;CLEAR CARRY
04B7 1F       932         RAR                     ;ADJUST MULTIPLIER
04B8 57       933         MOV     D,A
04B9 7D       934         MOV     A,L
```

```
04BA 15        935 OLP1:   DCR   D
04BB CACA04    936        JZ    NOWADD
04BE 17        937        RAL
04BF D2BA04    938        JNC   OLP1
04C2 6F        939        MOV   L,A
04C3 7C        940        MOV   A,H
04C4 17        941        RAL
04C5 67        942        MOV   H,A
04C6 7D        943        MOV   A,L
04C7 C3BA04    944        JMP   OLP1
               945        ;
04CA EB        946 NOWADD: XCHG
04CB 2A9C4F    947        LHLD  VALUE
04CE 7D        948        MOV   A,L
04CF 83        949        ADD   E
04D0 6F        950        MOV   L,A
04D1 7C        951        MOV   A,H
04D2 8A        952        ADC   D
04D3 67        953        MOV   H,A
               954        ;
04D4 C9        955 DONE:  RET
               956        ;
               957        ;
               958 ;;;;;;;;;;;;;;;;;;;;;;;;;;;;;;;;;;;;;;;;;;;;;;;;;;;;;;;;;
               959 ; THIS ROUTINE ADDS TWO 16-BIT WORDS.
               960 ; ONE WORD SHOULD BE PLACED IN THE D&E REG. AND THE OTHER IN THE
               961 ; H&L REG.
               962 ; THE RESULT (SUM) IS RETURNED IN THE H&L REGISTERS.
               963 ;;;;;;;;;;;;;;;;;;;;;;;;;;;;;;;;;;;;;;;;;;;;;;;;;;;;;;;;;
               964        ;
               965        ;
04D5 7B        966 WORDAD: MOV   A,E
04D6 85        967        ADD   L
04D7 6F        968        MOV   L,A
04D8 7A        969        MOV   A,D
04D9 8C        970        ADC   H
04DA 67        971        MOV   H,A
04DB C9        972        RET
               973        ;
               974        ;
               975        ;
               976        END
```

PUBLIC SYMBOLS

EXTERNAL SYMBOLS

USER SYMBOLS
| | | | | | | | |
|---|---|---|---|---|---|---|---|
| ACKFLG A 4FA6 | ADATA A 9000 | ADDRES A 4F6A | AREA A 00F0 | ASTAT A 9005 | BAD A 0216 | BADCRC A 0178 | |
| BADR A 0133 | BAUDLS A 9000 | BAUDMS A 9001 | BEGIN A 0040 | BITS A 032A | BUFFER A 4000 | BYTE12 A 4F74 | |
| BYTE34 A 4F96 | BYTE56 A 4F98 | BYTE78 A 4F9A | CMD1 A 0302 | CMD2 A 030D | CMD3 A 0312 | CMDOUT A 02FE | |
| CNTRL A 4FAC | CNVBUF A 4F9E | CNVRT3 A 0364 | CNVRT4 A 03A3 | CNVRTA A 0404 | CNVRTD A 0435 | CNVRTH A 4F83 | |
| CNVRTF A 4F8A | CONT A 0204 | CONTR A 0121 | CPORT4 A 0013 | CPORT5 A 0023 | CRTBUF A 4F36 | CURREN A 4F85 | |
| DATAVA A 4F8D | DATCRC A 016D | DISINR A 9001 | DONE A 04D4 | DR A 032D | DTAXS A 0327 | ELP1 A 04A6 | |
| EVEN A 04A3 | GETBYT A 01DE | GETID A 4FB7 | GOODR A 013F | HPCNVT A 4F90 | HPLOP1 A 024C | HPLOP2 A 0253 | |
| HPOUT A 023E | HPSAVE A 4F92 | I82501 A 0299 | I82502 A 02DC | I8255 A 0348 | I8273 A 02BD | ID A 4FBB | |

```
INBYTE   A 0180   INCOME  A 4FA4   INPDAT  A 0107   IXMIT   A 0333   LCR     A 9003   LT10    A 0C00   LT100   A 0B00
LT1000   A 0A00   MLOOP   A 00A7   MLOOP2  A 00AD   MLOOP3  A 0090   MRESET  A 001F   MSTOP   A 002F   MULTI   A 049F
MUXRUN   A 00FF   MUXWR   A D000   NEWCON  A 01CA   NEWPAC  A 01B3   NOWADD  A 04CA   ODD     A 0486   OFFSET  A 035D
OLP1     A 045A   OPMODE  A 0321   OUTACK  A 01ED   OUTBYT  A 0232   OUTCRT  A 0281   OUTDON  A 026A   OVERFL  A 00F3
PACKET   A 4FA3   POINTI  A 4FA2   POINTO  A 4FA0   PORT4A  A 0010   PORT4B  A 0011   PORT4C  A 0012   PORT5A  A 0020
PUTLF    A 0290   RAM     A 4000   RCV     A 032F   REALDT  A 0174   RECON   A 007E   RESET   A E000   RESULT  A 6001
RSLOF    A 0187   RSTAT   A 014B   RSTATL  A 0159   RXIR    A 6003   SAMEPC  A 01A9   SAMPAC  A 4F6E   SCMDRG  A 6000
SDATAI   A B000   SDATAO  A 7000   SMODES  A 0324   SPRMRG  A 6001   SSTAT   A 6000   START   A 0051   STATLF  A 021C
STATUS   A 4FB5   TL1     A 0043   TOPOUT  A 402E   TURNON  A 022F   TX1     A 00EB   TXBYTE  A 4FBC   TXCONT  A 00E5
TXFLG    A 4FBC   TXIR    A 6002   TXLOOP  A 00E3   TXPNT   A 4FBD   TXSTAT  A 4FA5   TXSTRT  A 0069   VALUE   A 4F9C
WORDAD   A 04D5   XMIT    A 4FA7

ASSEMBLY COMPLETE.   NO ERRORS
```

What is claimed is:

1. A method for implementing telephone-based purchase requests by a subscriber, said subscriber having a telephone unit served by a telephone company central office, said telephone company central office using a computer which, in response to a telephone call from the subscriber, provides a calling line data message which includes an origination telephone number for the calling subscriber and destination telephone number data entered by the calling subscriber via his telephone unit to indicate said purchase request, comprising the steps of:

- electronically receiving a calling line data message from the telephone company central office;
- applying first information representing the origination telephone number of the subscriber directly to a system controller at an operator station, said system controller having access to authorization information editable by a billing system concerning the eligibility of the subscriber for said purchase request;
- determining from said first information and said authorization information whether the subscriber making the request is eligible to make the purchase; and
- if said determining step indicates that the subscriber is eligible for said purchase, then executing the request and indicating the transaction to a billing system.

2. The method of claim 1 wherein said receiving step is done in real time at said telephone company central office and the method further includes communicating only a portion of said received calling line data message to said operator station.

3. The method of claim 2 including buffering said portion of said calling line data message at said telephone company central office.

4. The method of claim 3 including receiving said calling line data message asynchronously and communicating said portion of said calling line data message synchronously to said operator station.

5. A method of implementing telephone-based pay per view requests by subscribers to view pay per view events, each of said subscribers having an addressable access terminal unit, each subscriber having a telephone unit, said telephone units being served by telephone company central offices, each of said telephone company central offices using a computer which, in response to a telephone call from a calling subscriber, provides a calling line data message which includes an origination telephone number for the calling subscriber and destination telephone number data entered by the calling subscriber via his telephone unit to indicate a pay per view request, comprising the steps of:

- electronically receiving a plurality of calling line data messages from respective calling subscribers at plural telephone company offices;
- electronically transmitting at least the origination telephone number portion and the destination telephone number data portion of each of the calling line data messages to a headend station;
- electronically receiving said origination telephone number portion and said destination telephone number data portion of each of said calling line data messages at said headend station and applying said telephone number portions directly to a system controller;
- locating, using said system controller, stored data indicating whether said calling subscribers are eligible to view the requested pay per view events, at least a portion of said stored data having been responsive to input from a billing system, said locating step occurring at said headend station and employing said telephone number portions; and
- addressing and updating data stored in the calling subscriber' access terminal units if said stored data indicates that said calling subscribers are eligible to view the requested pay per view events.

6. The method of claim 5 wherein the step of electronically receiving a plurality of calling line data messages at each of plural telephone company central offices occurs in real time and the method further includes buffering said portions of the calling line data messages at each of the telephone company central offices.

7. The method of claim 6 including providing communication units located at respective telephone central offices to receive said calling line data messages, strip data therefrom to provide compressed data, said compressed data including said portions of calling line data messages, providing corresponding communication controllers located at said headend station, and transmitting said compressed data to said corresponding communication controllers.

8. The method of claim 7 including buffering said portions of the calling line data messages at said communication controllers and multiplexing said portions of the buffered calling line data messages to apply them to said system controller.

9. The method of claim 7, further comprising a data conversion step occurring at said communication controllers.

10. The method of claim 8 wherein said multiplexing step includes sequentially addressing each of said communication controllers and permitting each addressed controller to communicate said buffered data for a time which depends on the time required for a communication controller to communicate all of its buffered data ready for output.

11. The method of claim 10 wherein when each of said communication controllers is addressed, if it has buffered data ready to be communicated, an interruption of said sequentially addressing occurs.

12. The method of claim 11 wherein said multiplexing step includes sequentially addressing said controllers with a multiplexer and communicating buffered data from said controllers to said multiplexer, the method further including buffering data at said multiplexer.

13. The method of claim 12 wherein after said multiplexer addresses a communication controller, the addressed communication controller interrupts said sequential addressing and verifies that the address outputted by said multiplexer after said sequential addressing has been interrupted is the address of said addressed communication controller, and if so, thereafter communicates buffered data to said multiplexer.

14. The method of claim 11 including refraining from said interrupting said step of sequentially addressing if the addressed controller determines that data is to be inputted thereto.

15. The method of claim 12 wherein said step of sequentially addressing is interrupted if inadequate buffering capability exists at said multiplexer.

16. The method of claim 9 wherein the origination telephone number portion of a calling line data message includes a plurality of ASCII digits and wherein said data conversion step includes converting said ASCII digits into a binary number.

17. The method of claim 16 wherein two of the ASCII digits are converted into a binary number by:
  subtracting 30 hexadecimal from the ASCII digit in the one's place to produce a one's place binary value;
  subtracting 30 hexadecimal from the ASCII digit in the ten's place to produce a ten's place binary value;
  combining the ten's place binary value with a ten's place look-up table base address to produce a ten's place look-up table address;
  addressing a look-up table with the ten's place look-up table address to produce a weighted ten's place binary value; and
  adding the weighted ten's place binary value to the one's place binary value to produce the binary number equivalent to the two digit ASCII number.

18. The method of claim 16 wherein the origination telephone number portion of a calling line data message includes a three digit ASCII number representing the area code of a calling subscriber and wherein the three digit ASCII area code number is converted into a two bit binary value by:
  subtracting 30 hexadecimal from the first ASCII digit to produce a first binary value;
  subtracting 30 hexadecimal from the second ASCII digit to produce a second binary value;
  rotating the second binary value left four places to produce a rotated second binary value;
  adding the first binary value to the rotated second binary value and storing the sum in a first register location;
  subtracting 30 hexadecimal from the third ASCII digit to produce a third binary value;
  adding a look-up table base address to the third binary value and storing the sum in a second register location;
  combining the values stored in the first and second register locations to produce a register pair; and
  addressing a memory with the register pair to locate the two bit binary value corresponding to the ASCII area code value.

19. A method for executing a telephone-based pay per view ("PPV") request to view an event in a system having a headend station and numerous subscribers remotely located from said headend station, said subscribers having telephone units served by plural telephone company central offices and having one-way addressable access terminal units, comprising the steps of:
  receiving calling line data messages from Automatic Number Identification ("ANI") computers coupled to the plural telephone company central offices, each of said calling line data messages including an origination telephone number for a respective calling subscriber making a PPV request and a destination telephone number entered by the calling subscriber via his telephone unit to indicate a PPV request, said receiving step occurring at each of said telephone company central offices in real time;
  stripping unnecessary data received from said ANI computers and buffering the resulting data at units associated with respective central offices; then
  separately communicating said resulting data from each of said units to corresponding communication controllers located at the headend station;
  converting the format of data received by said communication controllers and temporarily storing converted data thereat;
  communicating said converted data from said communication controllers directly to a system controller at the headend station at a high transfer rate, said system controller having stored data therein for said subscribers, said stored data having been responsive to input from a billing system;
  locating said stored data for said calling subscribers by using said origination telephone numbers and determining whether said stored data indicates that said calling subscribers can view said PPV event; and
  communicating address codes and authorization codes to said addressable access terminal units.

20. The method of claim 19 further including communicating a transaction to said billing system after said last-named communicating step, and wherein said resulting data includes both origination and destination telephone numbers.

21. A system for executing a telephone-based per pay per view (PPV) request, the system having a headend station and numerous subscribers remotely located from the headend station, said subscribers having telephone units served by a telephone company central office and having one-way addressable access terminal units, comprising:
  a receiving circuit coupled to an Automatic Number Identification (ANI) computer at the telephone company central office for receiving message data representing a request from a calling subscriber, said data including the calling subscriber's telephone number and data representing an event as to which a transaction is requested by the calling subscriber;

a communication link between said receiving circuit and the headend station;

a system controller located at the headend station for electronically mapping the telephone number portion of said message data into subscriber data stored in said system controller, said subscriber data including eligibility data indicating whether the calling subscriber is eligible to receive the event;

a billing system coupled to said system controller, said billing system being able to alter said eligibility data;

a coupling circuit coupling said message data directly to said system controller, said system controller determining from said eligibility data and said message data whether the calling subscriber is eligible to view said event and if so, then authorizing said addressable access terminal units to be addressed; and an encoding circuit responsively coupled to said system controller for communicating with the access terminal units associated with said calling subscriber.

22. The system according to claim 21 wherein said receiving circuit includes means for stripping unnecessary data from said message data and a buffer coupled to said means for stripping for temporarily storing data to be transmitted over said communication link.

23. The system of claim 22 including means for synchronously communicating data over said communication link.

24. The system according to claim 21 wherein said headend station includes means for buffering data received via said communication link.

25. The system according to claim 21 wherein said coupling circuit includes a communication controller coupled to said communication link.

26. The system according to claim 25 wherein said communication controller includes means for buffering data received via said communication link and further includes means for converting into binary form the data representative of the telephone number of the subscriber and for coupling said binary form data to said system controller.

27. A system for executing telephone-based pay per view (PPV) requests to view an event, the system having a headend station and numerous cable subscribers remotely located from said headend station, said subscribers having telephone units served by plural telephone company central offices, each subscriber having at least one one-way addressable access terminal unit, comprising:

plural circuits for receiving data representing calling subscriber requests, including the calling subscriber telephone numbers, from Automatic Number Indentification (ANI) computers assocated with the telephone company central offices;

plural communication links each arranged for coupling a respective one of said circuits for receiving to said headend station;

a system controller at said headend station;

a coupling circuit at said headend station for coupling said calling subscriber telephone numbers to said system controller; said system controller being operable to map said subscriber telephone numbers into subscriber data, said subscriber data including eligibility data indicating whether the calling subscribers are eligible to receive the requested event;

a billing system coupled to said system controller, said billing system being able to alter said eligibility data; said system controller determining from said eligibility data whether the calling subscribers are eligible to view the requested event; and an encoding circuit responsively coupled to said system controller for communicating authorization codes to the access terminal units of the calling subscribers.

28. The system according to claim 27 wherein each of said circuits for receiving includes a buffer for storing data.

29. The system according to claim 28 wherein each said circuit for receiving further includes means for stripping unneeded information from the data received from said ANI computer, said means for stripping being coupled to said buffer.

30. The system according to claim 27 wherein said coupling circuit includes means for buffering data received at said headend station via said communication link.

31. The system according to claim 27 wherein said coupling circuit includes plural communication controllers each coupled via a respective communication link to a respective circuit for receiving, and coupled also to said system controller.

32. The system according to claim 31 wherein each of said communication controllers includes means for buffering data received via its corresponding communication link.

33. The system according to claim 32 wherein each communication controller includes means for converting data received via said communication link into binary data.

34. The system according to claim 33, wherein said coupling circuit further includes a multiplexer coupled to each of said plural communication controllers and to said system controller.

35. The system according to claim 34 wherein said multiplexer includes means for sequentially addressing said communication controllers, and wherein each communication controller includes means responsive to a preselected address generated by said multiplexer, means for interrupting said sequential addressing by said multiplexer, each of said communication controllers being responsive to said interrupting for transferring temporarily stored data to said multiplexer.

36. The circuit according to claim 35 wherein each of said communication controllers includes a respective logic means for determining whether data received via said communication link is good data and for acknowledging to a corresponding circuit for receiving the receipt of good data, for converting the received data into binary data, and for loading said converted binary data into said buffer to await transmission to said multiplexer.

37. The system according to claim 36 wherein said multiplexer includes a counting circuit having an output, said system including a bus for coupling said counting circuit output to each of said communication controllers, each of said communication controllers including means for providing a predetermined count and including a comparison circuit for producing an equality signal when said counting circuit output is equal to said predetermined count, said logic means being responsive to said equality signal to enable a stop signal, said stop signal being coupled to said counting circuit and said counting circuit being inhibited when said stop signal is enabled.

38. The system according to claim 37 wherein said logic means is operative for checking the counting circuit output after said counting circuit stops, and for transferring data from said communication controller to said multiplexer if the counting circuit output after said counting circuit has stopped corresponds to the predetermined count within said communication controller.

39. The system according to claim 36 wherein said logic means is operative to cause the transfer of all converted data stored in said buffer in said communication controller to said multiplexer after said multiplexer has been interrupted from further sequential addressing.

40. The system according to claim 35 wherein said multiplexer includes a temporary storage device and a logic circuit coupled to said temporary storage device, said storage device being coupled to an input of said multiplexer, said input being coupled to each of said communication controllers, said logic circuit being operative for temporarily storing data received at said input in said storage device.

41. The system according to claim 40 wherein said multiplexer includes means associated with said storage device for indicating when said storage device has reached a predetermined level regarding its storage capacity, said means for indicating being coupled to said means for sequentially addressing communication controllers, said means for sequentially addressing being responive to said means for indicating to interrupt the sequential addressing.

42. The system according to claim 31 wherein said system controller includes an input buffer and an output buffer, said input buffer being coupled to receive a set of data words representing said subscriber requests, said system controller processing data taken from said input buffer and determining said address codes and said authorization codes corresponding to the subscriber requests, and providing said codes to said output buffer.

43. The system according to claim 42 wherein said system controller includes first and second input buffers and first and second output buffers, said system controller controlling said input and output buffers for receiving data from said communication controllers at one of said input buffers while processing data contained in other of said buffers; said output buffers communicating with said encoding circuit, one of said output buffers being operable for receiving data processed by said system controller while the other of said buffers is communicating data to said encoding circuit.

44. A system for executing telephone-based pay per view (PPV) requests from subscribers to view a PPV event, the system having a headend station and numerous subscribers remotely located from the headend station, said subscribers having telephone units served by a telephone company central office and having one-way addressable access terminal units comprising:
- a plurality of communication units each located at a respective telephone company central office and each communicating with a respective ANI computer for receiving calling line message data therefrom including the telephone number of each subscriber calling said telephone company central office with a request to view said PPV event and a destination telephone number which indicates said PPV event;
- a plurality of communication controllers located at said cable headend station, each corresponding to a respective communication unit;
- a plurality of first communication links for coupling each of said communication units to its corresponding communication controller;
- a second communication link coupled to all of said communication controllers for receiving data therefrom, including the telephone numbers of said subscribers who have called to request said event;
- a system controller directly coupled to said second communication link for receiving data therefrom and for mapping said telephone numbers into respective blocks of stored data each of which includes, for the respective subscriber, the subscriber's access terminal unit address and eligibility data indicative of whether the calling subscriber may view said PPV event, said blocks of data being stored in said system controller;
- an encoding circuit responsively coupled to said system controller for communicating data to the access terminal units of those subscribers whose said eligibility data indicates that they are entitled to view said PPV event;
- a billing system coupled to said system controller for updating said eligibility data;
- each of said communication units including a logic means responsive to the receipt of data from the corresponding ANI computer for stripping therefrom unnecessary data, each of said communication units including a storage device, said logic means being operable to store data remaining after said stripping in said storage device;
- each of said communication controllers including logic means and a storage device, said logic means being operative for causing data received at said communication controller via the corresponding first communication link to be stored temporarily in said storage device and for converting the format of data into binary form.

45. The system according to said claim 44 wherein said second communication link comprises a multiplexer which includes means for sequentially addressing each of said communication controllers and means for interrupting said sequentially addressing means; wherein the logic means in each of said communication controllers determines that said communication controller is being addressed by said multiplexer and, in response, activates said means for interrupting said sequential addressing until after the transfer of temporarily stored data from said communication controller to said multiplexer.

46. The system according to claim 44 further including means for communicating to said billing system data representative of said PPV requests which have been mapped by said system controller thereby to adjust data for the subscriber to reflect their PPV requests which have been processed.

47. The method of claim 1 wherein said applying step comprises mapping the subscribers origination telephone number into a block of data concerning the subscriber, said block indicating whether the subscriber is eligible to make the requested purchase, at least a portion of said block of data corresponding to said information received from said billing system; said comparing step comprising determining the contents of a portion of said block of data.

48. The method of claim 47 further comprising buffering said calling line data message at said telephone company central office; stripping data from said calling line data message; and transmitting the remaining data after said stripping step to said operator station; said mapping step occurring at said cable operator station.

49. The method of claim 1 wherein said authorization information is located in said system controller.

50. The method of claim 1 wherein said authorization information comprises a flag which is editable by said billing system.

51. The method of claim 5 wherein said stored data is located in said system controller.

52. The method of claim 51 wherein said stored data comprises a flag and wherein said billing system is operable to edit said flag from time to time.

53. The method of claim 9 wherein said communication units strip unnecessary data from said calling line data messages to provide compressed calling line data; and wherein said communication controllers reorganize said compressed calling line data and convert the format thereof into one or more binary formats.

54. The method of claim 53 wherein each of said communication controllers:
converts the origination telephone numbers which it receives by reading a look-up table for a first portion of each respective origination telephone number to provide a first binary number;
converts a second portion of the origination telephone number into a second binary number; and
combines said first and second binary numbers into a third binary number which it communicates to said system controller.

55. The method of claim 19 wherein said stored data inlcues a flag which is able to be updated from time to time by said billing system.

56. The method of claim 21 wherein said eligibility data comprises a flag.

57. A method for implementing telephone-based pay per view ("PPV") requests by subscribers to view a PPV event, each said subscriber having a telephone unit served by a telephone company central office and having an addressable access terminal unit, said telephone company central office using apparatus which, in response to a telephone call from the subscriber, provides a corresponding calling line data message which includes the origination telephone number for calling subscriber and the destination telephone number data entered by the calling subscriber via the subscriber's telephone unit to indicate the PPV request, comprising the steps of:
electronically receiving calling line data messages from the telephone company central office in a first data format;
stripping unnecessary data from said each calling line data message to provide a plurality of compressed data measages each of which includes the origination telephone number and said destination number of a calling subscriber;
temporarily storing said plurality of said compressed data messages;
transmitting said plurality of compressed data messages via a communication link to a headend office;
receiving said plurality of compressed data messages at a communication controller at said headend station;
converting the format of the portions of said compressed data messages which include the origination telephone numbers received by said communication controllers into binary format, including finding a first binary number in a look-up table for a first portion of an origination telephone number, converting a second portion of said origination telephone number into a second binary number, and converting a third portion of said origination telephone number into a binary format; said communication controller also converting said destination telephone number into a binary format; and
communicating said binary numbers directly to a system controller, said system controller locating, from each said origination telephone number, a data block for the corresponding calling subscriber, said data block including a flag which indicates whether said calling subscriber may receive said PPV event; said data block flags being editable by a billing system; said system controller updating the addressable access terminal unit of a said calling subscriber if the corresponding said flag indicates that said calling subscriber is eligible to view said PPV event.

58. The method according to claim 57 wherein said destination telephone numbers are converted into binary coded decimal and wherein said system controller uses said first and second binary numbers to look up further information to find said data block.

59. The method according to claim 57 wherein said communication controller consults a look-up table to determine a first number of binary bits indicating the area code of said origination telephone number, consults a look up table to determine a second number of binary bits indicating a second portion of said telephone origination number, and combines said first and second binary numbers.

60. The method of claim 57 wherein said data blocks are stored in said system controller.

61. The method of claim 1 wherein said applying step includes receiving information at first and second input buffers alternately, said system controller performing said comparing step on information which has been stored in one of said input buffers while information is being received at the other said input buffer, said system controller loading processed data into first and second output buffers alternately, the method further comprising communicating said processed data from said output buffers to an encoding circuit, one of said output buffers communicating with said encoding circuit while the other said output buffer receives said processed data from system controller.

62. The system of claim 27 wherein said subscriber data is stored in said system controller.

63. The method of claim 1 wherein said purchase requests are for pay per view video events, wherein said subscriber has an addressable access terminal unit and wherein said executing step comprises addressing said access terminal units to permit the pay per view event to be viewed.

* * * * *